US012633273B2

(12) United States Patent
Tomei et al.

(10) Patent No.: US 12,633,273 B2
(45) Date of Patent: May 19, 2026

(54) ROLLING VIDEO BUFFER APPARATUS

(71) Applicant: TEXAS INSTRUMENTS INCORPORATED, Dallas, TX (US)

(72) Inventors: Kevin Ross Tomei, Dallas, TX (US); Jeffrey Matthew Kempf, Dallas, TX (US); Jeffrey S. Farris, Flower Mound, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 214 days.

(21) Appl. No.: 18/326,887

(22) Filed: May 31, 2023

(65) Prior Publication Data

US 2024/0005893 A1     Jan. 4, 2024

Related U.S. Application Data

(60) Provisional application No. 63/367,280, filed on Jun. 29, 2022.

(51) Int. Cl.
| | |
|---|---|
| *G09G 5/393* | (2006.01) |
| *G09G 3/00* | (2006.01) |

(Continued)

(52) U.S. Cl.
CPC ............. *G09G 5/393* (2013.01); *G09G 3/001* (2013.01); *G09G 2340/0492* (2013.01);
(Continued)

(58) Field of Classification Search
CPC ................... G09G 5/393; G09G 3/001; G09G 2340/0492; G09G 2360/12;
(Continued)

(56) References Cited

U.S. PATENT DOCUMENTS 5,526,024 A * 6/1996 Gaglianello .............. G06F 3/14
                                                            715/733
6,501,441 B1 * 12/2002 Ludtke ............... H04N 21/4363
                                                            345/1.3

(Continued)

OTHER PUBLICATIONS

Alireza Zare, Alireza Aminlou, Miska M. Hannuksela, and Moncef Gabbouj. 2016. HEVC-compliant Tile-based Streaming of Panoramic Video for Virtual Reality Applications. In Proceedings of the 24th ACM international conference on Multimedia (MM '16). Association for Computing Machinery, New York, 601-605 (Year: 2016).*

*Primary Examiner* — Kee M Tung
*Assistant Examiner* — Nauman U Ahmad
(74) *Attorney, Agent, or Firm* — Michael T. Gabrik; Frank D. Cimino

(57)          ABSTRACT

A system includes a display device configured to display frames of images, a memory coupled to the display device and configured to store image data representing a sequence of the frames, and a memory controller coupled to the memory. The memory controller is configured to split a frame in the sequence of frames into a slice count of frame slices according to an order of respective frame slice numbers, partition the memory into a number of buffer slices in an ordered sequence wherein the number of buffer slices is greater than or equal to the slice count, write each frame slice in the sequence of frames to a next free buffer slice in the ordered sequence of buffer slices, read each written frame slice to the display device to display the written frame slice with other displayed frame slices according to the order of the respective frame slice numbers, and return to a first buffer slice in the ordered sequence after writing a frame slice in a last buffer slice in the ordered sequence.

20 Claims, 34 Drawing Sheets

(51) Int. Cl.
　　*H04N 13/363*　　　　(2018.01)
　　*H04N 13/385*　　　　(2018.01)
(52) U.S. Cl.
　　CPC ..... *G09G 2360/12* (2013.01); *G09G 2360/18*
　　　　(2013.01); *H04N 13/363* (2018.05); *H04N*
　　　　　　　　　　　　　　*13/385* (2018.05)
(58) Field of Classification Search
　　CPC ...... G09G 2360/18; G09G 3/32; G09G 3/346;
　　　　　　G09G 3/003; G09G 3/2022; G09G 3/002;
　　　　　　G09G 5/399; G09G 2340/14; H04N
　　　　　　　　　　　　　　13/363; H04N 13/385
　　See application file for complete search history.

(56)　　　　　　References Cited

U.S. PATENT DOCUMENTS

| | | | | |
|---|---|---|---|---|
| 6,911,984 B2 * | 6/2005 | Sabella | ................. | G09G 5/393 |
| | | | | 345/545 |
| 8,300,699 B2 * | 10/2012 | Stivers | ............ | H04N 21/43637 |
| | | | | 345/545 |
| 10,205,966 B2 * | 2/2019 | Wu | ....................... | H04N 19/167 |
| 2005/0223131 A1 * | 10/2005 | Goekjian | ................ | G06F 13/28 |
| | | | | 710/22 |
| 2007/0188443 A1 * | 8/2007 | Mehrl | ................ | G02B 26/0841 |
| | | | | 345/108 |
| 2008/0136815 A1 * | 6/2008 | Matsumoto | ............ | G09G 5/395 |
| | | | | 345/419 |
| 2011/0080419 A1 * | 4/2011 | Croxford | ................ | G09G 5/395 |
| | | | | 345/531 |
| 2013/0300769 A1 * | 11/2013 | Huang | ................... | G09G 5/399 |
| | | | | 345/658 |
| 2014/0068118 A1 * | 3/2014 | Lee | ......................... | G06F 9/461 |
| | | | | 710/53 |
| 2014/0101340 A1 * | 4/2014 | Jandhyam | ............. | G06F 13/385 |
| | | | | 710/6 |
| 2014/0229890 A1 * | 8/2014 | Tokunaga | .............. | A61B 6/465 |
| | | | | 715/786 |
| 2015/0220260 A1 * | 8/2015 | Hou | ......................... | G09G 5/38 |
| | | | | 715/863 |
| 2019/0057053 A1 * | 2/2019 | Tsuchida | ................. | G06F 13/28 |

* cited by examiner

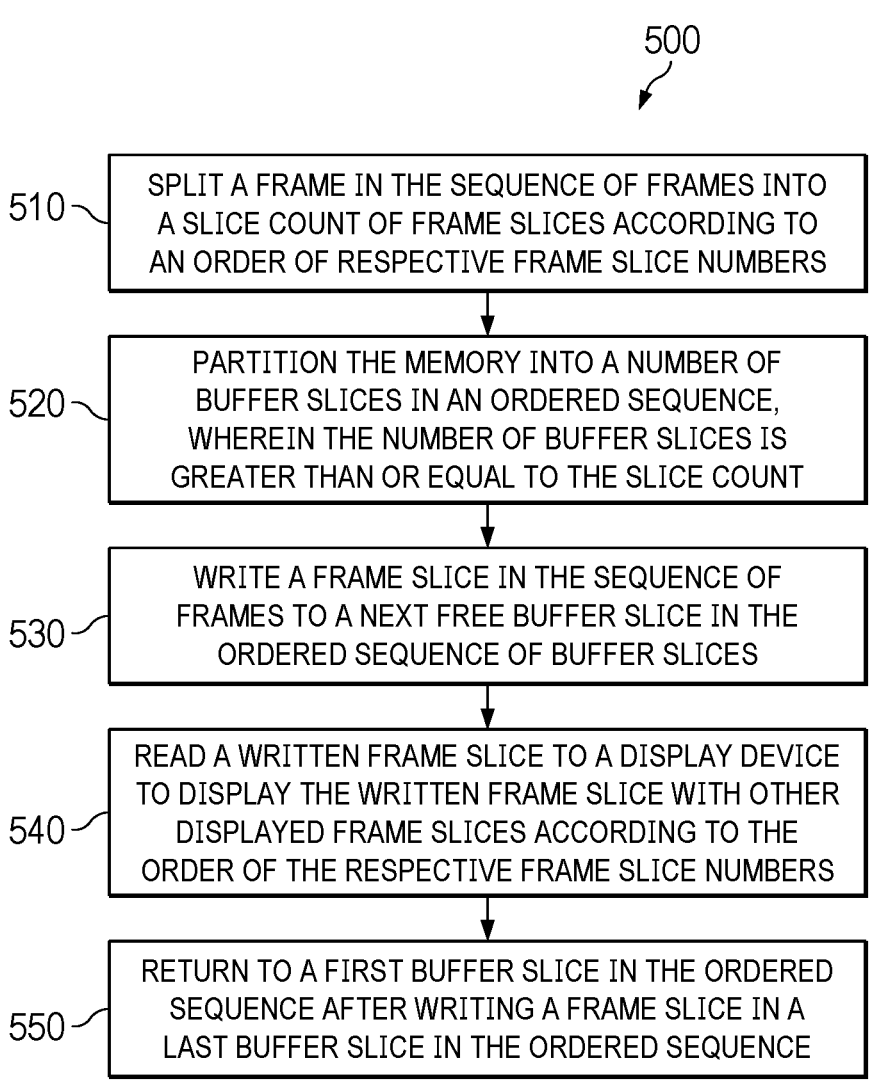

500

510 ~ SPLIT A FRAME IN THE SEQUENCE OF FRAMES INTO A SLICE COUNT OF FRAME SLICES ACCORDING TO AN ORDER OF RESPECTIVE FRAME SLICE NUMBERS

520 ~ PARTITION THE MEMORY INTO A NUMBER OF BUFFER SLICES IN AN ORDERED SEQUENCE, WHEREIN THE NUMBER OF BUFFER SLICES IS GREATER THAN OR EQUAL TO THE SLICE COUNT

530 ~ WRITE A FRAME SLICE IN THE SEQUENCE OF FRAMES TO A NEXT FREE BUFFER SLICE IN THE ORDERED SEQUENCE OF BUFFER SLICES

540 ~ READ A WRITTEN FRAME SLICE TO A DISPLAY DEVICE TO DISPLAY THE WRITTEN FRAME SLICE WITH OTHER DISPLAYED FRAME SLICES ACCORDING TO THE ORDER OF THE RESPECTIVE FRAME SLICE NUMBERS

550 ~ RETURN TO A FIRST BUFFER SLICE IN THE ORDERED SEQUENCE AFTER WRITING A FRAME SLICE IN A LAST BUFFER SLICE IN THE ORDERED SEQUENCE

FIG. 5

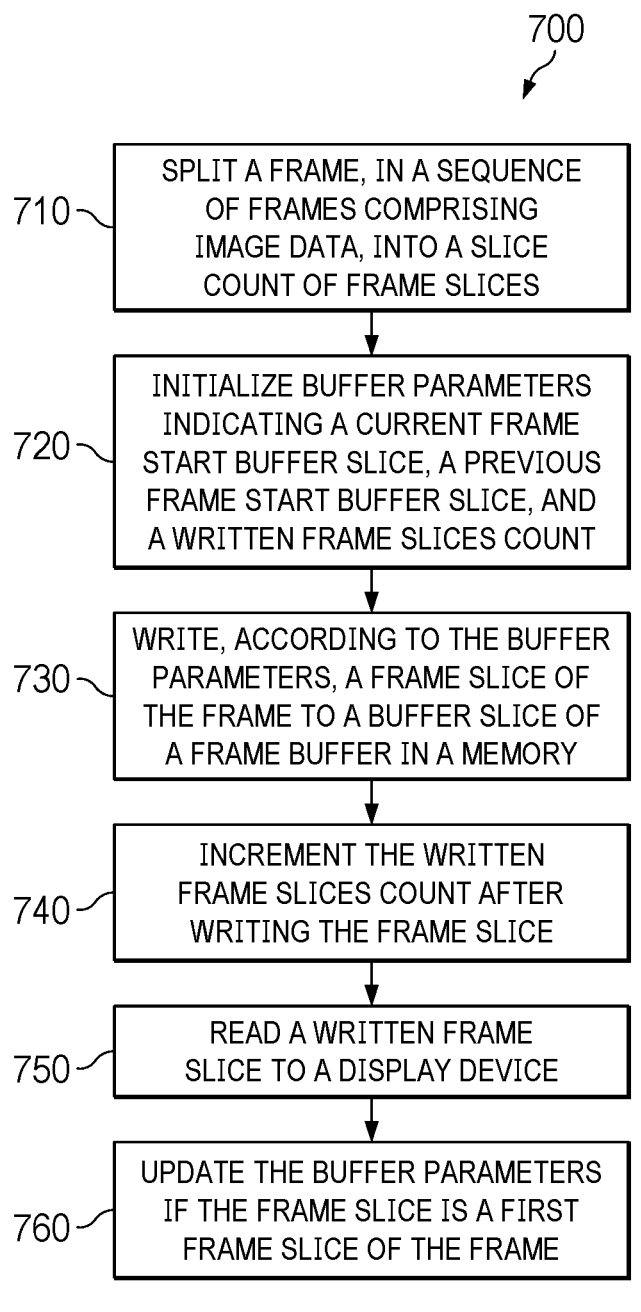

700

710 — SPLIT A FRAME, IN A SEQUENCE OF FRAMES COMPRISING IMAGE DATA, INTO A SLICE COUNT OF FRAME SLICES

720 — INITIALIZE BUFFER PARAMETERS INDICATING A CURRENT FRAME START BUFFER SLICE, A PREVIOUS FRAME START BUFFER SLICE, AND A WRITTEN FRAME SLICES COUNT

730 — WRITE, ACCORDING TO THE BUFFER PARAMETERS, A FRAME SLICE OF THE FRAME TO A BUFFER SLICE OF A FRAME BUFFER IN A MEMORY

740 — INCREMENT THE WRITTEN FRAME SLICES COUNT AFTER WRITING THE FRAME SLICE

750 — READ A WRITTEN FRAME SLICE TO A DISPLAY DEVICE

760 — UPDATE THE BUFFER PARAMETERS IF THE FRAME SLICE IS A FIRST FRAME SLICE OF THE FRAME

480 pixels 1080 pixels

1700

960 pixels 540 pixels

FIG. 20B

ROLLING VIDEO BUFFER APPARATUS

CROSS-REFERENCE TO RELATED APPLICATIONS

The present application claims priority to U.S. Provisional Patent Application No. 63/367,280, which was filed Jun. 29, 2022, is titled "Rolling Video Buffer Apparatus," and is hereby incorporated herein by reference in its entirety.

BACKGROUND

Projection-based displays project images onto projection surfaces, such as onto a wall or a screen, to display video or pictures for viewing. Projection-based displays can include cathode-ray tube (CRT) displays, liquid crystal displays (LCDs), and spatial light modulator (SLM) displays such as digital mirror device (DMD) displays, etc. Projection-based displays also include near-eye displays for projecting images to the eye pupil, such as augmented reality (AR) or virtual reality (VR) displays in wearable devices.

SUMMARY

In accordance with at least one example of the disclosure, a system includes a display device configured to display frames of images, a memory coupled to the display device and configured to store image data representing a sequence of the frames, and a memory controller coupled to the memory. The memory controller is configured to split a frame in the sequence of frames into a slice count of frame slices according to an order of respective frame slice numbers, partition the memory into a number of buffer slices in an ordered sequence wherein the number of buffer slices is greater than or equal to the slice count, write each frame slice in the sequence of frames to a next free buffer slice in the ordered sequence of buffer slices, read each written frame slice to the display device to display the written frame slice with other displayed frame slices according to the order of the respective frame slice numbers, and return to a first buffer slice in the ordered sequence after writing a frame slice in a last buffer slice in the ordered sequence.

In accordance with at least one example of the disclosure, a method includes splitting, by a rolling buffer controller, a frame, in a sequence of frames comprising image data, into a slice count of frame slices, initializing buffer parameters indicating a current frame start buffer slice, a previous frame start buffer slice, and a written frame slices count, writing, according to the buffer parameters, a frame slice of the frame slices of the frame to a buffer slice of a frame buffer in a memory, incrementing the written frame slices count after writing the frame slice, reading the written frame slice to a display device, and updating the buffer parameters if the frame slice is a first frame slice of the frame.

In accordance with at least one example of the disclosure, an apparatus includes rolling buffer controllers coupled to a memory controller and a memory. Each rolling buffer controller is configured to receive write requests from the memory controller to write frame slices of a frame in a sequence of frames representing image data, provide the memory controller with memory addresses for writing the frames slices into respective buffer slices of a frame buffer in the memory, receive buffer update requests, generate, in response to each buffer update request, a read-side snapshot of buffer parameters of the frame buffer for tracking the frame slices in the respective buffer slices, receive read requests from the memory controller to read the frame slices from the respective buffer slices, and provide, according to the read-side snapshot, the memory controller with the memory addresses of the respective buffer slices storing the frame slices. The apparatus further includes a link controller coupled to the rolling buffer controllers and configured to link each rolling buffer controller to obtain the buffer parameters of other rolling buffer controllers.

BRIEF DESCRIPTION OF THE DRAWINGS

FIG. 5 is a flow diagram of a method of a rolling buffer operation for writing and reading frame slices, in accordance with various examples.

FIG. 7 is a flow diagram of a method of a rolling buffer operation for tracking buffer slices to write frame slices, in accordance with various examples.

FIGS. 20A-20C show a diagram of a rolling buffer operation in a single buffer mode for displaying frames on two displays, in accordance with various examples.

DETAILED DESCRIPTION

Figure 1:
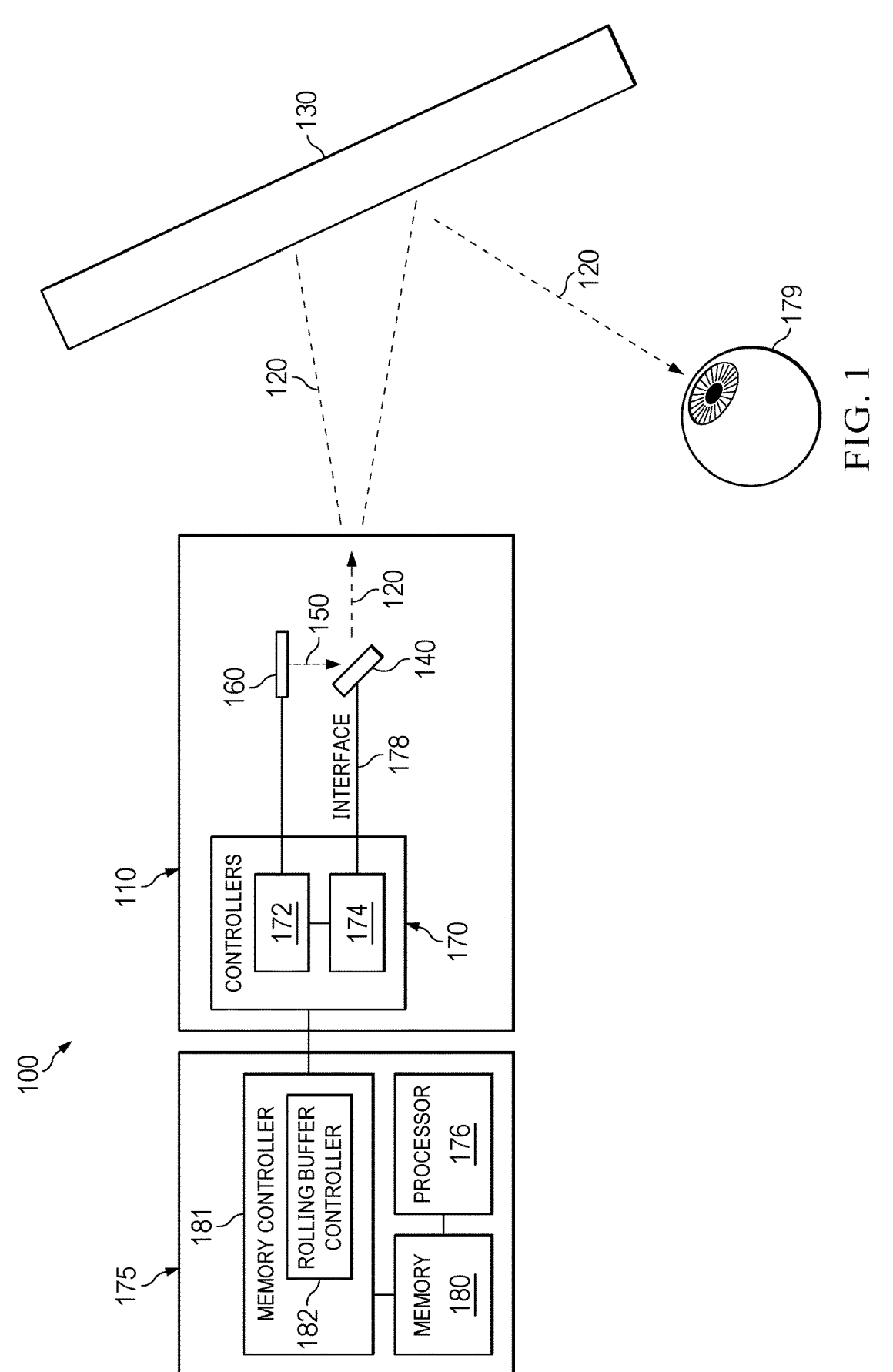
FIG. 1 is a diagram of a display system, in accordance with various examples.

Display systems, such as projection-based displays, can store image or video data into memory buffers before transmitting the data to a display device for projecting images. The image or video data can represent a sequence of frames of images arranged in an order to be displayed in respective display time intervals. At each time interval, a controller swaps writing and reading operations on the frames between the two memory buffers, also referred to herein as frame buffers. For example, during a time interval, the controller writes a first frame from the sequence of frames to a first frame buffer, and reads a second frame previously written and stored in a second frame buffer to transmit the second frame to the display device. During the next time interval, the controller writes a third frame from the sequence of frames to the second frame buffer and reads the first frame stored in the first frame buffer to transmit the first frame to the display device. The controller performs similar writing and reading operations on next frames in the sequence of frames by swapping the operations between the first and second frame buffers. The writing and reading operations of the frames in two frame buffers is also referred to herein as a double buffer operation.

In the double buffer operation, the reserved memory size of the two frame buffers is equivalent to two times the frame size. Because each frame is stored for a display time interval between the writing and reading operations in one of the two frame buffers, the double buffer operation has a delay associated with storing a full frame size. The delay for storing and displaying a frame is also referred to herein as the latency to display a frame. This description includes examples of a frame buffer operation for storing frames with reduced memory size and latency in comparison to the double buffer operation. The frame buffer operation includes splitting each frame in a sequence of frames into a certain number of ordered frame slices. The frame slices are indicated by respective frame slice numbers according to the order of the frame slices in the frame. The number of frame slices in a frame is also referred to herein as a slice count.

In the frame buffer operation, the ordered frame slices are stored in a memory configured as a single frame buffer for writing and reading the frame slices. The frame buffer is partitioned into a number of buffer slices that are arranged in an ordered sequence. A memory is configured to write each frame slice at a time to a free buffer slice in the ordered sequence of buffer slices. A free buffer slice is a buffer slice that is free of data or that stores a previously displayed frame slice. The frame slices are written to the buffer slices in the order according to the frame slice numbers. The memory controller also reads each written frame slice stored in a buffer slice to transmit the frame slice to a display device. The display device is configured to display a number of frame slices equal to the slice count at a same time to form an image. Each frame slice of a frame in the sequence of frames is displayed by the display device to replace a previously displayed frame slice, with a same frame slice number, of a previous frame in the sequence of frames. Frame slices of the frame and the previous frame, which have difference frame slice numbers, can also be displayed at a same time. The memory controller is further configured to free a buffer slice that is storing the previously displayed frame slice of the previous frame. Writing and reading each frame slice at a time reduces the latency to display a frame in comparison to writing and reading a total frame size at a time in the double buffer operation.

If a frame slice is written to a last buffer slice in the ordered sequence of buffer slices, the memory controller is configured to return to a first buffer slice in the ordered sequence of buffer slices to write a next frame slice in the sequence of frames. Returning to the first buffer slice in the ordered sequence of buffer slices to write a next frame slice is referred to herein as rolling back the frame buffer. The frame buffer operation including writing and reading the frame slices into buffer slices and rolling back the frame buffer is also referred to herein as a rolling buffer operation. In the rolling buffer operation, the number of buffer slices is greater than or equal to the frame slice count. The number of buffer slices can also be less than two times the number of frame slices. Accordingly, the memory size of the rolling buffer operation can be less than two times the frame size that is required for the double buffer operation.

FIG. 1 is a diagram of a display system 100, in accordance with various examples. The display system 100 is for a projection-based display that projects images or video for viewing. As shown in FIG. 1, the display system 100 includes a display device 110 which is configured to project a modulated light 120 onto an image projection surface 130 for displaying the images or video. For example, the image projection surface 130 can be a wall or a wall mounted screen. In other examples, the image projection surface 130 may be a screen of a heads up display (HUD), a projection surface in a vehicle such as a windshield, an outdoor environment such as a road, an AR or VR combiner, a 3D display screen, or other display surfaces for projection-based display systems. In examples, the display system 100 is a portable projector or a wearable AR/VR device.

The modulated light 120 may be modulated by a light modulator 140 in the display device 110 to project images, such as video frames, onto the image projection surface 130. The light modulator 140 can be a microelectromechanical system (MEMS) based SLM, such as a DMD, or a liquid crystal-based SLM, such as an LCD or a liquid crystal on silicon (LCoS) device. The light modulator 140 modulates the intensity of a light from a light source based on optical elements that are controlled to manipulate the light and accordingly form the pixels of a displayed image. In examples, the light modulator 140 is a DMD, where the optical elements are adjustable tilting micromirrors that are tilted by applying voltages to the micromirrors through respective electrodes. The micromirrors are tilted to project dark pixels or bright pixels with color shades. In other examples, the light modulator 140 is an LCD or an LCoS device, where the optical elements are liquid crystals that are controlled by voltage to modulate the intensity of light across the image pixels. The intensity of light is modulated by applying voltage to the liquid crystals, which reorients the crystals, also referred to herein as switching the crystals, and accordingly controls the amount of light projected per pixel. The optical elements can be a transmissive array of liquid crystal cells such as in an LCD, or a reflective array of liquid crystal cells such as in an LCoS device. The cells of liquid crystals can be controlled by voltages, through respective electrodes, to modulate light.

In other examples, the light modulator 140 can be a phase light modulator (PLM) or a ferroelectric liquid crystal on silicon (FLCoS) device. A PLM can be a MEMS device including micromirrors that have adjustable heights with respect to the PLM surface. The heights of the micromirrors can be adjusted by applying voltages. The micromirrors may be controlled with different voltages to form a diffraction surface on the PLM. For example, each micromirror can be coupled to respective electrodes for applying a voltage and controlling the micromirror independently from the other micromirrors of the PLM. The diffraction surface is a phase altering reflective surface to light incident from a light source on the surface of the light modulator 140. The phase altering reflective surface represents a hologram for projecting illumination patterns of light that form an image on an image projection surface. The hologram is formed as a diffraction surface by adjusting the heights of the micromirrors of the PLM. The hologram is formed based on an image that is to be displayed by projecting the light on the image projection surface 130. An FLCoS device includes ferro-electric liquid crystals (FLCs) that have a faster voltage response than other liquid crystal devices (e.g., LCDs and LCoS devices) and accordingly can project images at a higher rate. Other examples of the light modulator 140 include micro-light emitting diodes (micro-LEDs) and micro-organic light emitting diodes (micro-OLEDs).

The modulated light 120 can be formed as a combination of color modes (e.g., blue, green, and red) from an incident light 150, which is generated by one or more light sources 160. For example, three color modes can provide three basic color components for displaying an image in full color. The color modes in the incident light 150 can be transmitted concurrently or by time multiplexing the light sources 160. The incident light 150 with the different color modes is modulated by the light modulator 140 in the display device 110 to produce the modulated light 120 for displaying images or video on the image projection surface 130.

The display device 110 also includes one or more controllers 170 configured to control the light modulator 140 and the light sources 160 to display the images or video. For example, the controllers 170 can include a first controller 172 for controlling the light sources 160 to transmit the incident light 150 concurrently or consecutively by time multiplexing. The controllers 170 can also include a second controller 174 for controlling the light modulator 140 to modulate the incident light 150 from the respective light sources 160. In other examples, the display device 110 can include light modulators 140 that each forms a respective modulated light 120. For example, each light modulator 140 can be optically coupled to a respective light source 160 and to a respective controller 170 or the same controller 170.

The first controller 172 and the second controller 174 can be different controllers. The first controller 172 can be a digital controller configured to switch the light sources 160 on and off. In other examples, the first controller 172 can be an analog controller that changes the level of light intensity of the incident light 150 from the light sources 160. The analog controller can also transmit pulse width modulation (PWM) signals to the light modulator 140 to synchronize the adjustment of the optical elements in the light modulator 140 with the transmission of the incident light 150 from the light sources 160. The second controller 174 may be an analog or a digital controller that switches the optical elements of the light modulator 140. For example, the second controller 174 is an analog controller or a digital controller that switches the angles of micromirrors of an SLM or the heights of micromirrors of a PLM. In examples, the second controller

174 is a digital controller coupled to a static random access memory (SRAM) (not shown) including an array of memory cells each configured to store voltage values, such as in bits, to adjust respective micromirrors of an SLM or a PLM. The micromirrors can be adjusted according to the bit values in the corresponding SRAM cells, such as based on PWM signals from the first controller 172. In other examples, the light modulator 140 is an LCD, an LCoS device, or a FLCoS device and the optical elements are liquid crystals that are controlled by the second controller 174 to modulate the incident light 150 across the image pixels.

The display device 110 also includes or is coupled to an apparatus 175 including a processor 176 configured to process image data which represents one or more images to be displayed by the light modulator 140. For example, the image data can represent a sequence of frames of images, such as video frames, that are projected at a certain display rate. The frames are arranged in the sequence according to an order to be displayed for viewing the video. The processor 176 processes the image data into a format of processed image data which is useful to provide control signals from the one or more controllers 170 to the light modulator 140 and the light sources 160. For example, the second controller 174 receives from the processor 176 image data in the form of a sequence of frames and produces display image data based on the received image data. The display image data can then be transmitted from the second controller 174 to the light modulator 140 on an interface 178. The second controller 174 can provide control signals based on the display image data to the light modulator 140, which then modulates the incident light 150 according to the control signals to display video or images. The light modulator 140 is configured to project the modulated light 120 on the image projection surface 130 to display the images for viewing by a human eye 179, also referred to herein as the human visual system (HVS) pupil. The display device 110 can further include one or more input/output devices (not shown), such as an audio input/output device, a key input device, a display, and the like. For example, the display device 110 is a wearable AR/VR device and the image projection surface 130 is an AR/VR combiner. The AR/VR device can include two AR/VR combiners for right and left eye viewing, respectively. Other examples of the display device 110 include displays such as LCDs, OLEDs, active-matrix OLEDs (AMOLEDs), for smartphones, tablets, laptops, and other portable devices.

The apparatus 175 also includes a memory 180 and a memory controller 181 including one or more rolling buffer controllers 182 which are coupled to the processor 176. The memory 180 is configured to store image data representing a sequence of frames. The memory 180 can include a single frame buffer for storing the image data that is processed by the processor 176 as a sequence of frames. The memory controller 181 is configured to manage and control storing and retrieving the image data of the sequence of frames in the memory 180. The memory controller 181 can be implemented via hardware, software, or combinations thereof. For example, the memory controller 181 is a digital controller or a processor. The memory controller 181 stores/retrieves the image data, also referred to herein as reading and writing the image data, in respective locations of the memory 180 based on memory addresses. The rolling buffer controller 182, which is an embedded controller or an integrated controller function of the memory controller 181, is configured to perform a rolling buffer operation within the memory controller 181 for storing the frames in the frame buffer of the memory 180 and transmitting the stored frames from the frame buffer to the display device 110. According to the rolling buffer operation, the memory controller 181 obtains each frame from the sequence of frames processed by the processor 176 and splits the frame into a certain slice count. The frame slices are ordered and assigned respective frame slice numbers according to a certain order. The memory controller 181 is also configured to partition a frame buffer in the memory 180 into a number of buffer slices in an ordered sequence. The number of buffer slices of the frame buffer can be greater than the slice count of the frame slices to allow storing frame slices of more than one frame in the same frame buffer. As part of the rolling buffer operation, the rolling buffer controller 182 tracks the written frame slices and the buffer slices storing the written frame slices in the memory 180, and provides the memory addresses, or information to calculate the memory addresses, of the buffer slices and stored frame slices to the memory controller 181.

The rolling buffer controller 182 includes a write controller that enables storing the frame slices to the frame buffer in the memory 180, and a read controller that enables fetching the written frame slices from the frame buffer in the memory 180. The read controller and the write controller can be two controller functions of the rolling buffer controller 182 in the memory controller 181. In response to write requests from the memory controller 181, the write controller provides the memory addresses of the buffer slices in the memory 180. Based on the memory addresses from the write controller, the memory controller 181 writes the frame slices according to the order of respective frame slice numbers to free buffer slices in the ordered sequence of buffer slices.

In response to read requests from the memory controller 181, the read controller provides the memory addresses of the buffer slices storing the written frame slices. Based on the memory addresses from the read controller, the memory controller 181 reads written frame slices according to the order of respective frame slice numbers from the buffer slices. The memory controller 181 transmits each frame slice from frame buffer in the memory 180 to the display device 110 to display the frame slice with other read frame slices according to the order of respective frame slice numbers. After writing a frame slice in a last buffer slice in the ordered sequence of buffer slices, the frame buffer is rolled back to a first buffer slice and the rolling buffer controller 182 returns to the first buffer slice to continue the rolling buffer operation for next frame slices in the sequence of frames.

Figure 2:
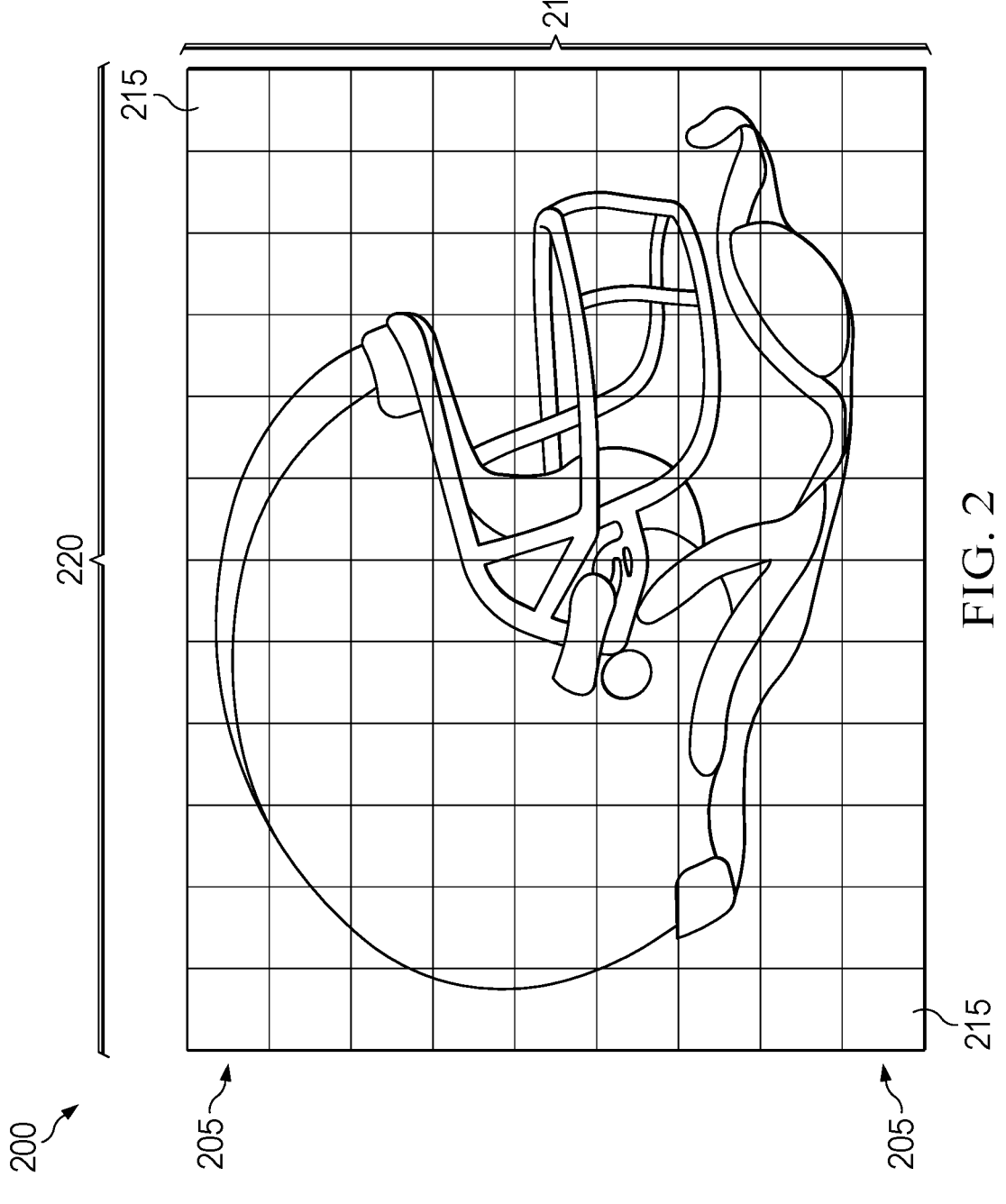
FIG. 2 is a diagram of a frame of an image divided into frame slices, in accordance with various examples.

FIG. 2 is a diagram of a frame 200 of an image divided into frame slices 205, in accordance with various examples. For example, the memory controller 181 obtains the frame 200 from a sequence of frames processed by the processor 176 and splits the frame 200 into a slice count 210 of frame slices 205, which are represented by respective rows in FIG. 2. Each frame slice 205 can be formed of a same number of observation blocks 215 that determine the size of the frame slice 205, also referred to herein as a slice size 220. Each of the observation blocks 215 includes a number of pixels of the frame 200 represented in image data of color shades, such as in a red (R), green (G) and blue (B) format. For example, the frame 200 can be a two-dimensional (2D) image of 96×72 pixels that is split into a slice count 210 of nine frame slices 205. Each frame slice 205 has a slice size 220 of twelve observation blocks 215 as shown in FIG. 2. Each observation block 215 is an 8×8 block of pixels that includes 64 pixels of the 2D image. In other examples, the observation blocks 215, the frame slices 205, and the frame 200 can include different numbers of pixels and/or observation blocks 225. In examples, the memory controller 181 writes and reads each observation block 215 at a time in a frame buffer to store and fetch, respectively, a frame slice 205 formed by a number of observation blocks 215 in the memory 180.

Figure 3:
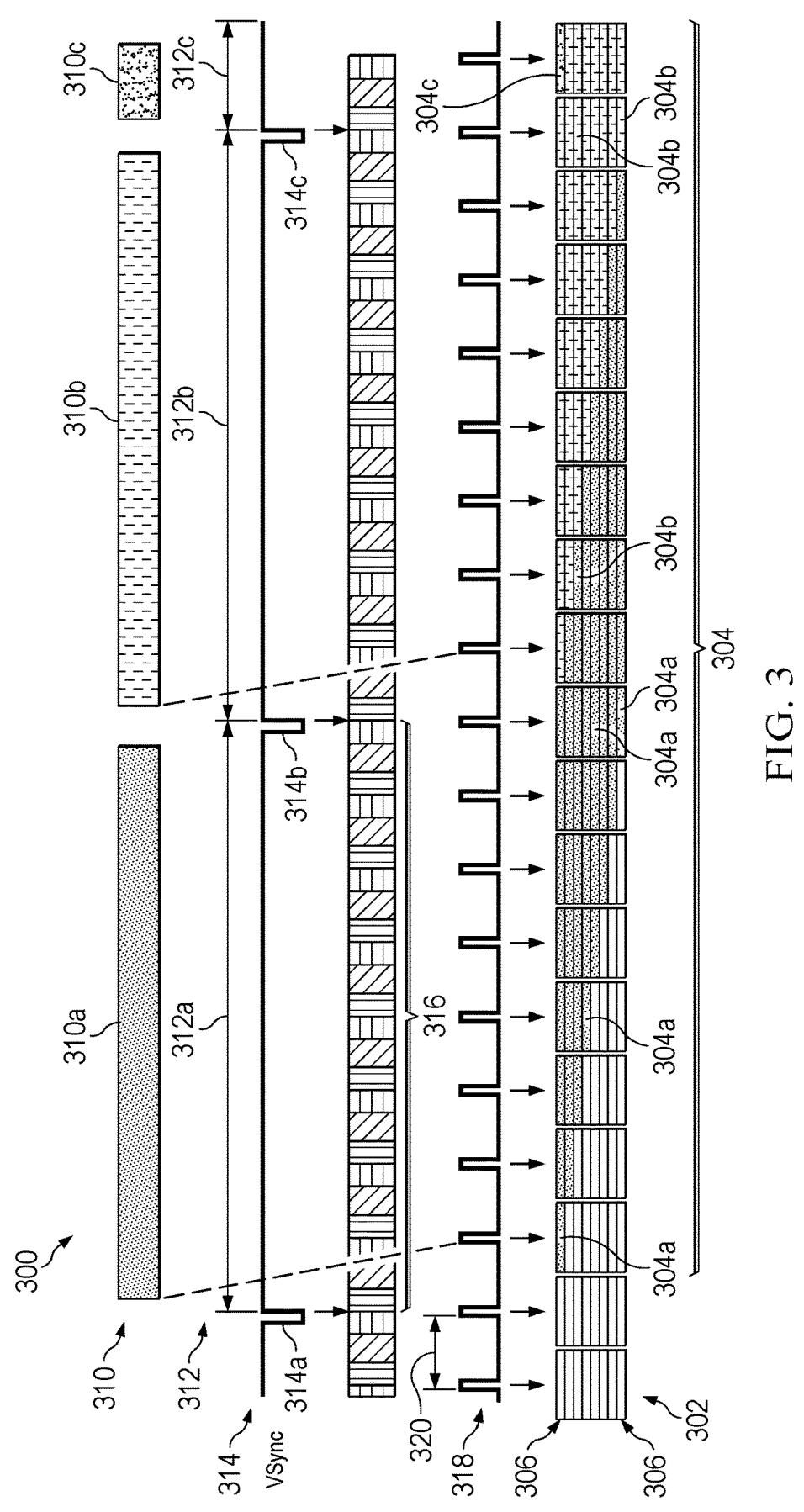
FIG. 3 is a diagram of a rolling buffer operation for writing and reading frames in a frame buffer, in accordance with various examples.

FIG. 3 is a diagram of a rolling buffer operation 300 for writing and reading frames in a frame buffer 302, in accordance with various examples. For example, the frame buffer 302 can be part of the memory 180 of the display system 100, where each frame from a sequence of frames processed by the processor 176 is split into a certain slice count of frame slices 304. The frame slices 304 have a same slice size of observation blocks, such as in the frame 200. The number of buffer slices 306 in the frame buffer 302 can be greater than or equal to the slice count of frame slices 304 in each frame. For example, as shown in FIG. 3, the slice count and the number of buffer slices 306 are both equal to 8. In other examples, the number of buffer slices is greater than the slice count.

According to the rolling buffer operation 300, the memory controller 181 receives image data in a sequence of data blocks 310 (e.g., 310a, 310b, 310c, etc.) provided in respective time intervals 312 (e.g., 312a, 312b, 312c, etc.). Each data block 310 can include a sequence of color bits 316 of different colors that represent pixels in the frame, such as in RGB format. In examples, the color bits 316 are also grouped into equal size observation blocks that form each data block 310. The different colors are displayed by time multiplexing according to the order of the color bits 316 in the received data blocks 310. Each data block 310 of image data can represent a frame in a sequence of frames, such as video frames. In other examples, each data block 310 represents a certain number of frames or other portions of image data. The data blocks 310 have the same size and can be received in regular time intervals 312. The start of each time interval 312 is signaled by a respective synchronization signal 314, such as video synchronization signal (VSync) in FIG. 3 or a frame start synchronization signal (Fsync). The synchronization signals 314 are useful to determine a frame rate for displaying and viewing a sequence of frames. For example, the start of the time intervals 312a, 312b, and 312c are signaled by respective synchronization signals 314a, 314b, and 314c.

The memory controller 181 splits each current data block 310 from the processor 176 into a certain slice count of frame slices 304. The frame slices 304 can be ordered in a certain order, such as based on the positions of pixels of the frame slices 304 in the frame. The order is indicated by respective frame slice numbers of the frame slices 304. The memory controller 181 stores the frame slices 304 in the frame buffer 302 by writing each frame slice 304, according to the order of respective frame slice numbers, to a respective buffer slice 306. The buffer slices 306 are also arranged in an ordered sequence. In examples, the frame slices 304 can be received and written to the frame buffer 302 each frame slice 304 at a time, each a certain number of frame slices 304 at a time, or each observation block of a frame slice 304 at a time. For example, the rolling buffer controller 182 can update a count of the written observation blocks to track the number of written frame slices 304. Each next frame slice 304 in a data block 310 is written to a next free buffer slice 306 in this ordered sequence. After writing a frame slice 304 in the last buffer slice 306 in the ordered sequence of buffer slices 306, the frame buffer 302 is rolled back to the first buffer slice 306 in the ordered sequence to write a next frame slice 304 from the data blocks 310.

The memory controller 181 reads the written frame slices 304 from the buffer slices 306 and transmits the frame slices

304 to the display device 110. To read the written frame slices 304, the rolling buffer controller 182 can receive buffer update requests 318 at respective time intervals 312 from the memory controller 181 or other controllers of the display system 100. The rolling buffer controller 182 generates a read-side snapshot of buffer parameters in response to the buffer update requests 318 to provide memory addresses for reading written frame slice 304. The memory controller 181 reads the image data of the written frame slice 304 according to the memory addresses.

At each buffer update request 318, buffer parameters are copied to a read-side snapshot to track the buffer slices 306 in the frame buffer 302 that store the written frame slices 304 of the data blocks 310. The buffer update request 318 is sent to the rolling buffer controller 182 to generate a read-side snapshot of buffer parameters after writing a new frame slice 304 to the frame buffer 302. The buffer update request 318 can be sent from the memory controller 181 or any controller in the display system 100 that is configured for timing the display of image data by the display device 110. For example, buffer update requests 318 can be sent based on a color cycle in RGB format by a controller 170 of the display device 110 to the rolling buffer controller 182 of the memory controller 181. In examples, the buffer update requests are provided according to a certain rate of buffer update requests in regular buffer update intervals 320. For example, the buffer update requests 318 include a buffer update request for each frame, each color cycle, each bit frame, or each bit slice. Accordingly, the buffer update requests can be performed for each frame, for each certain number of frames, for each frame slice (as shown in FIG. 3), for each color cycle in a data block 310, for each bit frame in the data block 310, or for each bit slice in the data block 310. The memory controller 181 fetches a written frame slice 304 from the memory 180 according to a memory address provided by a read controller of the rolling buffer controller 182 based on the read-side snapshot buffer parameters. The memory address indicates the location of the buffer slice 306 that stores the written frame slice 304.

The light modulator 140 of the display device 110 is configured to receive the written frame slices 304 and project a slice count of frame slices 304 to display an image. To form the displayed image, a total number of frame slices 304 displayed by the display device 110 at a time is equal to the slice count. Each received frame slice 304 of a frame is loaded on the light modulator 140 in the same area of a previously loaded frame slice 304 that has the same frame slice number in a previous frame. The frame slices 304 are loaded according to the order of the frame slice numbers on respective areas of the light modulator 140 that are associated with the frame slice numbers. Each loaded frame slice 304 replaces, at a time, the previously loaded frame slice 304 in the same area on the light modulator 140 and across the image formed by projecting a slice count of frame slices 304. Replacing each frame slices 304 at a time across the displayed image is referred to herein as scrolling the image. After replacing the frame slice 304 across the displayed image, the buffer slice 306 which stores the replaced frame slice 304 is free to store a next frame slice.

For example, after receiving a first data block 310a, the memory controller 181 writes a first frame slice 304a of a first data block 310a to a first buffer slice 306 in the ordered sequence of buffer slices 306. The first data block 310a can be a first data block 310 in a sequence of data blocks 310, such as a first frame in a sequence of frames to be displayed. The first data block 310a is received in a respective time interval 312a, which is signaled by a respective synchronization signal 314a. The memory controller 181 continues to write the remaining frame slices 304a of the first data block 310a, according to the order of respective frame slice numbers, to respective buffer slices 306 in the ordered sequence of buffer slices 306. The memory controller 181 sends a write request to a write controller of the rolling buffer controller 182 to provide a memory address for writing each next frame slice 304a of the first data block 310a. The buffer parameters can be updated in response to each write request and each synchronization signals 314. In examples, the rate of the buffer update requests 318 can also match the rate of write requests for writing the frame slices 304 to the frame buffer 302, as shown in FIG. 3. In other examples, the rate of the buffer update requests 318 can be slower than the rate of writing the frame slices 304. In an example shown in FIG. 3, the slice count of frame slices 304 is equal to the number of buffer slices 306, and the rolling buffer controller 182 rolls back the frame buffer 302 after writing a last frame slice 304a of the first data block 310a to the last buffer slice 306 in the ordered sequence of buffer slices 306.

The memory controller 181 also sends read requests to a read controller of the rolling buffer controller 182 to provide a memory address for reading each written frame slice 304a of the first data block 310a. The read controller tracks the buffer slices 306 that store the written frame slices 304a in the frame buffer 302 by obtaining a read-side snapshot of the buffer parameters in response to a buffer update request 318. In response to the read request, the read controller provides the memory controller 181 with the memory address of the buffer slice 306 that stores the written frame slice 304a. The memory controller 181 reads the written frame slice 304a from the frame buffer 302, by fetching the frame slice data from the memory address in the memory 180, and transmits the frame slice 304a to the display device 110. The display device 110 loads a slice count of the frame slices 304a onto the light modulator 140, which projects and displays the frame slices 304a in a manner of scrolling the displayed image.

The memory controller 181 receives a second data block 310b. The second data block 310b is a second data block 310 of image data after the first data block 310a in the sequence of data blocks 310. For example, the second data block 310b is a second frame after a first frame in a sequence of frames. The second data block 310b is received in a respective time interval 312b, which is signaled by a respective synchronization signal 314b. The memory controller 181 writes a first frame slice 304b of the second data block 310b to the first free buffer slice 306 after rolling back the frame buffer 302. The memory controller 181 continues writing the remaining frame slices 304b from the second data block 310b to the next free buffer slices 306 of the frame buffer 302. During the time of writing the frame slice 304b, the memory controller 181 also continues reading the written frame slices 304a from the frame buffer 302 according to respective buffer update requests 318, and transmits the written frame slices 304 to the display device 110.

The display device 110 loads the transmitted frame slices 304b on the light modulator 140, replacing the frame slices 304a in the order received from the rolling buffer controller 182. Each frame slice 304b replaces at a time a previously loaded frame slice 304a with a matching frame slice number in the same area on the light modulator 140. The frame slice numbers determine the order of replacing the frame slices 304a by the frame slices 304b and of scrolling the frame slices 304b across the displayed image. For example, the loaded frame slices 304b are horizontal frame slices that replace the frame slices 304a with matching frame slice numbers in a direction from top to bottom on the light modulator 140 and across the displayed image. In other examples, the loaded frame slices 304b are vertical frame slices that replace the frame slices 304a with matching frame slice numbers in a direction from left to right on the light modulator 140 and across the displayed image.

Scrolling the displayed image continues for each frame slice 304 of a next data block 310 (e.g., next frame). For example, if a third data block 310c is received in a respective time interval 312c, which is signaled by a respective synchronization signal 314c, the writing and reading operations of the rolling buffer operation 300 are repeated to display the frame slices 304c of the third data block 310c and replace the frame slices 304b of the second data block 310b in a scrolling manner across the displayed image.

In the rolling buffer operation 300, the display system 100 scrolls the displayed image by reading each frame slice 304 at a time with a smaller latency than a full frame size delay of the double buffer operation. Scrolling the displayed image can also cause visual artifacts in the displayed image which are visible to the HVS, such as noticeable boundaries between frame slices 304 across the displayed image, also referred to herein as image tearing. In examples, image tearing can be reduced by adding dither noise to the image data, according to a certain dither rate, and projecting the frame slices 304 or the frames with a certain display rate according to the dither rate. The dither noise can be added by the processor 176 during the processing of the frames or after reading the frame slices 304 from the frame buffer 302.

FIGS. 4A-4D are diagrams of a rolling buffer operation 400 for writing and reading frame slices in buffer slices 425 of a frame buffer 426, in accordance with various examples. For example, the frame buffer 426 can be part of the memory 180 of the display system 100, where each frame (e.g., in a sequence of frames) is split into a certain slice count of frame slices. The number of buffer slices 425 is greater than the slice count of the frame slices in the frame. If the number of buffer slices 425 is also less than two times the slice count, the memory size of the frame buffer 426 is less than the memory size of the double buffer operation.

For example, the slice count of frame slices in the frame is equal to 4 and the number of buffer slices 425 is equal to 5, as shown in FIGS. 4A-4D. The five buffer slices 425 include the buffer slices 425a, 425b, 425c, 425d, and 425e in an ordered sequence in the frame buffer 426. The frame slices represent four respective portions of the frame that can each be stored in a buffer slice 425. The frame slices can represent portions such as horizontal or vertical slices of an image. The portions of the image are associated with the respective frame slice numbers of the frame slices. For example, a top horizontal slice of the image is associated with a frame slice number 1, a second top horizontal slice of the image is associated with a frame slice number 2, a third horizontal slice from the top of the image is associated with a frame slice number 3, and a bottom horizontal slice of the image is associated with a frame slice number 4. In other examples, the slice count and the number of buffer slices can have other values.

Figure 4A:
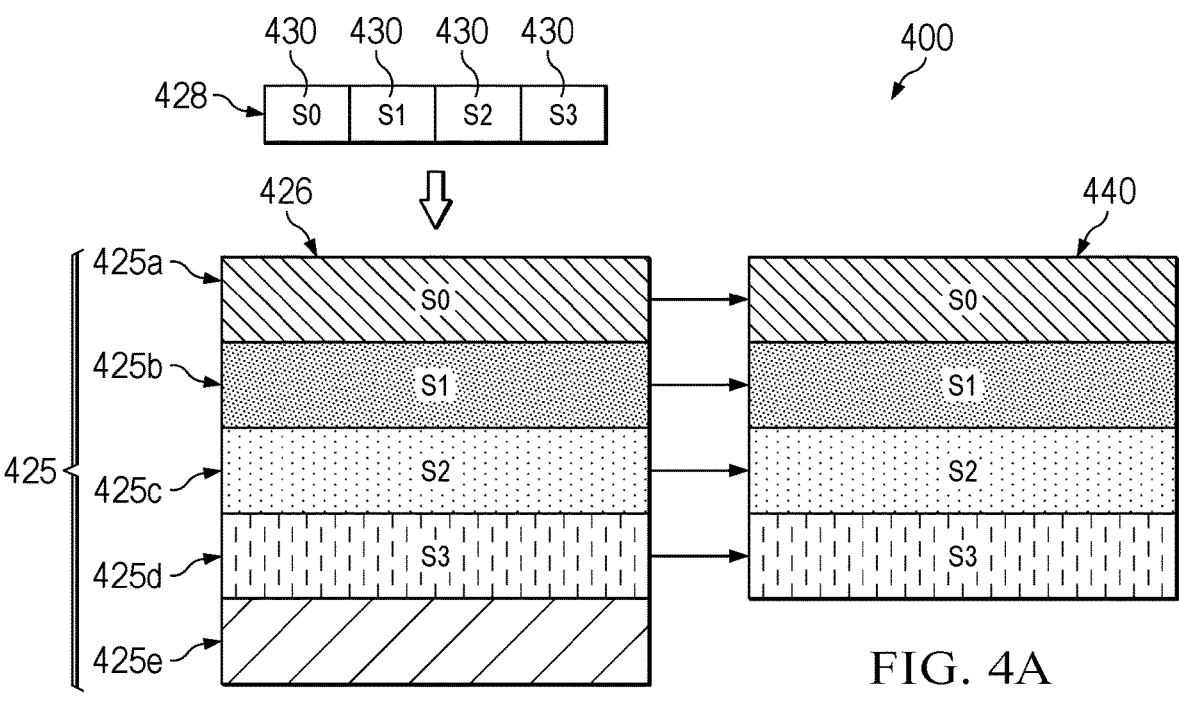
FIGS. 4A-4D are diagrams of a rolling buffer operation for writing and reading frame slices in buffer slices of a frame buffer, in accordance with various examples.

In FIG. 4A, a first frame 428 in a sequence of frames is split into four frame slices 430, labeled as S0-S3. The frame slices 430 are ordered in a certain order, such as according to the positions of pixels of the frame slices 430 in the first frame 428. The memory controller 181 writes the ordered frame slices 430 to the ordered sequence of buffer slices 425a, 425b, 425c, and 425d, respectively. Each frame slice 430 is written, according to the respective frame slice number, to a next free buffer slice 425 in the ordered sequence of buffer slices 425 based on a memory address provided by a write controller of the rolling buffer controller 182 in response to a write request. The buffer slices 425 can be free of data before writing the frame slices S0-S3.

The memory controller 181 also sends read requests to a read controller of the rolling buffer controller 182 to locate the written frame slices S0-S3 from the frame buffer 426. The written frame slices S0-S3 are read from respective buffer slices 425 based on memory addresses provide by the read controller, and sent to the display device 110. At the display device 110, the frame slices S0-S3 are loaded on a surface 440 of the light modulator 140 based on the respective frame slice numbers, which projects the frame slices S0-S3 onto respective areas of the image projection surface 130 to display the first frame 428. To form the displayed image, the frame slices S0-S3 are displayed at a same time on the image projection surface 130. For example, the frame slice S0 with a frame slice number 0 is loaded at a top area of the surface 440 and accordingly displayed as the top slice of the first frame 428, and the frame slice S3 with a frame slice number 3 is loaded at a bottom area of the surface 440 and accordingly displayed as the bottom slice of the first frame 428.

Figure 4B:
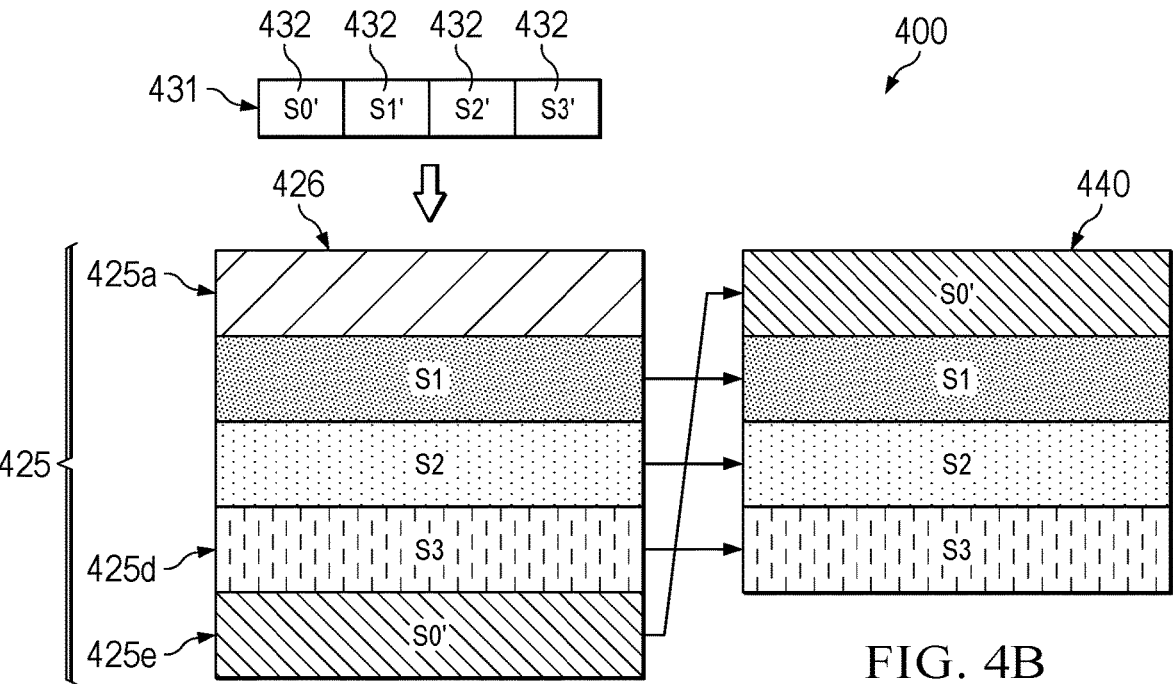

In FIG. 4B, a second frame 431 received after the first frame 428 in the sequence of frames is split into frame slices 432, labeled S0'-S3'. The memory controller 181 writes the first frame slice S0' of the second frame 431 to a next free buffer slice 425e in the ordered sequence of buffer slices 425. The write controller of the rolling buffer controller 182 locates the buffer slice 425e in the frame buffer 426 after the buffer slice 425d which stores the last received frame slice S3 of the first frame 428. In response to a read request, the read controller obtains the location of the buffer slice 425e to enable the memory controller 181 to read and transmit the new written frame slice S0' of the second frame 431 to the display device 110, where the frame slices S0, S1, S2, and S3 of the first frame 428 are previously loaded on the surface 440. The first frame slice S0' of the second frame 431 is loaded on the surface 440 in the area of the previously loaded first frame slice S0 of the first frame 428 which has a matching frame slice number (e.g., frame slice number 0). The light modulator 140 then projects the frame slice S0' of the second frame 431 onto the image projection surface 130, which replaces the first frame slice S0 of the first frame 428 in the same position of the image projection surface 130. The frame slice S0' is projected at a same time with the frame slices S1, S2, and S3 of the first frame 428 maintaining a displayed image on the image projection surface 130. The frame slice S0' of the second frame 431 and the frame slice S1-S3 of the first frame 428 that are displayed at the same time have different frame slice numbers. After replacing the frame slice S0 of the first frame 428 with the frame slice S0' of the second frame 431, the buffer slice 425a storing the frame slice S0 is free for writing a next frame slice.

Figure 4C:
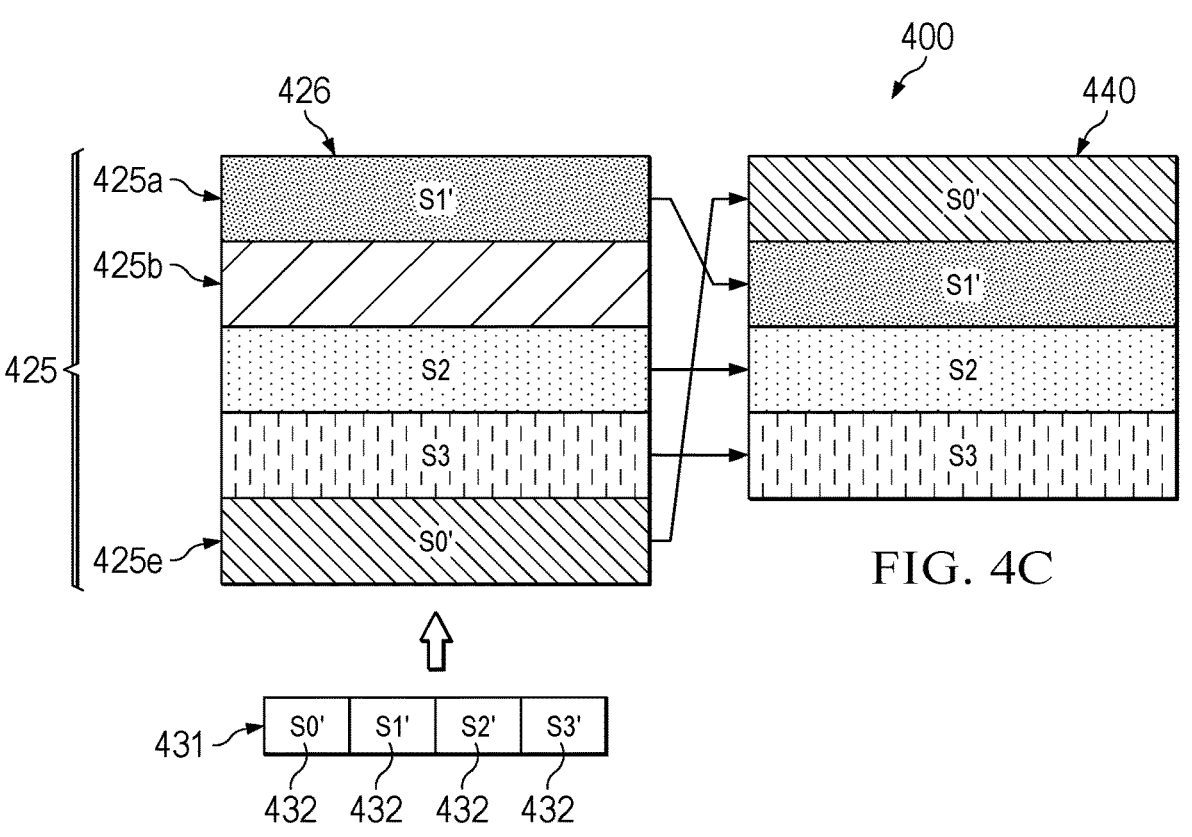

In FIG. 4C, the memory controller 181 receives and writes a second frame slice S1' of the second frame 431 to the free buffer slice 425a, which is the next buffer slice after the last buffer slice 425e in the ordered sequence buffer slices 425. According to the rolling buffer operation 400, the frame buffer 426 is rolled back to the first buffer slice 425a in the ordered sequence of buffer slices 425 after writing a frame slice in the last buffer slice 425e. The memory controller 181 reads and transmits the new written frame slice S1' of the second frame 431 from the buffer slice 425a to the display device 110, where the frame slices S1, S2, and S3 of the first frame 428 and the frame slice S0' of the second frame 431 are previously loaded on the surface 440. The second frame slice S1' of the second frame 431 is loaded on the surface 440 in the area of the previously loaded second frame slice S1 of the first frame 428. Accordingly, the light modulator 140 projects the frame slice S1' of the second frame 431 simultaneously with the frame slices S2 and S3 of the first frame 428 and the frame slice S0' of the second frame 431 onto the image projection surface 130. The frame slices S0'-S1' of the second frame 431 and the frame slices S2-S3 of the first frame 428 that are displayed at a same time have different frame slice numbers. The buffer slice 425b which stores the previously displayed and replaced frame slice S1 is free for writing a next frame slice.

Figure 4D:
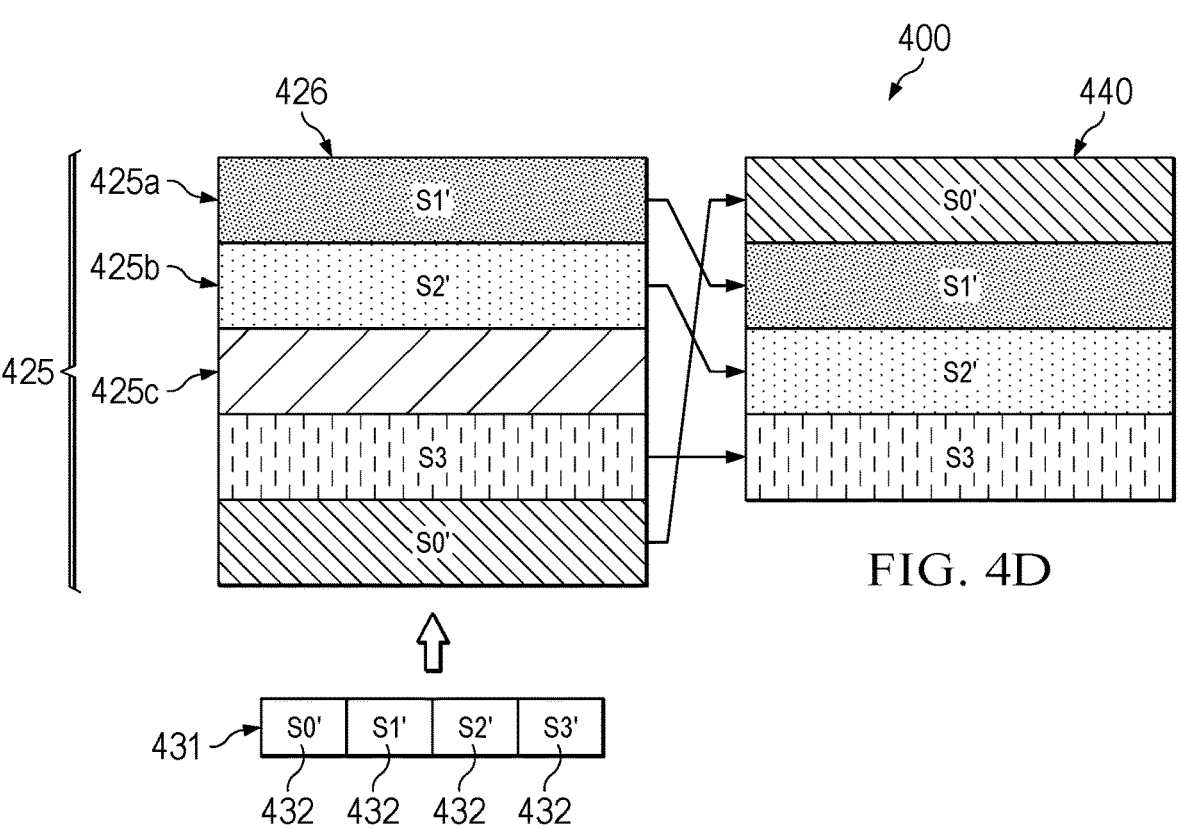

In FIG. 4D, the memory controller 181 writes a third frame slice S2' of the second frame 431 to the free buffer slice 425b, which is the next buffer slice after the first buffer slice 425a in the ordered sequence of buffer slices 425. The memory controller 181 reads and transmits the new written frame slice S2' of the second frame 431 to the display device 110, where the frame slices S2 and S3 of the first frame 428 and the frame slices S0' and S1' of the second frame 431 are previously loaded on the surface 440. The third frame slice S2' of the second frame 431 is loaded on the surface 440 in the area of the previously loaded third frame slice S2 of the first frame 428. Accordingly, the light modulator 140 projects the frame slice S2' simultaneously with the frame slice S3 of the first frame 428 and the frame slices S0' and S1' of the second frame 431. The frame slice S0'-S2' of the second frame 431 and the frame slice S3 of the first frame 428 that are have different frame slice numbers. The buffer slice 425c which stores the frame slice S2 is then free to write a next frame slice.

By projecting the frame slices S0', S1' and S2' of the second frame 431 on the image projection surface 130 in the same positions of the previously displayed frame slices S0, S1, and S2 of the first frame 428, each frame slice at a time, the frame slices 432 of the second frame 431 scroll across the displayed image replacing the frame slices 430 of the first frame 428. The memory controller 181 can repeat the same writing and reading operations to display in a scrolling manner a fourth frame slice (not shown) of the second frame 431 and frame slices of next frames in the sequence of frames. The frame slices of the frames can be projected at a certain rate and a certain time overlap to allow the HVS to perceive the scrolling frame slices of each frame simultaneously as a single frame.

FIG. 5 is a flow diagram of a method 500 of a rolling buffer operation for writing and reading frame slices, in accordance with various examples. For example, the method 500 is performed by the memory controller 181, including the rolling buffer controller 182, in the rolling buffer operation 400 to store and display a sequence of frames, such as the frames 428 and 431, in the buffer slices 425 of the frame buffer 426 at the memory 180. At step 510, the memory controller 181 splits a frame in the sequence of frames into a slice count of frame slices according to an order of respective frame slice numbers. Each frame slice is a respective portion of the frame and includes respective pixels that represent a portion of an image associated with the respective frame number. At step 520, the memory controller 181 partitions the memory 180 into a number of buffer slices in an ordered sequence. The number of buffer slices can be greater than or equal to the slice count of the frame slices.

At step 530, the memory controller 181 writes a frame slice in the sequence of frames to a next free buffer slice in the ordered sequence of buffer slices. The memory controller 181 can receive and write the image data of frame slices each observation block, frame slice, or certain number of frame slices at a time, and writes the image data of each respective frame slice to a next free buffer slice in the frame buffer. At step 540, the memory controller 181 reads a written frame slice to the display device 110 to display the written frame slice with other displayed frame slices according to the order of the respective frame slice numbers. The reading and writing operations in steps 530 and 540 can be performed at a same time for frame slices of different frames in the sequence of frames, and may not be synchronized in time. For example, frame slices of each frame can be written to the frame buffer according to the incoming rate of received image data of the frame slice in the sequence of frames. At a same time, written frame slices of a previous frame can be read from the frame buffer according to buffer update requests issued by a controller to manage time multiplexing for displaying the colors in the projected image. The time multiplexing for displaying the colors of the image can be asynchronous to the incoming rate of received and written frame slices. The memory controller 181 reads each frame slice written in a respective buffer slice and transmits the frame slice to the display device 110, which loads the frame slice on a respective surface area of the light modulator 140 according to the frame slice number of frame slice. Accordingly, the frame slice is projected on a respective position on the image projection surface 130 to display a portion of an image. The display device 110 loads a slice count of frame slices in respective areas on the light modulator 140 and the light modulator 140 projects the slice count of loaded frame slices at a same time to display the image on the image projection surface 130. The frame slices are displayed by scrolling the image displayed by the display device 110 according to the order of the respective frame slice numbers. The scrolling of the image is restarted at each first frame slice of a next frame. At step 550, the memory controller 181 returns to a first buffer slice in the ordered sequence after writing a frame slice in a last buffer slice in the ordered sequence. For example, after writing the first frame slice S0' of the second frame 431 in the last buffer slice 425e, the rolling buffer controller 182 rolls back the frame buffer 426 to the first buffer slice 425a to write the second frame slice S1' of the second frame 431.

FIGS. 6A-6E are diagrams of a rolling buffer operation 600 for tracking buffer slices 605 to write frame slices, in accordance with various examples. For example, a frame buffer 610 can be part of the memory 180 of the display system 100, where the memory controller 181 splits each frame (e.g., in a sequence of frames) into a certain slice count of respective frame slices. The number of buffer slices 605 is greater than the slice count of the frame slices in the frame. For example, the slice count of frame slices in the frame is equal to 5 and the total number of buffer slices 605 is equal to 7, as shown in FIGS. 6A-6E. In other examples, the slice count and the number of buffer slices can have other values.

A write controller of the rolling buffer controller 182 is configured to track, according to buffer parameters, the buffer slices 605 which enables the memory controller 181 to write frame slices in the frame buffer 610 according to the ordered sequence of buffer slices 605. In FIGS. 6A-6E, the buffer slices 605 are labeled by respective buffer slice numbers 0-6 that indicate the ordered sequence of buffer slices 605. The buffer slice numbers indicate address values or respective memory addresses for storing frame slices in the memory 180. For example, the buffer slice numbers can be translated by a certain address function into respective memory addresses of the memory 180. The buffer parameters include a current frame start buffer slice 606, a previous frame start buffer slice 607, and a written frame slices count 608. The buffer parameters can be maintained in the memory 180 by the rolling buffer controller 182. The current frame start buffer slice 606 is set to indicate the buffer slice 605 storing the first frame slice of a current frame in the frame buffer 610. The current frame start buffer slice 606 is set to the buffer slice number of this buffer slice 605 according the ordered sequence of buffer slices 605. The write controller updates the current frame start buffer slice 606 for each received new frame. The previous frame start buffer slice 607 indicates the buffer slice 605 storing the first frame slice of the previous written frame in the frame buffer 610. The previous frame start buffer slice 607 is set to the value of the current frame start buffer slice 606 after updating the current frame start buffer slice 606 for each new frame. The write controller also increments the written frame slices count 608 each time a frame slice of the current frame is written to the frame buffer 610 and resets the written frame slices count 608 to 0 for each new frame. The sum of the current frame start buffer slice 606 and the written frame slices count 608 can indicate the next free buffer slice 605 in the frame buffer 610 to write the next frame slice. Before writing frame slices to the frame buffer 610, the current frame start buffer slice 606, the previous frame start buffer slice 607, and the written frame slices count 608 are initialized to 0.

Figure 6A:
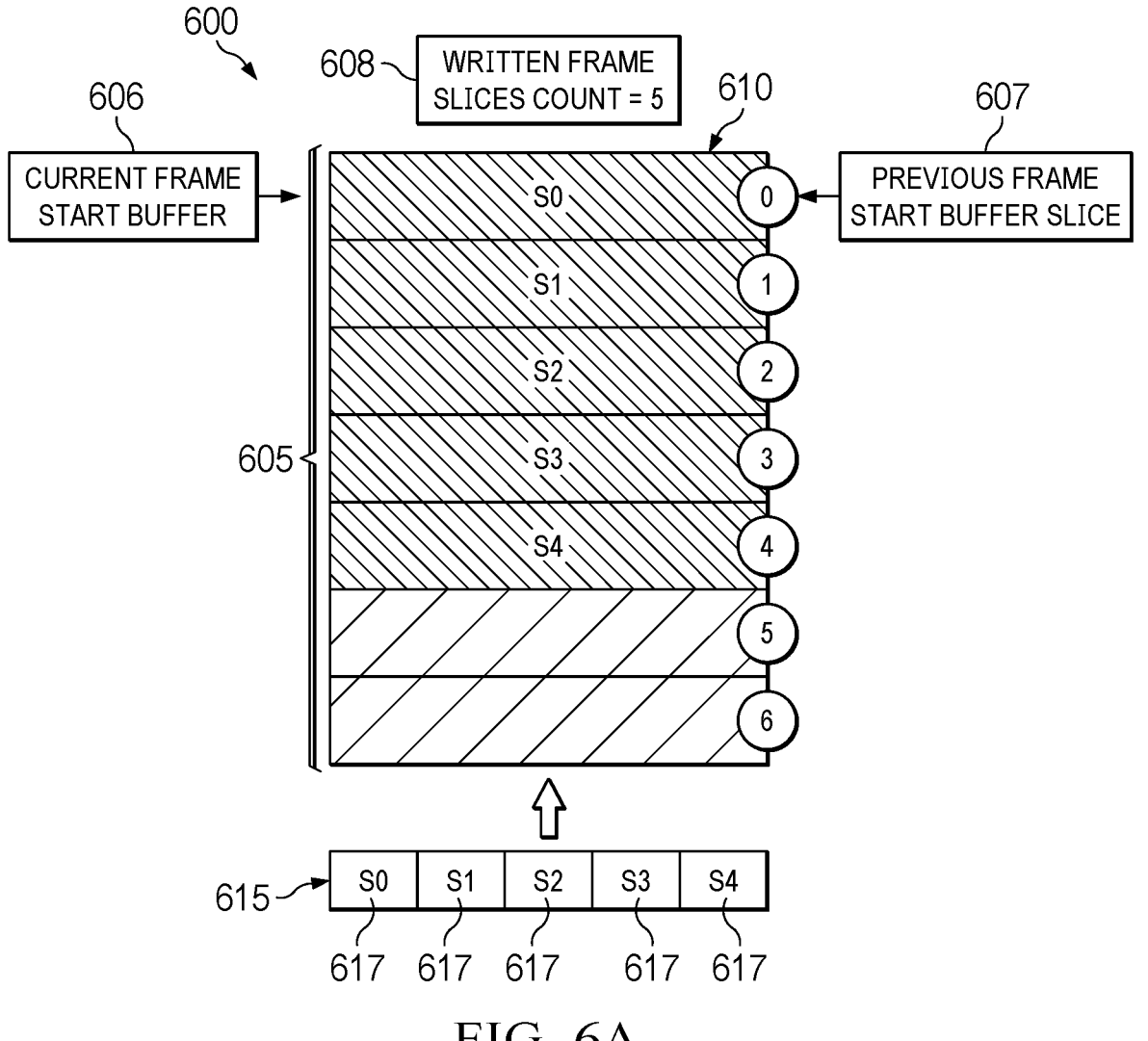
FIGS. 6A-6E are diagrams of a rolling buffer operation for tracking buffer slices to write frame slices, in accordance with various examples.

In FIG. 6A, the memory controller 181 receives a first frame 615 in a sequence of frames and splits the first frame 615 into a slice count of five frame slices 617 labeled S0-S4, which are ordered in a certain order, such as according to the positions of pixels of the frame slices 617 in the first frame 615. The ordered frame slices 617 are indicated by respective frame slice numbers. The memory controller 181 writes the ordered frame slices 617 to the ordered sequence of buffer slices 605. Each of the frame slices 617 is written, according to the respective frame slice number, to a next free buffer slice 605 in the ordered sequence of buffer slices 605. As shown in FIG. 6A, the five frame slices S0-S4 are written to the buffer slices 605 with the buffer slice numbers 0-4, respectively. The two remaining buffer slices 605 with the buffer slice numbers 5-6 are free. In the ordered sequence of buffer slices 605, the first buffer slice 605 with the buffer slice number 0 stores the first frame slice S0 of the first frame 615. Accordingly, the write controller can update the current frame start buffer slice to the buffer slice number 0 to indicate the frame buffer slice 605 storing the first frame slice S0 in the frame buffer 610. The write controller also increments the written frame slices count 608 by 1 each time a frame slice 617 is written to a buffer slice 605. The written frame slices count 608 is updated to 5 after writing the five frame slices S0-S4.

Figure 6B:
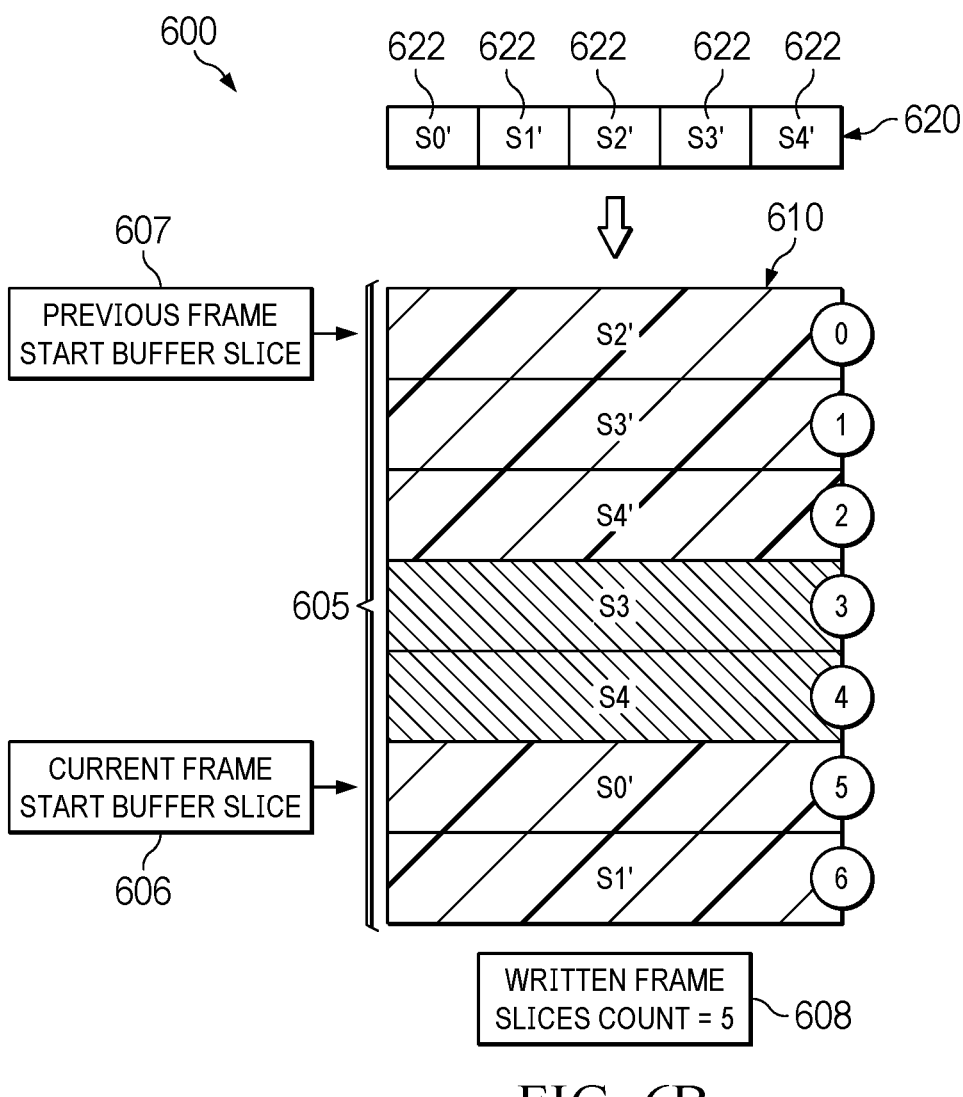

In FIG. 6B, the memory controller 181 receives a second frame 620 in the sequence of frames and splits the second frame 620 into a slice count of five frame slices 622 labeled S0'-S4', which are ordered by respective frame slice numbers. The memory controller 181 writes the frame slices 622 to the ordered sequence of buffer slices 605 starting from the next free buffer slice 605. The next free buffer slice 605 in the frame buffer 610 is indicated by a buffer slice number equal to the sum of the current frame start buffer slice 606 and the current written frame slices count 608, which is equal to 0 before writing the first frame slice of each received frame. Accordingly, the write controller updates the current frame start buffer slice 606 for the second frame 620 with the buffer slice number 5 to indicate the buffer slice 605 for writing the first frame slice S0' of the second frame 620. The write controller also updates the previous frame start buffer slice 607 with the previous value 0 of the current frame start buffer slice 606. The written frame slices count 608 is also reset to 0 before writing the frame slices 622 of the second frame 620. According to the updated buffer parameters, the memory controller 181 writes the first frame slice S0' to the free buffer slice 605 with the buffer slice number 5, writes the second frame slice S1' to the next free buffer slice 605 with the buffer slice number 6, and writes the remaining frame slices S2'-S4' by rolling back the frame buffer 610. After writing the second frame slice S1' to the last buffer slice 605 in the ordered sequence of buffer slices, the frame buffer 610 is rolled back, such as by setting a counter, which indicates the next free buffer slice number, to zero. As shown in FIG. 6B, the frame slices S0'-S4' are written respectively to the buffer slices 605 with the buffer slice numbers 5-6 and 0-2. The write controller also updates the written frame slices count 608 (increments the written frame slices count 608 by 1) after writing each of the five frame slices S0'-S4' to respective frame buffer slice 605. After writing the frame slice S4', the written frame slices count 608 is equal to 5.

Figure 6C:
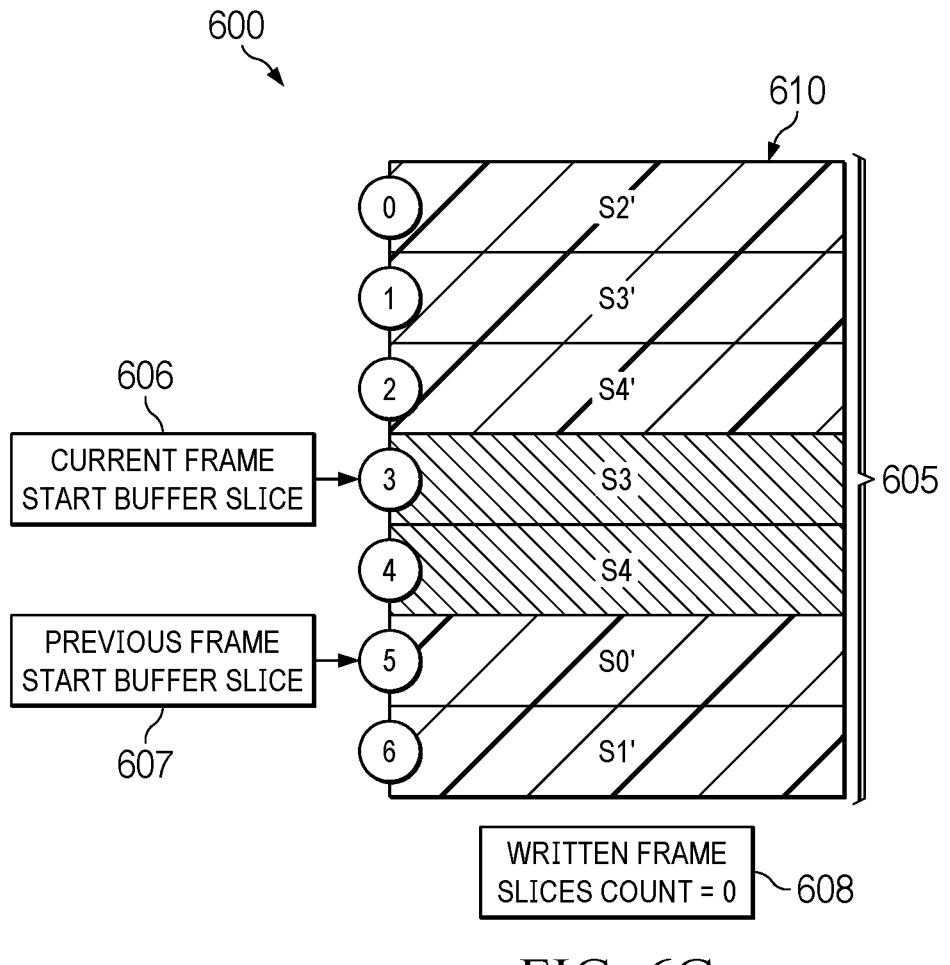

In FIG. 6C, the write controller updates the buffer parameters in response to a synchronization signal for receiving a next frame. Accordingly, the write controller updates the current frame start buffer slice 606 for the next frame slice with the buffer slice number 3. The write controller also updates the previous frame start buffer slice 607 with the previous value of the current frame start buffer slice 606, and resets the written frame slices count 608 to 0.

Figure 6D:
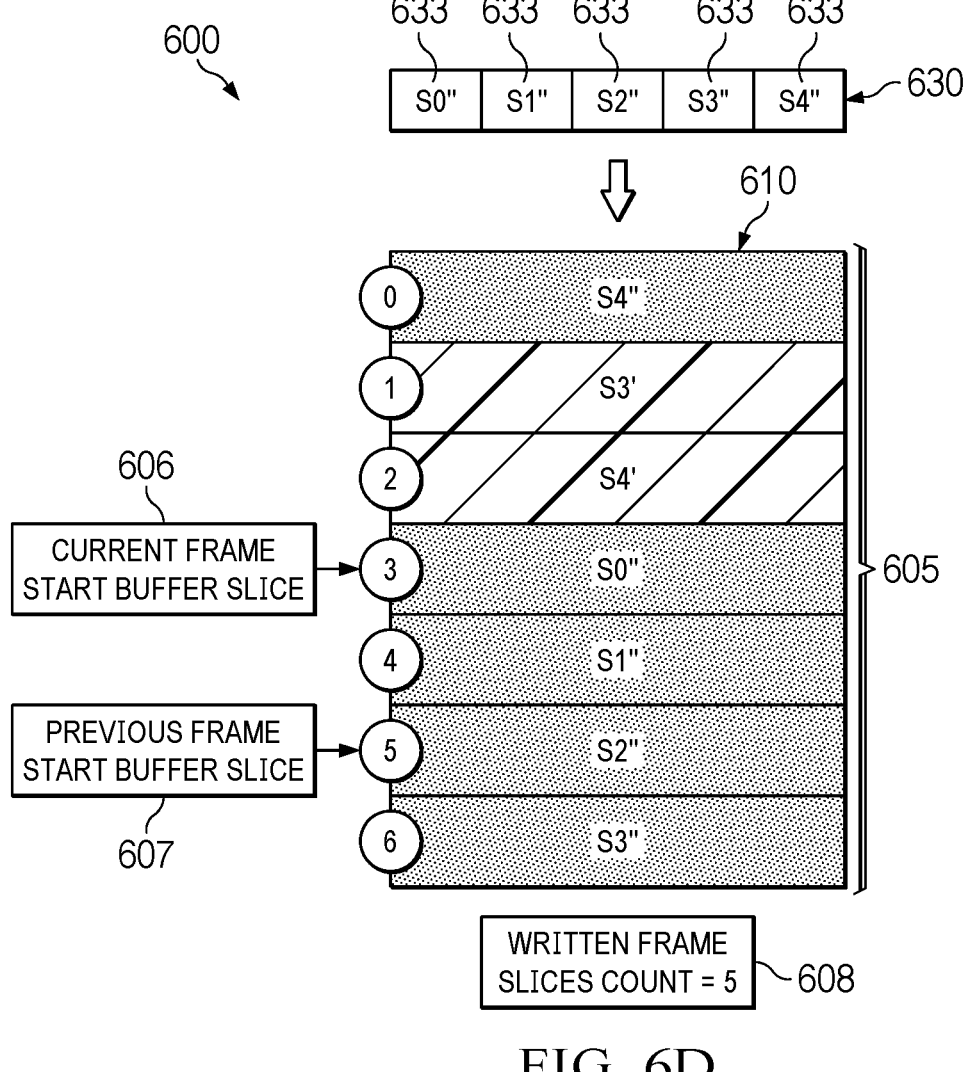

In FIG. 6D, the memory controller 181 receives a third frame 630 in the sequence of frames and splits the third frame 630 into a slice count of five frame slices 633 labeled S0"-S4" in FIG. 6D, which can be ordered according to the positions of pixels of the frame slices 633 in the third frame 630. The ordered frame slices 633 are indicated by respective frame slice numbers. The memory controller 181 writes the frame slices 633 starting at the next free buffer slice 605 indicated by the current frame start buffer slice 606, which is equal to 3. Accordingly, the memory controller 181 writes the frame slices S0"-S3" to the buffer slices 605 with the buffer slice numbers 3-6, respectively, and writes the remaining frame slice S4" by rolling back the frame buffer 610 to the first buffer slice 605 with the buffer slice number 0. After writing the five frame slices S0"-S4", the written frame slices count 608 is equal to 5.

Figure 6E:
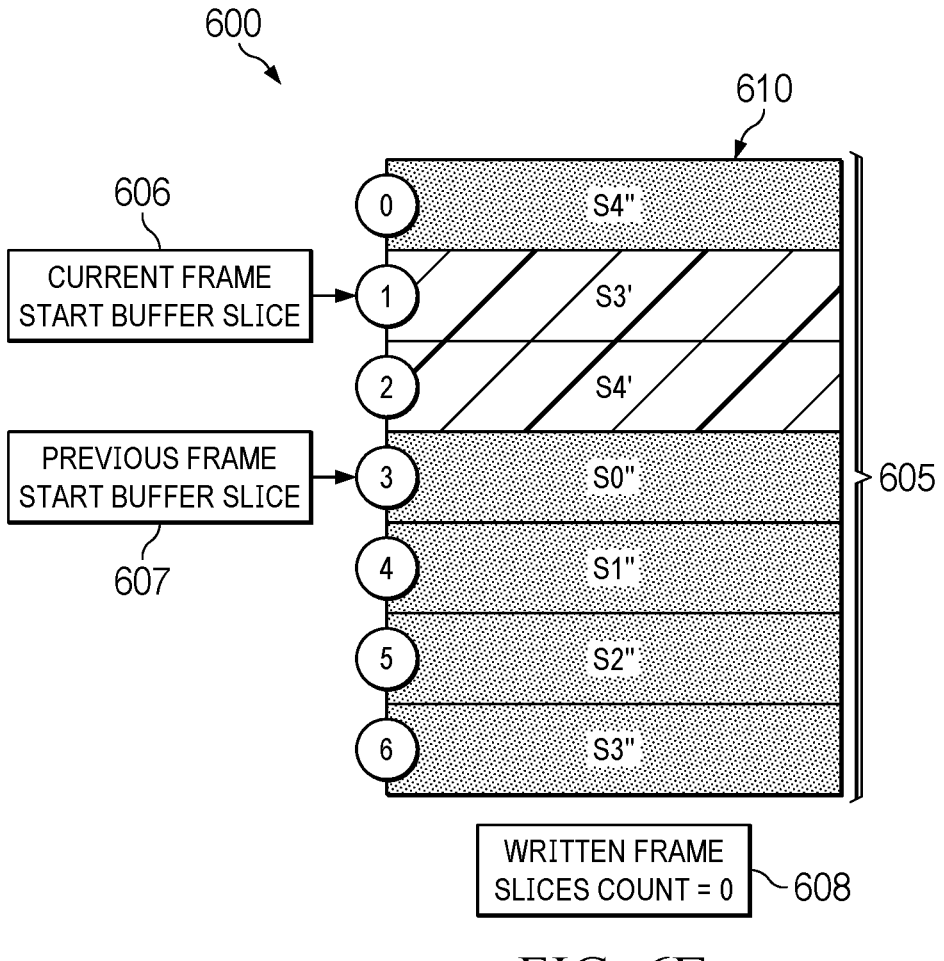

In FIG. 6E, the write controller updates, in response to a synchronization signal for receiving a next frame, the current frame start buffer slice 606 for the next frame slice with the buffer slice number 1. The write controller also updates the previous frame start buffer slice 607 with the previous value of the current frame start buffer slice 606, and resets the written frame slices count 608 to 0.

FIG. 7 is a flow diagram of a method 700 of a rolling buffer operation for tracking buffer slices to write frame slices, in accordance with various examples. For example, the method 700 is performed in the rolling buffer operation 600 by the memory controller 181 including the rolling buffer controller 182 for tracking the buffer slices 605 of the frame buffer 610 to write the frame slices in the sequence of frame slices 617, 622, and 633. At step 710, the memory controller 181 splits a frame in the sequence of frames containing image data into a slice count of frame slices. The frame slices can be ordered in a certain order, such as according to the positions of pixels of the frame slices in the frame. The ordered frame slices are indicated by respective frame slice numbers. At step 720, the write controller of the rolling buffer controller 182 initializes buffer parameters indicating a current frame start buffer slice, a previous frame start buffer slice, and a written frame slices count. For example, before writing the frame slices 617 of the first frame 615, the write controller initializes the current frame start buffer slice 606, the previous frame start buffer slice 607, and the written frame slices count 608 to 0.

At step 730, the memory controller 181 writes, according to the buffer parameters, a frame slice of the frame to a buffer slice of a frame buffer in a memory. For example, the frame slice is written to a buffer slice that has a buffer slice number based on the current frame start buffer slice and the written frame slices count. The buffer slice number can be equal to a sum of the current frame start buffer slice and the written frame slices count. At step 740, the write controller increments the written frame slices count after writing the frame slice. For example, the memory controller 181 starts writing the first frame slice S0 of the first frame 615 to the first buffer slice 605 with the buffer slice number 0, and the write controller increments the written frame slices count from 0 to 1 after the first frame slice S0 has been written to the buffer slice 605. Similarly, the memory controller 181 writes the first frame slice S0' of the second frame 620 to the buffer slice 605 with the buffer slice number 5, and writes the first frame slice S0" of the third frame 630 to the buffer slice 605 with the buffer slice number 3. The write controller increments the written frame slices count 608 to 5 after writing the five frame slices for each of the frames 615, 620, and 630.

At step 750, the memory controller 181 reads the written frame slice to the display device 110. The written frame is read from the frame buffer after generating a read-side snapshot of buffer parameters in response to receiving a buffer update request. The buffer slice storing the written frame slice from the previous frame is free for storing a next frame slice. The reading and writing operations in steps 730 and 750 can be performed simultaneously to write and read different frame slices in the frame buffer without time synchronization between the two operations. At step 760, the write controller updates the buffer parameters if the frame slice is a first frame slice of the frame. Updating the buffer parameters incudes setting the previous frame start buffer slice to the current frame start buffer slice and the current frame start buffer slice to the current buffer slice number, and initializing the written frame slices count to zero. For example, in response to a synchronization signal (e.g., Fsync or VSync), the write controller updates the current frame start buffer slice 606 with the value 5 before writing the first frame slice S0' of the second frame 620, and updates the current frame start buffer slice 606 with the value 3 before writing the first frame slice S" of the third frame 630. For each new frame, the write controller updates the current frame start buffer slice 606, updates the previous frame start buffer slice 607 with the previous value of the current frame start buffer slice 606, and resets the written frame slices count 608 to 0.

Figure 8:
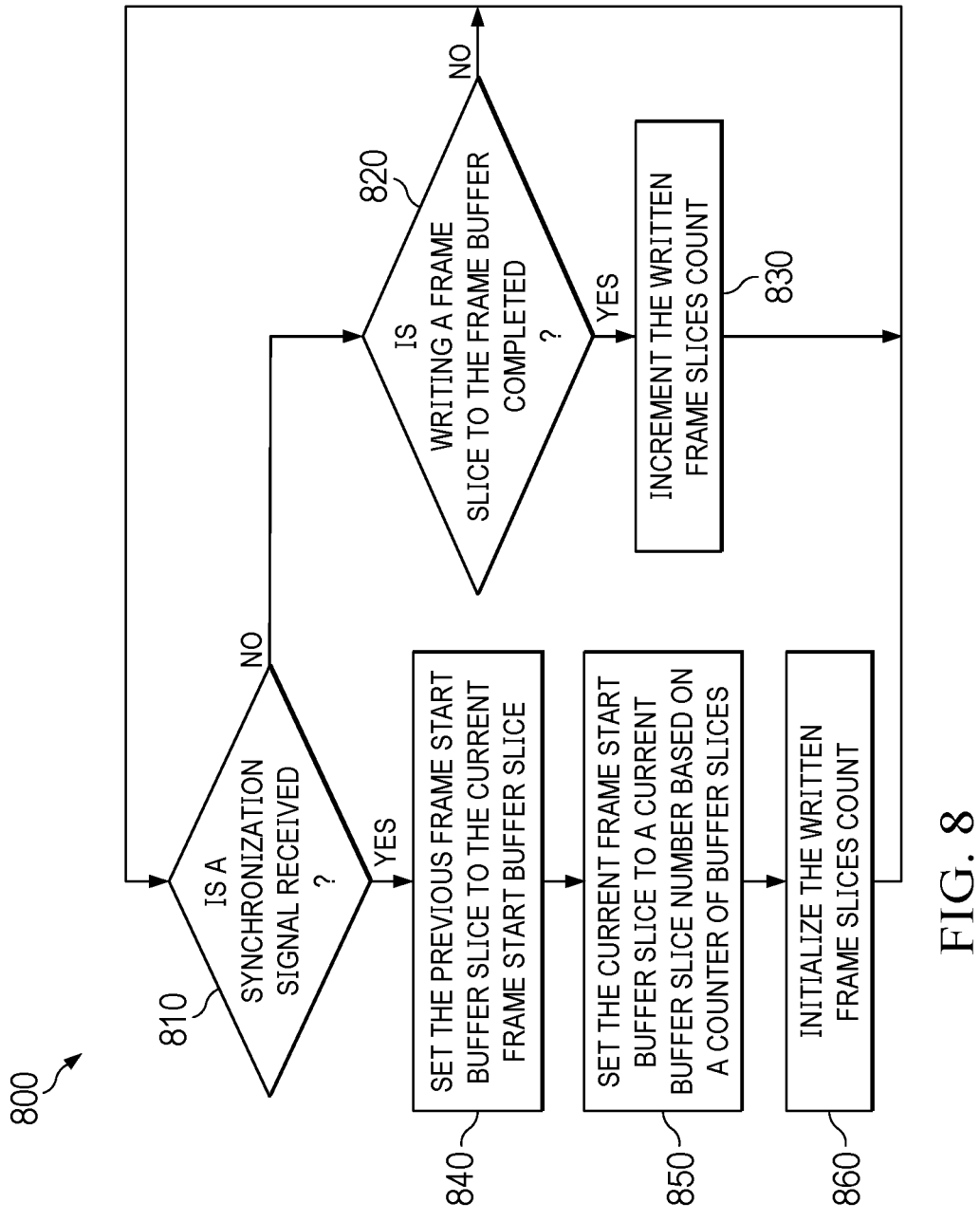
FIG. 8 is a flow diagram of a method of a rolling buffer operation for updating buffer parameters to write frame slices, in accordance with various examples.

FIG. 8 is a flow diagram of a method 800 of a rolling buffer operation for updating buffer parameters to track write frame slices, in accordance with various examples. For example, the method 800 is performed by the rolling buffer controller 182 in the memory controller 181, such as in the step 760 of the method 700, to update the buffer parameters of a frame buffer. The buffer parameters can include the current frame start buffer slice 606, the previous frame start buffer slice 607, and the written frame slices count 608 of the buffer operation 600 in the rolling buffer operation 600. In the method 800, the buffer parameters are updated if a synchronization signal that indicates a start of each frame is received at a respective time interval. The method 800 also includes incrementing the written frame slices count if writing a frame slice to the buffer slice is completed each time before receiving a synchronization signal for a next frame.

The method 800 can be performed in a number of steps as shown in FIG. 8. At step 810, the memory controller 181 determines if a synchronization signal is received. The memory controller 181 can receive, at respective time intervals, synchronization signals that indicate a start of each frame in a sequence of frames. If a synchronization signal is not received within a time interval, the memory controller 181 determines at step 820 if writing a frame slice to the frame buffer is completed. If writing the frame slice is completed, the write controller of the rolling buffer controller 182 increments at step 830 the written frame slices count, and the memory controller 181 continues to monitor for a next synchronization signal at step 810. If writing the frame slice is not completed, the memory controller 181 continues monitoring for a next synchronization signal at step 810, without incrementing the written frame slices count at step 830.

If a synchronization signal is received, the write controller of the rolling buffer controller 182 updates the buffer parameters at steps 840-860, and the memory controller 181 continues to monitor for a next synchronization signal at step 810. Updating the buffer parameters includes setting the previous frame start buffer slice to the current frame start buffer slice at step 840, setting the current frame start buffer slice to a current buffer slice number based on a counter of buffer slices at step 850, and initializing the written frame slices count to 0 at step 860. If at step 850 the frame buffer is rolled back after writing a frame slice to a last buffer slice in the ordered sequence of buffer slices, the current frame start buffer slice is updated to the first buffer slice in the frame buffer.

The method 800 or the rolling buffer operation 600 can cause visual artifacts in the displayed image if updating the buffer parameters by the write controller is not synchronized with reading the frame slices from the frame buffer. For example, if the buffer parameters are updated during fetching data for a read operation from the frame buffer, changing the buffer parameters can cause fetching the data from the wrong memory address and buffer slice. Accordingly, the light modulator 140 can project incorrect or out of order data across the displayed image causing visual artifacts. In examples, visual artifacts are mitigated by synchronizing the buffer parameter updates with reading operations to fetch frame slice data from the frame buffer. The synchronization is based on generating a read-side snapshot of the buffer parameters for reading frame slices to avoid a change of the buffer parameters by the write controller during the reading operation. Before generating the read-side snapshot, if a reading operation to fetch frame data from the frame buffer is detected to be in progress, generating the read-side snapshot is also delayed until completing data fetching.

Figure 9:
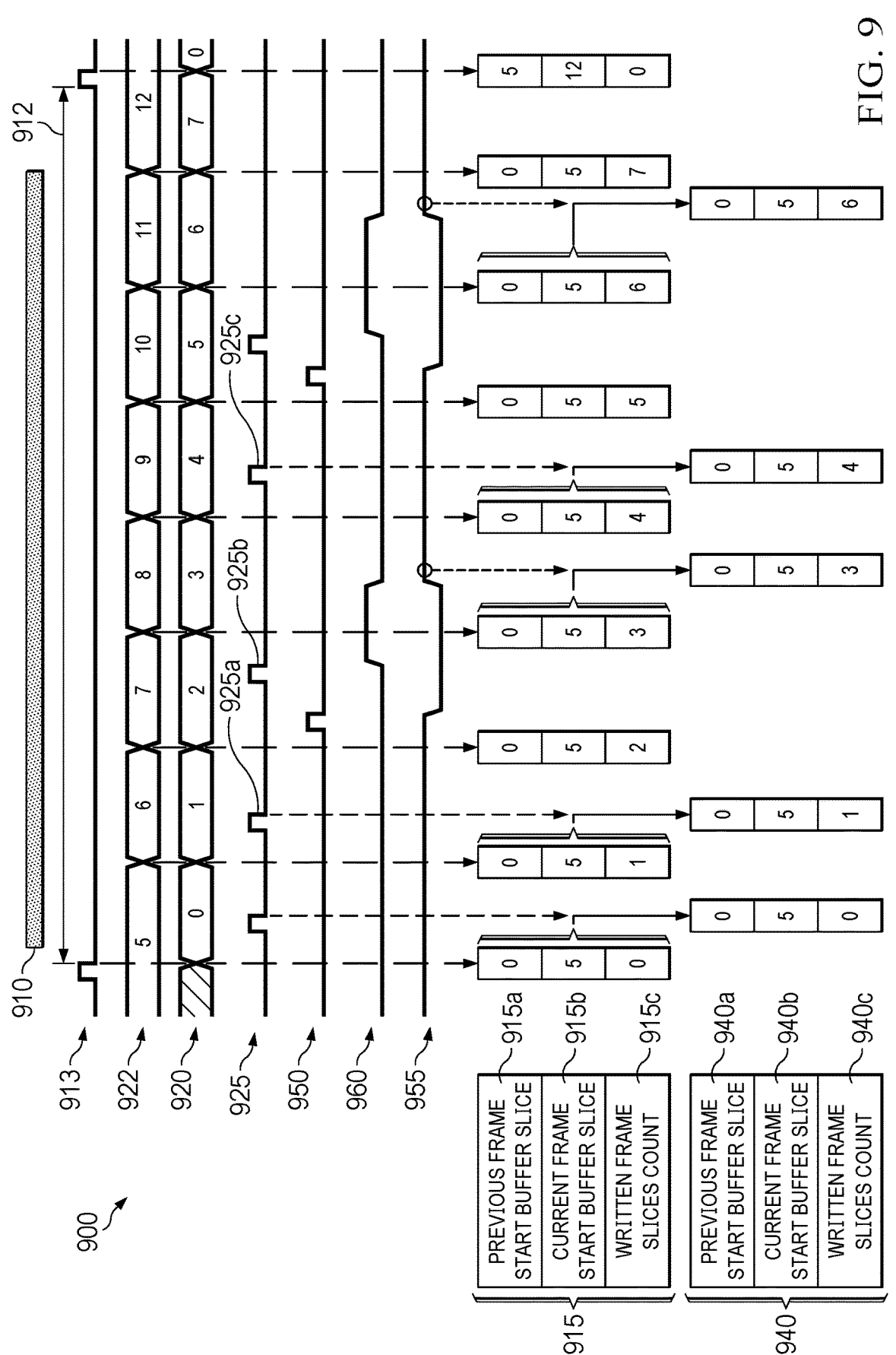
FIG. 9 is a diagram of a rolling buffer operation for generating read-side snapshots of buffer parameters to read frame slices, in accordance with various examples.

FIG. 9 is a diagram of a rolling buffer operation 900 for generating read-side snapshots of buffer parameters to read frame slices, in accordance with various examples. For example, the frame buffer can be part of the memory 180 of the display system 100, where the memory controller 181 obtains each frame 910 from a sequence of frames processed by the processor 176 and splits the frame into a certain slice count of frame slices. The number of buffer slices in the frame buffer is greater than the slice count. For example, the slice count of frame slices in each frame 910 is equal to 7 and the total number of buffer slices is equal to 13, as shown in FIG. 9. The order of the seven frame slices is indicated by respective frame slice numbers 0-6. The ordered sequence of buffer slices is indicated by respective buffer slice numbers 0-12. In other examples, the slice count and the number of buffer slices can have other values.

The memory controller 181 can receive each frame 910 in a sequence of frames in regular respective time intervals 912. The start of each time interval 912 is signaled by a respective synchronization signal 913 which is useful to synchronize a frame display rate. The memory controller 181 writes the frame slices of the frame 910 to the buffer slices according to the buffer parameters 915. For example, the memory controller 181 performs the methods 700 and 800 for tracking buffer slices and updating the buffer parameters 915 to write the frame slices. The buffer parameters 915 include a previous frame start buffer slice 915a, a current frame start buffer slice 915b, and a written frame slices count 915c.

The rolling buffer controller 182 also tracks each next frame slice and buffer slice for a next write request from the memory controller 181 according to a current written frame slices count 920 and a current buffer slice number 922, respectively. The current written frame slices count 920 is equal to the written frame slices count 915c in the buffer parameters 915, and the current buffer slice number 922 is a counter that is incremented up by 1 and reset to 0 to roll back the frame buffer when the value of the current buffer slice number 922 reaches the last buffer slice value in the ordered sequence of buffer slices. The current buffer slice number 922 can be equal to the sum of the current frame start buffer slice 915b and the written frame slices count 915c, or to the sum of the current frame start buffer slice 915b and the written frame slices count 915c minus the total number of buffer slices if the frame buffer is rolled back. In response to the write request, the rolling buffer controller 182 provides the memory controller 181 with a memory address of the buffer slice based on a buffer slice number that matches the current buffer slice number 922.

For example, when receiving the synchronization signal 913 for the frame 910, the current written frame slices count 920 is equal to the value of the written frame slices count 915c, which is initialized to 0 before writing frame slices of the frame 910. The rolling buffer controller 182 continues to increment the current buffer slice number 922 to track the buffer slice number for writing the frame slices, and sets the current frame start buffer slice 915b to the current value of the buffer slice number 922 at the time of receiving the synchronization signal 913. Accordingly, the memory controller 181 writes the first frame slice of the frame 910, which has the frame slice number 0, to the buffer slice indicated by the current buffer slice number 922. After writing the frame slice, the written frame slices count 915c and accordingly the current written frame slices count 920 and the current buffer slice number 922 are updated to indicate the next frame slice and the next buffer slice, respectively, for the next write request. The rolling buffer controller 182 receives buffer update requests 925 from the memory controller 181 to generate a read-side snapshot 940 of buffer parameters 915 according to a certain rate or based on a request to the memory controller 181, such as from the display device 110. For example, a buffer update request 925 is received for each of the frame slices with frame slice numbers 0, 1, 2, 4, and 5, as shown in FIG. 9.

In response to each buffer update request 925, the rolling buffer controller 182 is configured to detect if a read operation of fetching frame slice data according to a read request 950 is in progress before generating a read-side snapshot 940 of the buffer parameters 915. If frame slice data is being fetched from the frame buffer in response to a read request 950, the rolling buffer controller 182 delays generating the read-side snapshot 940 until the read operation is completed. The read-side snapshot 940 includes a previous frame start buffer slice 940a, a current frame start buffer slice 940b, and a written frame slices count 940c that are copied respectively from the previous frame start buffer slice 915a, the current frame start buffer slice 915b, and the written frame slices count 915c. The read-side snapshot 940 allows the rolling buffer controller 182 to track the new written frame slices in the frame buffer to provide the memory controller 181 with the correct memory addresses to read the frame slices. In response to each read request 950, the rolling buffer controller 182 provides according to the read-side snapshot 940 a memory address of the buffer slice storing a new written frame for reading.

To detect an in progress read operation at a time of receiving a buffer update request 925, the memory controller 181 can monitor a data fetch idle status signal 955 during the rolling buffer operation 900. The data fetch idle status signal 955 is set to a first signal value if data fetching from the frame buffer is idle, or to a second signal value if data fetching according to a read request 950 is in progress. For example, the data fetch idle status signal 955 is set to a high signal value if data fetching is idle or to a low signal value if a reading operation is in progress, as shown in FIG. 9.

If the data fetch idle status signal 955 indicates that data fetching is in progress, the memory controller 181 delays generating the read-side snapshot 940 by setting a pending snapshot flag 960 for the rolling buffer controller 182. For example, the pending snapshot flag 960 is set to a high signal value if the data fetch idle status signal 955 is set to a low signal value and a buffer update request 925 is received, as shown in FIG. 9. If data fetching is completed, the data fetch idle status signal 955 returns to the high signal value and accordingly the pending snapshot flag 960 is set to the low signal value, which signals the rolling buffer controller 182 to generate the read-side snapshot 940.

For example, in response to a buffer update request 925a after writing a first frame slice, indicated by a current written frame slices count 920 equal to 1, the rolling buffer controller 182 generates a read-side snapshot 940 including a written frames slices count 940c equal to 1 and a current frame start buffer slice 940b equal to 5. Generating the read-side snapshot 940 in response to a next buffer update request 925b is however delayed because of in-progress data fetching at the time of the buffer update request 925b. After completing the data fetching, the data fetch idle status signal 955 returns to the high signal value. Accordingly, the pending snapshot flag 960 is set to the low signal value, and the pending read-side snapshot 940 triggered by the buffer update request 925b is generated. The value of the written frame slices count 915c at the time of generating the pending read-side snapshot 940 is 3 which is copied to the written frame slices count 940c in the read-side snapshot 940.

In examples, the read controller of the rolling buffer controller 182 calculates the memory addresses of the written frame slices to provide to the memory controller 181 based on the frame slice numbers being read and the current read-side snapshot 940. The read-side snapshot 940 includes the previous frame start buffer slice 940a, the current frame start buffer slice 940b, and the written frame slices count 940c. The written frame slices count 940c in the read-side snapshot 940 indicates the number of new written frame slices. In examples, if the written frame slices count 940c from the read-side snapshot 940 is greater than the frame slice number being read, the read controller provides a memory address with a base address according to the current frame start buffer slice 940*b* and an offset address according to the frame slice number being read. If the written frame slices count 940*c* is not greater than the frame slice number being read, the read controller provides a memory address with a base address according to the previous frame start buffer slice 940*a* and an offset address according to the frame slice number being read.

In the rolling buffer operation 900, the memory controller 181 can read a different number of new written frame slices at respective read requests 950. In response to a read request 950, the rolling buffer controller 182 provides the memory controller 181 with the memory addresses of the buffer slice storing the new written frame slices based on the most recent generated read-side snapshot 940. For example, in response to respective read requests 950, the memory controller 181 reads one new written frame slice after the buffer update request 925*a* and reads four new written frame slices after the buffer update request 925*c*. In other examples, the memory controller 181 reads after each read request from the frame buffer a number of written frame slices determined based on a certain programmed value referred herein as an update segment size. The update segment size is programmed to provide an amount of synchronization between reading and writing operations, such as between the number of frame slices to be fetched for display and the rate of new frame slices written in the frame buffer. This synchronization is useful to predict future data to be displayed and accordingly adjust processing. For example, if a rendering engine supplying the frame to the display system 100 is aware of a programmable update segment size of frame slices, the rendering engine can render the frame slices in synchronization with (e.g., by accounting for) the expected number of frame slices in the update segment size. Changing the value of the programmable update segment size can also change the amount of synchronization. In examples, the render operation is useful for mitigating artifacts caused by displaying frame slices at a certain rate across the displayed image. A useful value for the programmable update segment size can be determined to increase the amount of synchronization and reduce such artifacts.

Figure 10:
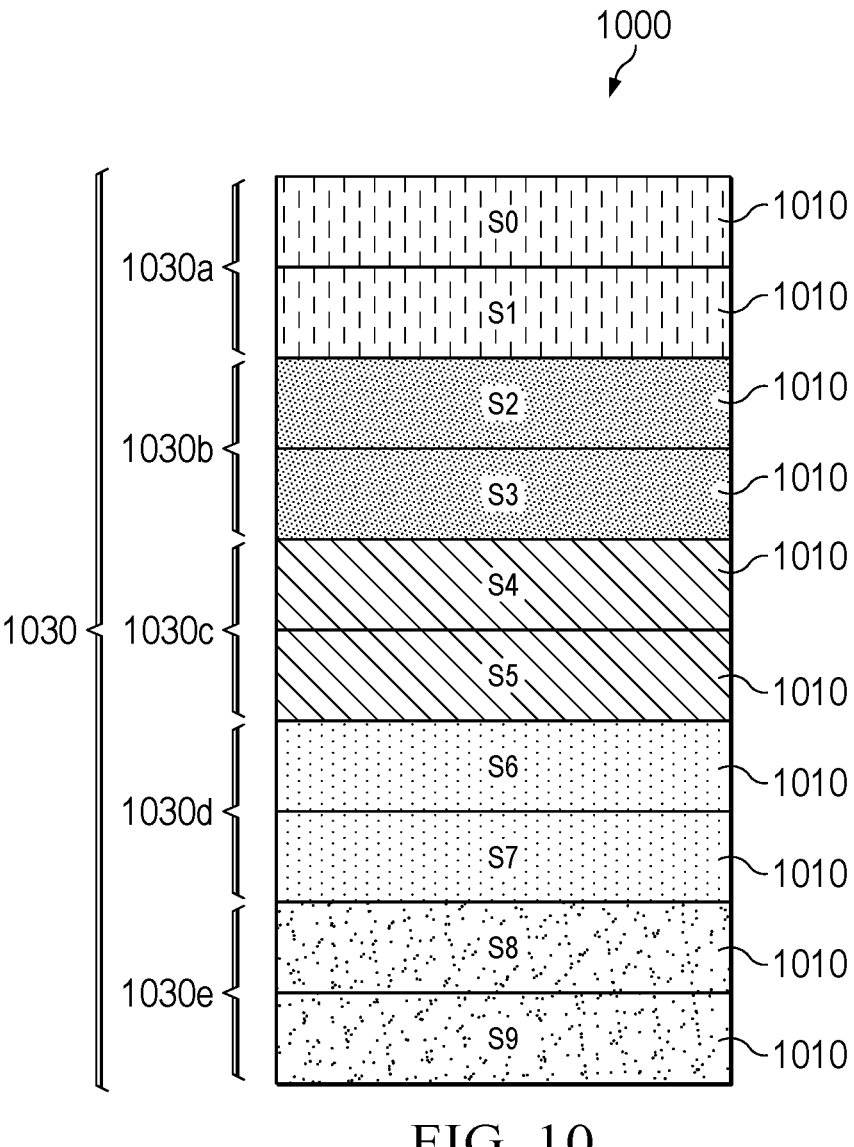
FIG. 10 is a diagram of a programmable update segment size, in accordance with various examples.

FIG. 10 is a diagram of a frame 1000 with a programmable update segment size, in accordance with various examples. For example, if the slice count of frame slices 1010 in the frame 1000 is equal to 10 and the programmable update segment size is equal to 2, the frame 1000 can be partitioned into five update segments 1030 (1030A-E), as shown in FIG. 10. An update segment 1030 is read as a single block of data including each of the frame slices 1010 within the update segment 1030. For example, the memory controller 181 is configured to read one or more update segments 1030, and not separate frame slices 1010, after a buffer update request.

To determine the number of update segments 1030 to read after a buffer update request, the rolling buffer controller 182 obtains the number of new written frame slices 1010 after a last buffer update request. The number of new written frame slices 1010 can be calculated as the difference between the written frame slices count 940*c* in the read-side snapshot 940 from the previous buffer update request and the written frame slices count 915*c* in the current buffer parameters 915. If there is at least one update segment 1030 in the new written frame slices, the memory controller 181 reads the number of new written frame slices 1010 included in the update segments 1030. The rolling buffer controller 182 also sets the written frame slices count 940*c* for the current buffer update request equal to the number of frame slices 1010 in the number of update segments 1030.

Table 1 shows examples of updating the written frame slices count 940*c* based on a programmable update segment size of 2 and the written frame slices count 915*c* for successive buffer update requests. For example, if the number of new written frame slices 1010 is equal to 2 after a first buffer update request, the updated written frame slices count 940*c* is also set to 2 and the memory controller 181 reads a first update segment 1030*a*, including two frame slices 1010, from the frame buffer. If the number of new written frame slices 1010 is 1 after a second buffer update request, the updated written frame slices count 940*c* is not updated and the memory controller 181 does not read the single new written frame slice 1010 from the frame buffer. After a third buffer update request, the number of new written frame slices 1010 is 3 and the memory controller 181 reads a second update segment 1030*b*. The written frame slices count 940*c* is updated to 4. After a fourth buffer update request, the number of new written frame slices 1010 is 2 and the memory controller 181 reads a third update segment 1030*c*. The updated written frame slices count 940*c* is updated to 6. After a fifth buffer update request, the number of new written frame slices 1010 is 3 and the memory controller 181 reads a fourth update segment 1030*d* without the third new written frame slice 1010. The updated written frame slices count 940*c* is updated to 8. After a last buffer update request, the number of new written frame slices 1010 is 2 and the memory controller 181 reads a last update segment 1030*e* from the frame buffer. The updated written frame slices count 940*c* is then updated to 10.

TABLE 1

| written frame slices count 915c | written frame slices count 940c (previous buffer update request) | new written frame slices | written frame slices count 940c (current buffer update request) |
|---|---|---|---|
| 2 | 0 | 2 − 0 = 2 | 2 |
| 3 | 2 | 3 − 2 = 1 | 2 |
| 5 | 2 | 5 − 2 = 3 | 4 |
| 6 | 4 | 6 − 4 = 2 | 6 |
| 9 | 6 | 9 − 6 = 3 | 8 |
| 10 | 8 | 10 − 8 = 2 | 10 |

Figure 11:
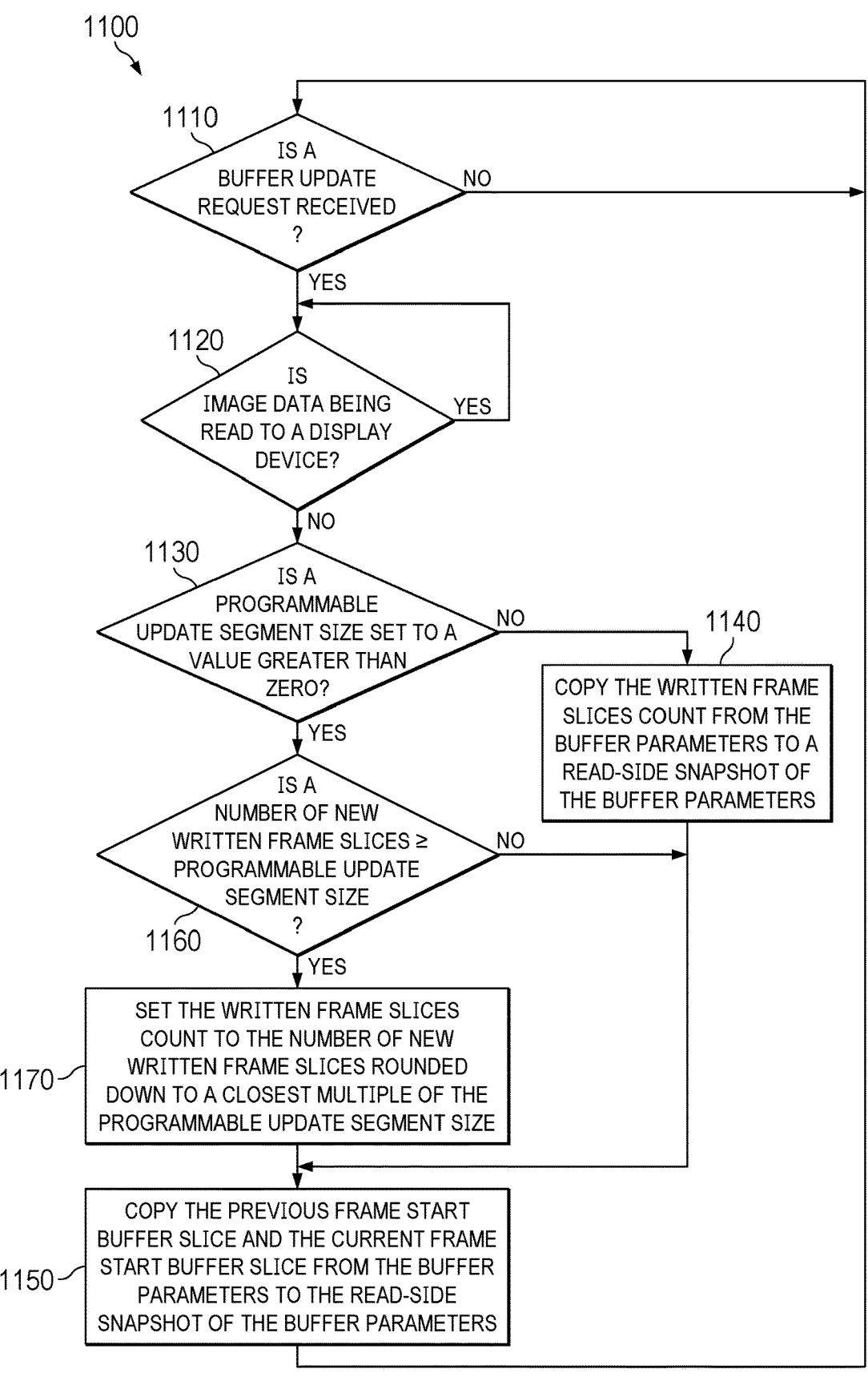
FIG. 11 is a diagram of a method of a rolling buffer operation for generating a read-side snapshot of buffer parameters to read frame slices, in accordance with various examples.

FIG. 11 is a diagram of a method 1100 of a rolling buffer operation for generating a read-side snapshot of buffer parameters to read frame slices, in accordance with various examples. For example, the method 1100 is performed in the rolling buffer operation 900 by the rolling buffer controller 182 in the memory controller 181 to generate a read-side snapshot of the buffer parameters of a frame buffer. In the method 1100, the rolling buffer controller 182 of the memory controller 181 determines, in response to receiving a buffer update request, whether the image data of a written frame slice is being read to the display device 110. The rolling buffer controller 182 generates a read-side snapshot of the buffer parameters in response to the buffer update request if no image data is being read. If image data is being read, the rolling buffer controller waits for completing reading the image data before generating the read-side snapshot.

The read-side snapshot is generated according to a programmable update segment size. The rolling buffer controller 182 determines if a programmable update segment size is preset to a certain value. If the programmable update segment size is set to be greater than zero frame slices and the written frame slices count is greater than or equal to the programmable update segment size, the rolling buffer controller 182 rounds down the written frame slices count to a closest multiple of the programmable update segment size and stores that value as the written frame slices count in the read-side snapshot. The rolling buffer controller 182 then copies the previous frame start buffer slice and the current frame start buffer slice from the buffer parameters to the read-side snapshot.

The method 1100 can be performed in a number of steps as shown in FIG. 11. At step 1110, the rolling buffer controller 182 determines if a buffer update request is received. The rolling buffer controller 182 within the memory controller 181 receives the buffer update request from another function of the memory controller 181 according to a rate of buffer update requests or based on a request to the memory controller 181 from the display device 110. If a buffer update request is not received within a time interval, the rolling buffer controller 182 continues to monitor for a next buffer update request at step 1110. After receiving a buffer update request, the rolling buffer controller 182 determines at step 1120 if image data is being read to the display device 110. For example, the rolling buffer controller 182 monitors a data fetch idle status signal 955 to detect if a read operation in response to a read request 950 is in progress. If image data is being read to the display device 110, the rolling buffer controller 182 continues to monitor the reading operation until completed.

If the reading operation is completed or no image data is being fetched, the rolling buffer controller 182 determines if the programmable update segment size is set to a value greater than zero at step 1130. If the programmable update segment size is not set or programmed with a value, the memory controller 181 can read any number of new frame slices such as based on a last buffer update request. Accordingly, the rolling buffer controller 182 generates a read-side snapshot of the buffer parameters at steps 1140 and 1150. At step 1140, the rolling buffer controller 182 copies the written frame slices count from the buffer parameters to the read-side snapshot of the buffer parameters. For example, the rolling buffer controller 182 sets the written frame slices count 940c of the read-side snapshot 940 to the value of the written frame slices count 915c of the buffer parameters 915. At step 1150, the rolling buffer controller 182 copies the previous frame start buffer slice and the current frame start buffer slice from the buffer parameters to the read-side snapshot. For example, the rolling buffer controller 182 sets the previous frame start buffer slice 940a and the current frame start buffer slice 940b of the read-side snapshot 940 to the values of the previous frame start buffer slice 915a and the current frame start buffer slice 915b, respectively, of the buffer parameters 915. The rolling buffer controller 182 then returns to step 1110 to continue monitoring for a next buffer update request.

If the rolling buffer controller 182 determines that the programmable update segment size is set to a certain value at step 1130, the rolling buffer controller 182 generates a read-side snapshot of the buffer parameters based on the programmable update segment size. At step 1160, the rolling buffer controller 182 determines if the number of new written frame slices is greater than or equal to the programmable update segment size. If the number of new written frame slices is greater than or equal to the programmable update segment size, the rolling buffer controller 182 sets, at step 1170, the written frame slices count in the read-side snapshot of the buffer parameters to the number of the new frame slices rounded down to a closest multiple of the programmable update segment size. For example, the rolling buffer controller 182 determines the number of update segments 1030 in the new written frame slices. If the number is not equal to 0, the rolling buffer controller 182 sets the written frame slices count 940c of the read-side snapshot 940 to the number of frame slices included in the determined number of update segments 1030. The rolling buffer controller 182 then continues to step 1150 to copy the previous frame start buffer slice and the current frame start buffer slice from the buffer parameters to the read-side snapshot of the buffer parameters.

The synchronization between generating read-side snapshots of the buffer parameters and writing incoming frame slices is also useful to mitigate errors or artifacts in the rolling buffer operations. For example, if a read-side snapshot of the buffer parameters is not generated by the read controller to read the new written frame slice data in time, the write controller of the rolling buffer controller 182 can update the buffer parameters before reading or completing reading the frame slice data. Accordingly, a new incoming frame slice can overwrite a previously written frame slice in a buffer slice before being read or completely read based on a last read-side snapshot. Overwriting frame slice data in a buffer slice before completing reading the data is also referred to herein as overrunning the buffer slice.

In examples, the read controller is configured to track a buffer slice that might be overrun and indicate the buffer slice to the write controller. The write controller can then signal an error update to the read controller if the write controller detects a write operation to this buffer slice. In response to the error update signal, the read controller generates a new read-side snapshot of the buffer parameters as updated by the write controller. The error update signal is an error signal that forces the read controller to generate a new read-side snapshot without waiting to detect a next buffer update request to prevent overrunning more buffer slices. In examples, the error update signal also forces the read controller to generate a read-side snapshot even if a read operation in response to a request is currently in progress (e.g., a data fetch idle status signal is not set). The new read-side snapshot is generated without reading or completing reading frame slice data according to the previously generated read-side snapshot. In response to the error update signal, the read controller can also signal an error update to the memory controller 181 indicating skipping reading the frame slice data to prevent overrunning more buffer slices in the frame buffer. In examples, the write controller of the rolling buffer controller 182 also signals an error update to the memory controller 181 to indicate that a buffer slice overrun might occur. In response, the memory controller 181 sends a buffer update request to the read controller of the rolling buffer controller 182 to trigger generating a new read-side snapshot.

Figure 12:
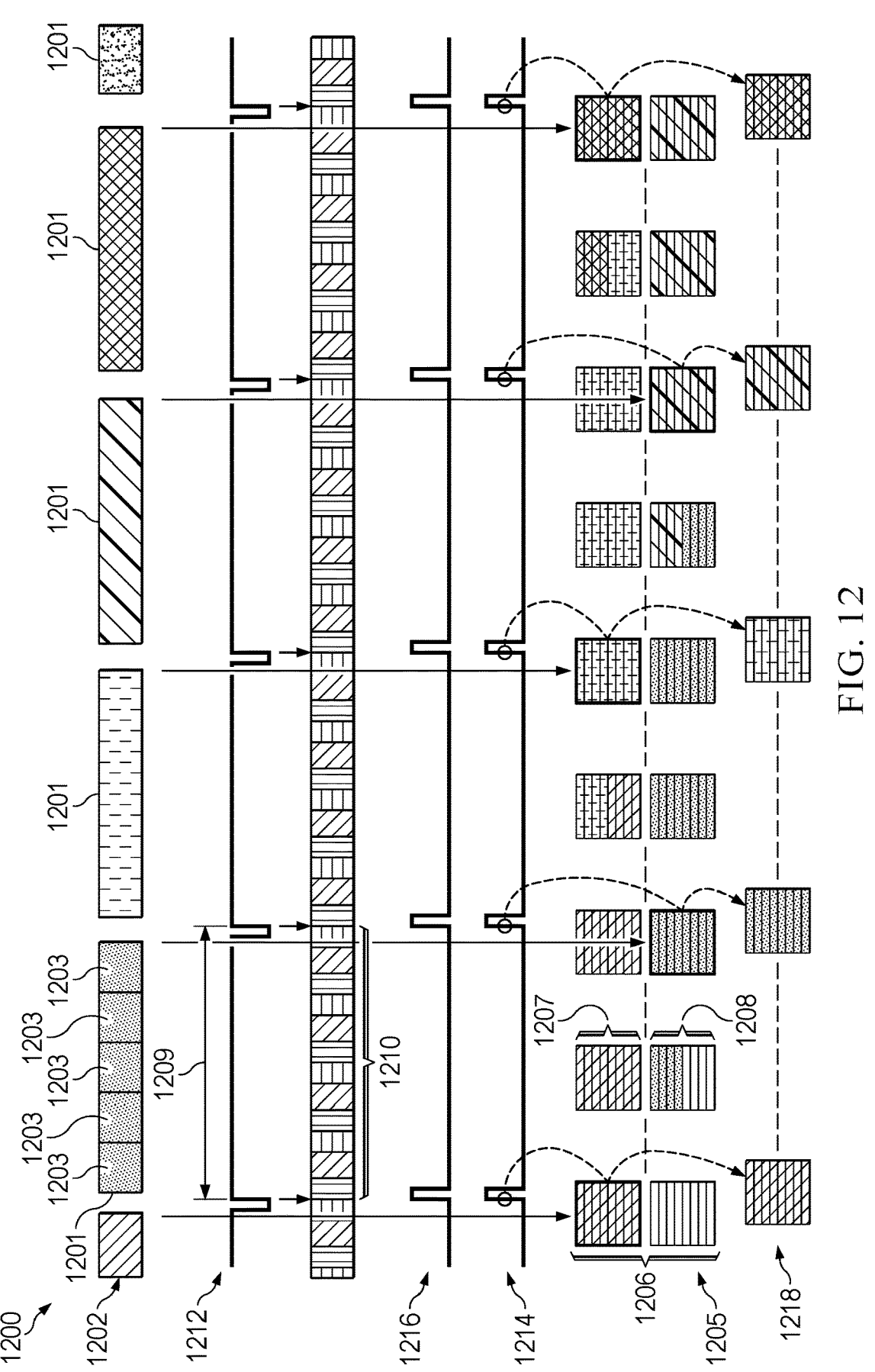
FIG. 12 is a diagram of a rolling buffer operation in a double buffer mode, in accordance with various examples.

In examples, a rolling buffer operation can also be operated in a double buffer mode with a number of buffer slices that is equal to two times the number of frame slices per frame. Operating the rolling buffer operation in a double buffer mode is useful to avoid artifacts in displayed images by the rolling buffer operation mode, such as the rolling buffer operation 300 or 900. FIG. 12 is a diagram of a rolling buffer operation 1200 in a double buffer mode, in accordance with various examples. Each individual frame 1201 in a sequence of frames 1202 processed by the processor 176 is received and split by the memory controller 181 into a certain slice count of frame slices 1203. A frame buffer 1205 in the memory 180 is also partitioned into a number of buffer slices 1206 arranged in an ordered sequence in the frame buffer 1205. The number of buffer slices 1206 is equal to two times the slice count of frame slices 1203. Accordingly, the frame buffer 1205 can store the frame slices 1203 of two individual frames 1201 at a same time.

According to the double buffer mode, the memory controller 181 is configured to partition the memory 180 into a number of buffer slices 1206 equal to two times the slice count, and split the buffer slices 1206 of the frame buffer 1205 into a first group 1207 of buffer slices 1206 and a second group 1208 of buffer slices 1206. During the rolling buffer operation 1200, the memory controller 181 write, at two successive time intervals, the frame slices 1203 of a certain frame 1201 and a next frame 1201 in the sequence of frames 1202 to the first group of buffer slices 1207 and the second group 1208 of buffer slices 1206, respectively. The memory controller 181 also reads, at the two successive time intervals, the written frame slices 1203 of the frame 1201 and the next frame 1201 from the first group 1207 of buffer slices 1206 of buffer slices and the second group 1208 of buffer slices 1206, respectively. For example, the frame and the next frame are a left-side frame and a right-side frame, respectively, that are projected at a certain rate to display a 3D image.

The ordered sequence of buffer slices 1206 is logically split into two equal size groups of buffer slices 1206, the first group 1207 and the second group 1208, each including a number of buffer slices equal to the slice count. Each group includes a same number of buffer slices 1206 that is equal to the slice count of frame slices 1203. For example, if the slice count of frame slices 1203 is equal to 5, the first group 1207 includes the first five buffer slices 1206 in the ordered sequence of buffer slices 1206. The second group 1208 includes the last five buffer slices 1206 in the ordered sequence. The first group 1207 and the second group 1208 are configured to store at a same time two successive frames 1201, respectively, in the sequence of frames 1202.

The memory controller 181 receives the frames 1201 in respective time intervals 1209 according to a certain frame rate. Each frame 1201 can include a sequence of color bits 1210, such as in RGB format. The start of each time interval 1209 is signaled by a respective synchronization signal 1212. The memory controller 181 writes each frame slice 1203 of the frame 1201 to a buffer slice 1206. In each two successive time intervals 1209, the frame slices 1203 of one frame 1201 are written in the buffer slices 1206 of the first group 1207, and the frame slices 1203 of the next frame 1201 are written in the buffer slices 1206 of the second group 1208. The written frame slices 1203 of each frame 1201 are tracked by updating the buffer parameters according to a rate of buffer updates request 1214 that matches the frame rate of the time intervals 1209. According to this rate, the written frame slices 1203 of each frame 1201 and next frame 1201 can also be read in each time interval 1209, respectively. For example, in a same time interval 1209, frame slices of a new frame can be written to the frame buffer 1205 while the written frame slices of a previous frame are being read from the frame buffer 1205 to the display device 110. At each buffer update request 1214 following a respective synchronization signal 1212, the buffer slices 1206 of the first group 1207 or the second group 1208 are tracked according to a read-side snapshot of the buffer parameters. To read the written frame slices 1203 of two successive frames 1201, the rolling buffer controller 182 is configured to switch between the first group 1207 and the second group 1208 in performing writing and reading operations according to a swap event signal 1216 received at a rate that matches the frame rate of the time intervals 1209.

On each synchronization signal 1212, the write controller of the rolling buffer controller 182 resets the written frame slices count to 0 in the maintained buffer parameters. By performing each buffer update request 1214 after the synchronization signal 1212 without changing this value, the read controller of the rolling buffer controller 182 provides the memory controller 181 with the memory addresses of the buffer slices 1206 of the first group 1207 or the second group 1208 based on the value of the previous frame start buffer slice in the read-side snapshot. During each time interval 1209, the frame slices 1203 of each frame 1201 that are loaded on the light modulator 140 from the first group 1207 or the second group 1208 are not replaced as the frame slices 1203 of the next frame 1201 are written to the other group. The light modulator 140 projects the loaded frame slices 1203 to display an image 1218 for each frame 1201 at each respective time interval 1209.

In the double buffer mode of the rolling buffer operation 1200, the written frame slices 1203 of a frame 1201 can be protected to freeze the displayed image for each respective time interval 1209 by blocking write requests/operations to the memory addresses of the buffer slices 1206. Freezing the displayed image by blocking write requests/operations is also referred to herein as a double-buffer mode freeze. In this mode, the values of the buffer parameters remain fixed and the memory controller 181 continues reading accordingly the same content without updates to the frame buffer 1205 in the memory 180. The double buffer mode freeze is useful to block write requests/operation at the transitions between successive time intervals 1209 which mitigates artifacts in the displayed image.

The double buffer freeze mode is also useful for displaying 3D images that are formed by combining projected left-side and right-side frames in respective successive time intervals. The left-side frames and right-side frames can be projected at a certain rate onto a same area of the image projection surface 130 to display 3D images. The rate allows the HVS to combine and perceive alternating left-side and right-side frames as 3D images. For example, the display device 110 is a digital video/image projector configured to project alternating left-side and right-side frames and the image projection surface 130 is a wall or a wall mounted screen that displays the alternating left-side and right-side frames as 3D images to the human eye. In other examples, the display device 110 is a wearable AR/VR device coupled to a single combiner for displaying alternating left-side and right-side frames, or coupled to a left-side combiner and a right-side combiner for displaying left-side frames and right-side frames, respectively. The double buffer freeze mode for 3D images include blocking writing operations to the memory addresses storing written left-side and right-side frame slices. At the time of blocking the write operations, the rolling buffer controller 182 can continue reading the written left-side or right-side frames to display the frames at respective time intervals.

In examples, the double buffer mode includes different types of buffer update requests. The buffer update requests include normal buffer update requests to generate read-side snapshots of buffer parameters according to a buffer update rate of buffer update requests. The buffer update requests can also include a critical update request sent by the memory controller 181 if a programmed interval to swap between two groups of buffer slices has expired before certain conditions for swapping between the groups of buffer slices are met. In response to receiving a critical update request, the rolling buffer controller 182 generates a read-side snapshot of the current buffer parameters without waiting to detect a regular buffer update request at the buffer update rate. The buffer update requests can also include a forced update request, which is sent by the memory controller 181 if new frame data is received for writing and the groups of buffer slices are not yet swapped. In response to receiving a forced update request, the rolling buffer controller 182 generates a read-side snapshot of the current buffer parameters without waiting to detect the regular buffer update request. The buffer update requests can also include a toggle update request to update the rolling buffer parameters at any time if needed. The toggle update request is useful if a write operation for writing a frame into memory is not followed by a synchronization signal for a next frame. The toggle update request forces the read controller to generate a snapshot before writing a next frame.

Figure 13A:
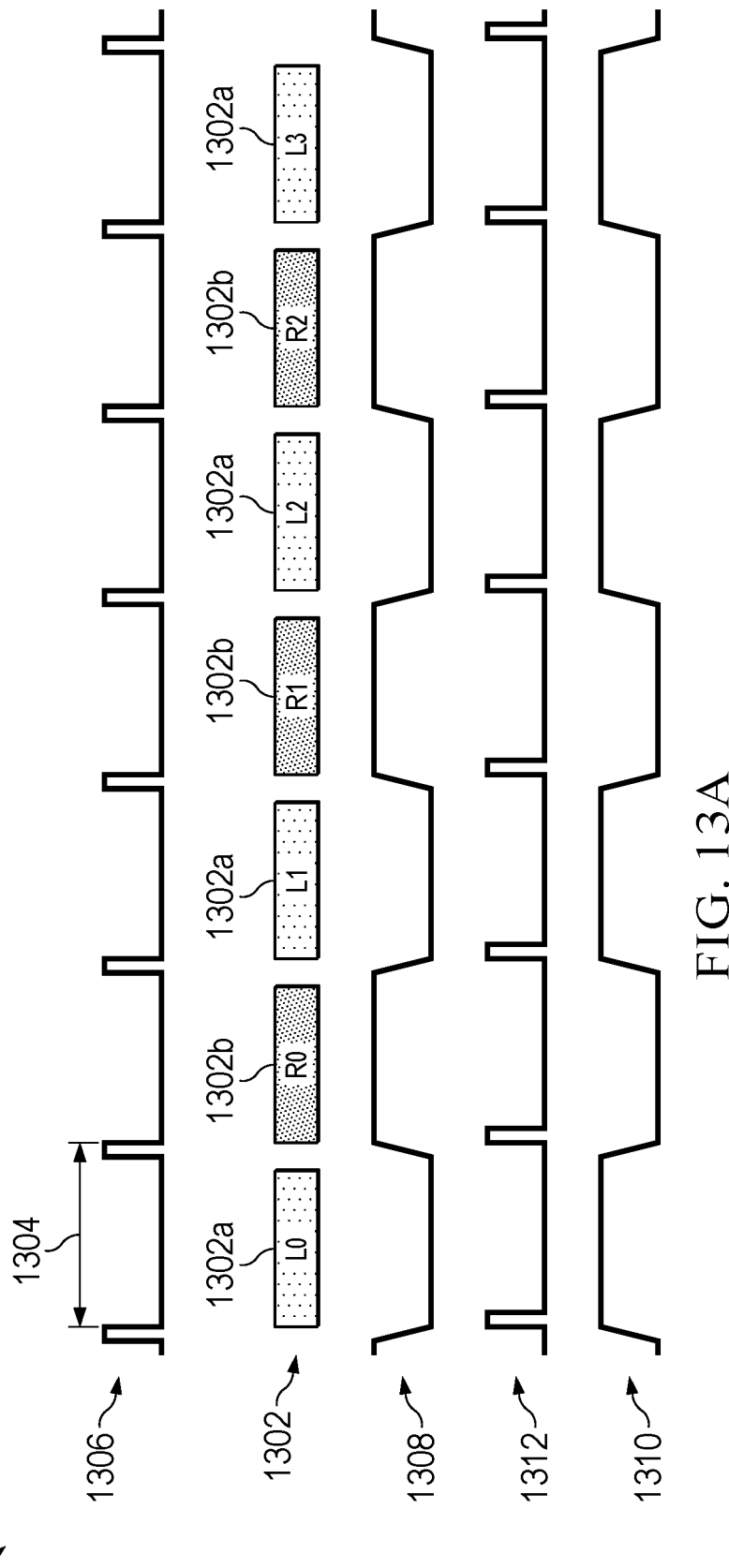
FIGS. 13A-B are diagrams of operating a rolling buffer operation for displaying frames of three-dimensional (3D) images, in accordance with various examples.
Figure 13B:
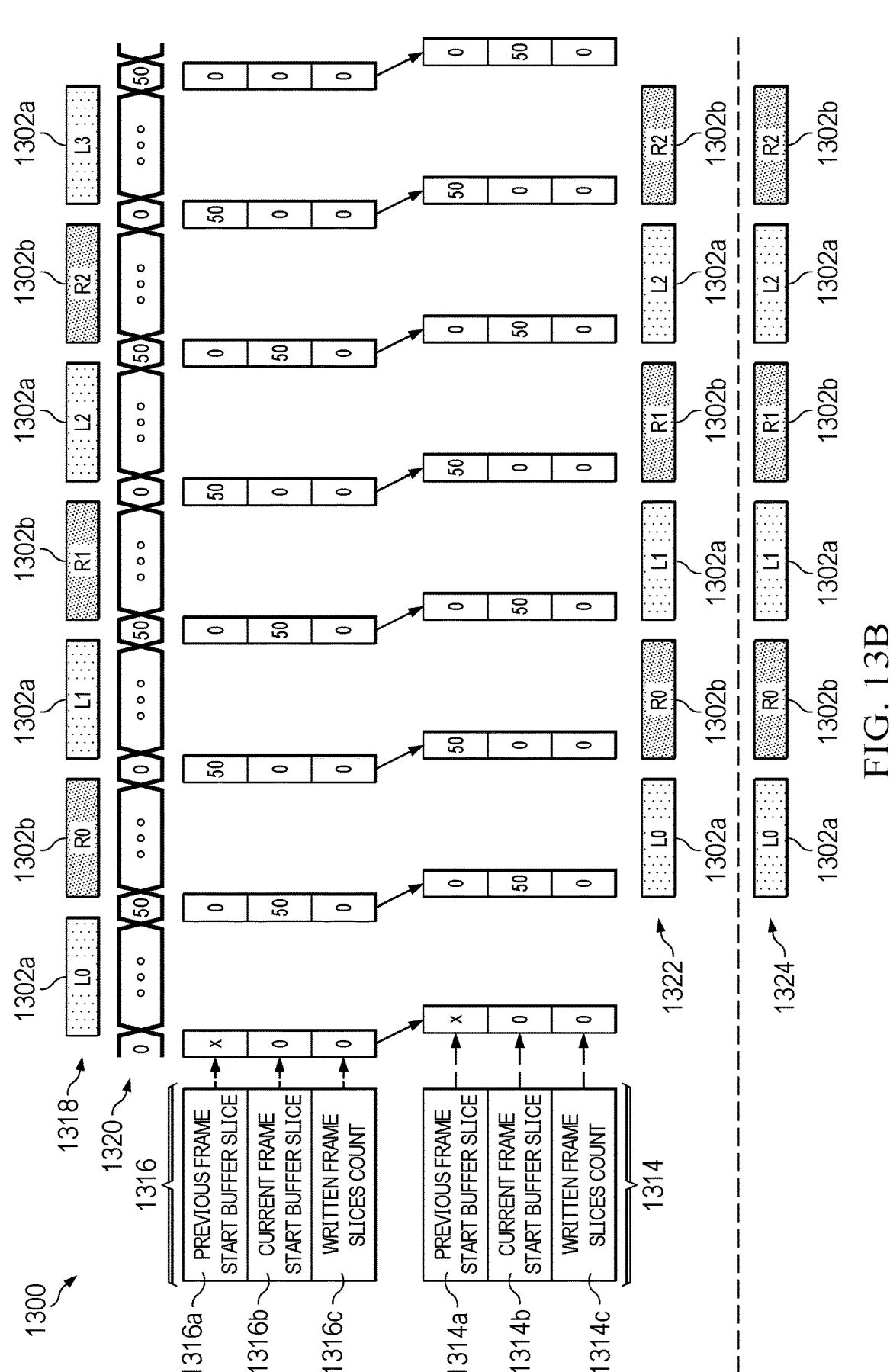

FIGS. 13A-B are diagrams that show a rolling buffer operation 1300 for displaying frames of 3D images, in accordance with various examples. The rolling buffer operation 1300 is operated in a double buffer mode to write and read each two successive frames 1302 in a sequence of received frames 1302 into two groups of buffer slices in a single frame buffer, respectively. The two successive frames 1302 can be written and read in the two groups of buffer slices in a manner similar to the rolling buffer operations 1200. In the rolling buffer operation 1300, the frames 1302 are received in respective time intervals 1304 that are signaled by respective synchronization signals 1306. The sequence of frames 1302 is also divided into two sequences of alternating left-side frames 1302*a* and right-side frames 1302*b* that form combined 3D images. In FIG. 13, the left-side frames 1302*a* are labeled as L0-L3, etc. and the right-side frames 1302*b* are labeled R0-R2, etc. The left-side frames 1302*a* and right-side frames 1302*b* are split into a certain slice count of frame slices, and the frame buffer is partitioned into a number of buffer slices equal to two times the slice count.

The two groups of buffer slices of the frame buffer include a same number of buffer slices that is equal to the slice count of frame slices. The two groups are also configured respectively for writing the frame slices of two successive frames 1302 in two successive time intervals 1304 and in response to a write 3D reference signal 1308. The write 3D reference signal 1308 selects and switches writing operations between the left-side and right-side frames in respective successive time intervals. The first group in the order sequence of buffer slices is configured to write the frame slices of each left-side frame 1302*a* at a time interval 1304, and the second group of buffer slices is configured for writing the frame slices of each right-side frame 1302*b* at the next time interval 1304. The value of the write 3D reference signal 1308 is configured to swap writing between the left-side frame 1302*a* and the right-side frame 1302*b* at each next time interval 1304. The written frame slices of each left-side frame 1302*a* and next right-side frame 1302*b* are also read in two successive time intervals 1304 in response to a read 3D reference signals 1310, respectively. The read 3D reference signals 1310 select and switch reading operations between the left-side and right-side frames in respective successive time intervals. The value of the read 3D reference signal 1310 is configured to swap reading between the left-side frame 1302*a* and the right-side frame 1302*b* at each next time interval 1304.

The buffer parameters 1316 are updated each time a synchronization signals 1306 is received. At each buffer update request 1312 following each synchronization signal 1306, a read-side snapshot 1314 of buffer parameters 1316 is also generated to track the buffer slices of the first group or the second group that store written frames 1318 for writing and reading operations, respectively. The buffer parameters 1316 include a previous frame start buffer slice 1316*a,* a current frame start buffer slice 1316*b,* and a written frame slices count 1316*c.* The previous frame start buffer slice 1316*a* and current frame start buffer slice 1316*b* indicate the start memory address of the first group and the second group of buffer slices for writing operations. The written frame slices count 1316*c* is reset to the value 0 for each synchronization signal 1306. The buffer parameters 1316 include a previous frame start buffer slice 1316*a,* a current frame start buffer slice 1316*b,* and a written frame slices count 1316*c* , which are copied, respectively, to a previous frame start buffer slice 1314*a,* a current frame start buffer slice 1314*b,* and a written frame slices count 1314*c* in the read-side snapshot 1314 in response to a buffer update request 1312.

In an example, the slice count of frame slices is equal to 50, and each of the two groups of buffer slices includes 50 buffer slices, as shown in FIG. 13. Accordingly, the values of the previous frame start buffer slice 1316*a* and the current frame start buffer slice 1316*b,* and similarly the values of the previous frame start buffer slice 1314*a* and the current frame start buffer slice 1314*b,* switch between 0 and 50 at each next buffer update request 1312. The rolling buffer controller 182 can indicate to the memory controller 181 the memory address of each next buffer slice for writing or reading a next frame slice by updating a current buffer slice number 1320. After each read request specified by the read 3D reference signal 1310, a read frame 1322 is transmitted to the light modulator 140, which projects a respective loaded frame 1324 onto the image projection surface 130. The loaded frames 1324 are projected at a certain rate to allow the HVS to combine and perceive alternating left-side and right-side frames as 3D images.

In examples, the rolling buffer controller 182 can be configured to provide, according to the read-side snapshot of the of the buffer parameters, the memory controller 181 with memory addresses in a certain order. The memory controller 181 reads and transmits the frame slice data to the display device 110 according to this order of memory addresses. The frame slice data is also loaded and projected on the light modulator 140 in the same order which determines the direction and orientation of scrolling the frame slices across the displayed image. The order of reading the frame slice data can be based on a combination of rotation, flip, and direction settings. Controlling the order of reading the memory addresses that store the frame slice data based on a combination of rotation, flip, and direction settings can determine the mode of scrolling across the displayed image.

FIGS. 14A-14H are diagrams of combinations of rotation, flip, and direction settings for reading frame data, in accordance with various examples. Each combination of rotation, flip, and direction settings determines a respective order of memory addresses for reading frame slice data which is provided by the rolling buffer controller 182 to the memory controller 181, and accordingly the order by which the frame slices are projected across a displayed image by the display device 110. The frame slice data can be divided into observation blocks for each frame slice, and the observation blocks are read and loaded to display each respective frame slice across the displayed image. In examples, the combinations of rotation, flip, and direction settings include eight different combinations that provide eight respective orders for reading the memory addresses of the observation blocks, as shown in FIGS. 14A-14H.

In examples, the rotation, flip, and direction settings include a rotation setting, a first direction-flip setting, and a second direction-flip setting. The memory controller 181 is configured to enable or disable the rotation setting for a displayed image. The memory controller 181 is also configured to set the first direction-flip setting for the displayed image to a first direction or a second direction. For example, the first direction is a left-to-right direction across the displayed image and the second direction is a right-to-left direction across the displayed image. The memory controller 181 also sets the second direction-flip setting for the displayed image to a third direction or a fourth direction. For example, the third direction is a top-to-bottom direction across the displayed image and the fourth direction is a bottom-to-top direction across the displayed image. The memory controller 181 reads from the memory 180, according to the memory addresses indicated by the rolling buffer controller 182, the image data based on a combination of the rotation setting, the first direction-flip setting, and the second direction-flip setting. For example, the memory controller 181 reads rows of observation blocks for the displayed image if the rotation setting is disabled or columns of the observation blocks if the rotation setting is enabled. The memory controller 181 further reads the observation blocks according to a combination of the first direction-flip setting and the second direction-flip setting.

Figure 14A:
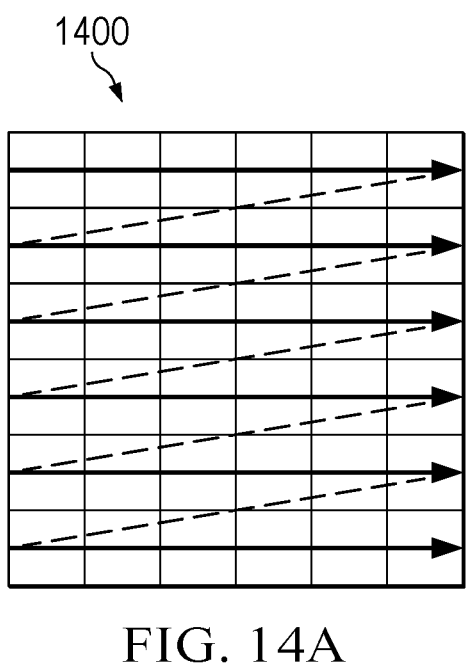
FIGS. 14A-14H are diagrams of combinations of rotation, flip, and direction settings for reading frame data, in accordance with various examples.
Figure 14B:
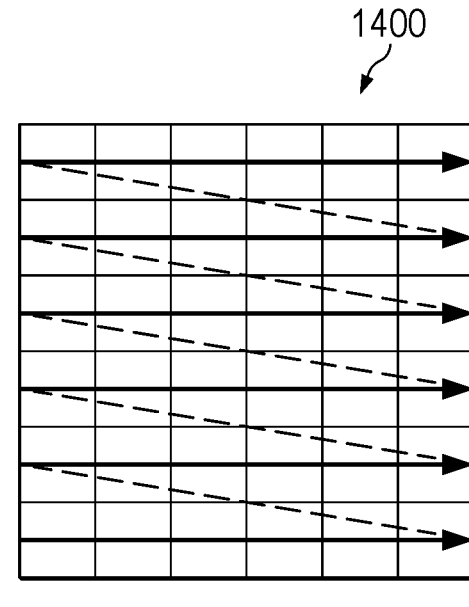
Figure 14C:
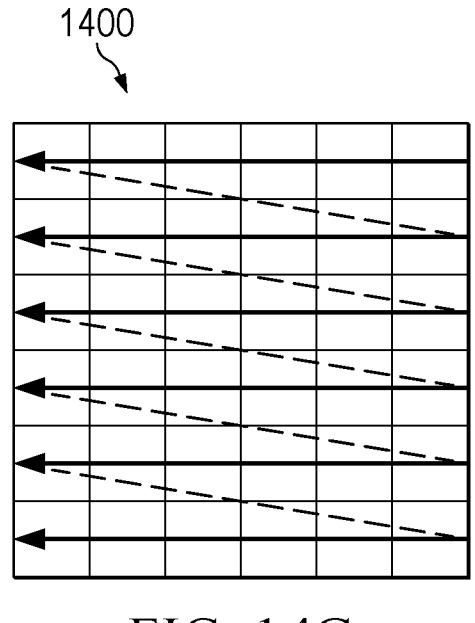
Figure 14D:
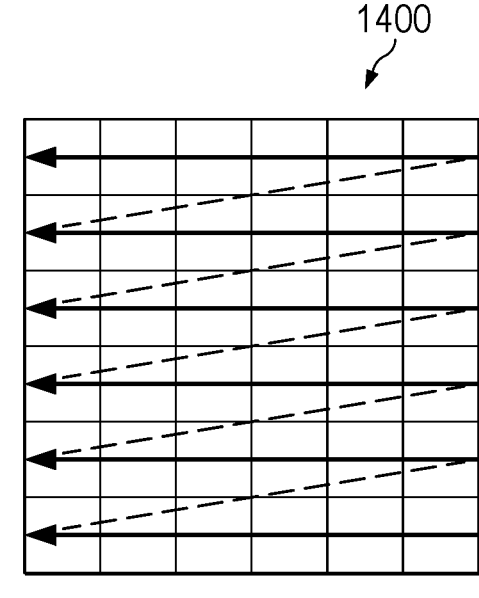
Figure 14E:
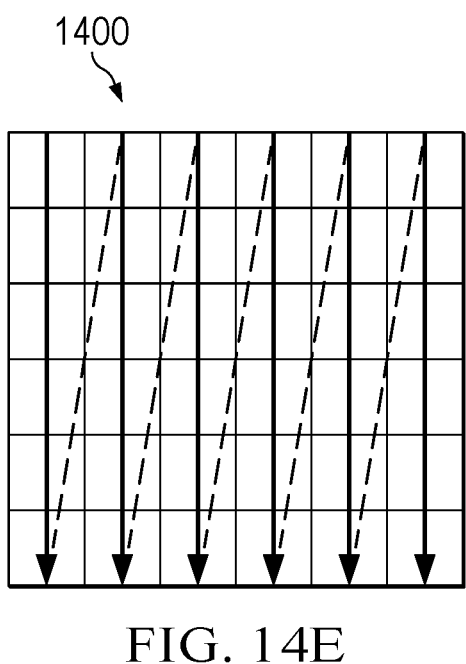
Figure 14F:
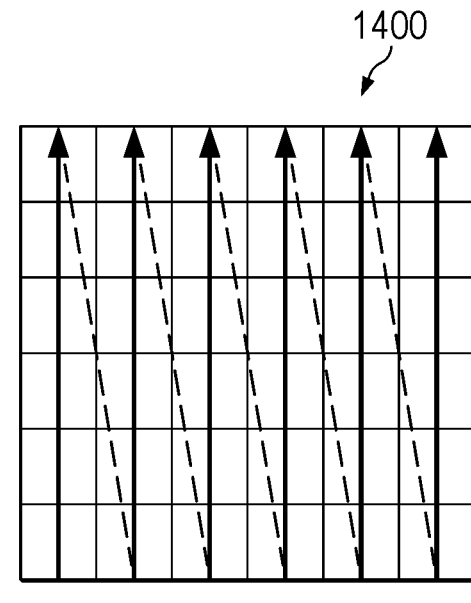
Figure 14G:
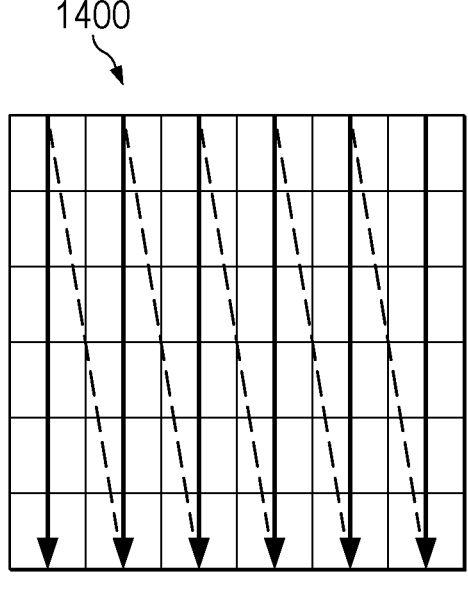
Figure 14H:
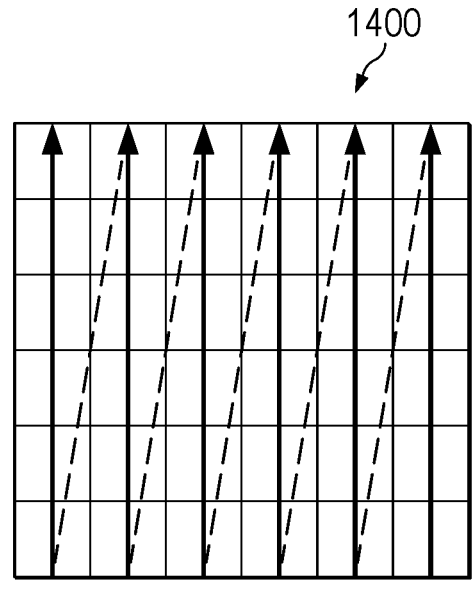

FIGS. 14A-14D show four respective combinations of settings that determine the order of reading memory addresses without rotation. In FIG. 14A, a displayed image 1400 is read in a left-to-right and top-to-bottom direction by reading the memory addresses in a first order according to a first combination of flip and direction settings. In FIG. 14B, the same displayed image 1400 is read in a left-to-right and bottom-to-top direction by reading the memory addresses in a second order according to a second combination of flip and direction settings. In FIGS. 14C-14D, the displayed image 1400 is read in a right-to-left and top-to-bottom direction and in a right-to-left and bottom-to-top direction according to a third combination and a fourth combination of flip and direction settings, respectively. FIGS. 14E-14H show four other image reading modes according to four respective combinations of settings with rotation. In FIG. 14E, the displayed image 1400 is read, according to a fifth combination of rotation, flip, and direction settings, in a left-to-right and top-to-bottom direction rotated by 90 degrees in comparison to the first combination of FIG. 14A. FIGS. 14F-14H show three other image reading modes rotated by 90 degrees in comparison to the modes of FIGS. 14B-14D, respectively.

The rolling buffer operation is also useful for displaying images projected by a number of light modulators in a display device. For examples, a number of light modulators 140 in the display system 100 project respective loaded portions of a frame onto respective areas of an image projection surface 130 to form a displayed image. In other example, a display device such as a wearable AR/VR device can include two light modulators 140 of two eyepieces for projecting two frames onto two respective image projection surfaces 130 (e.g., combiners).

Figure 15:
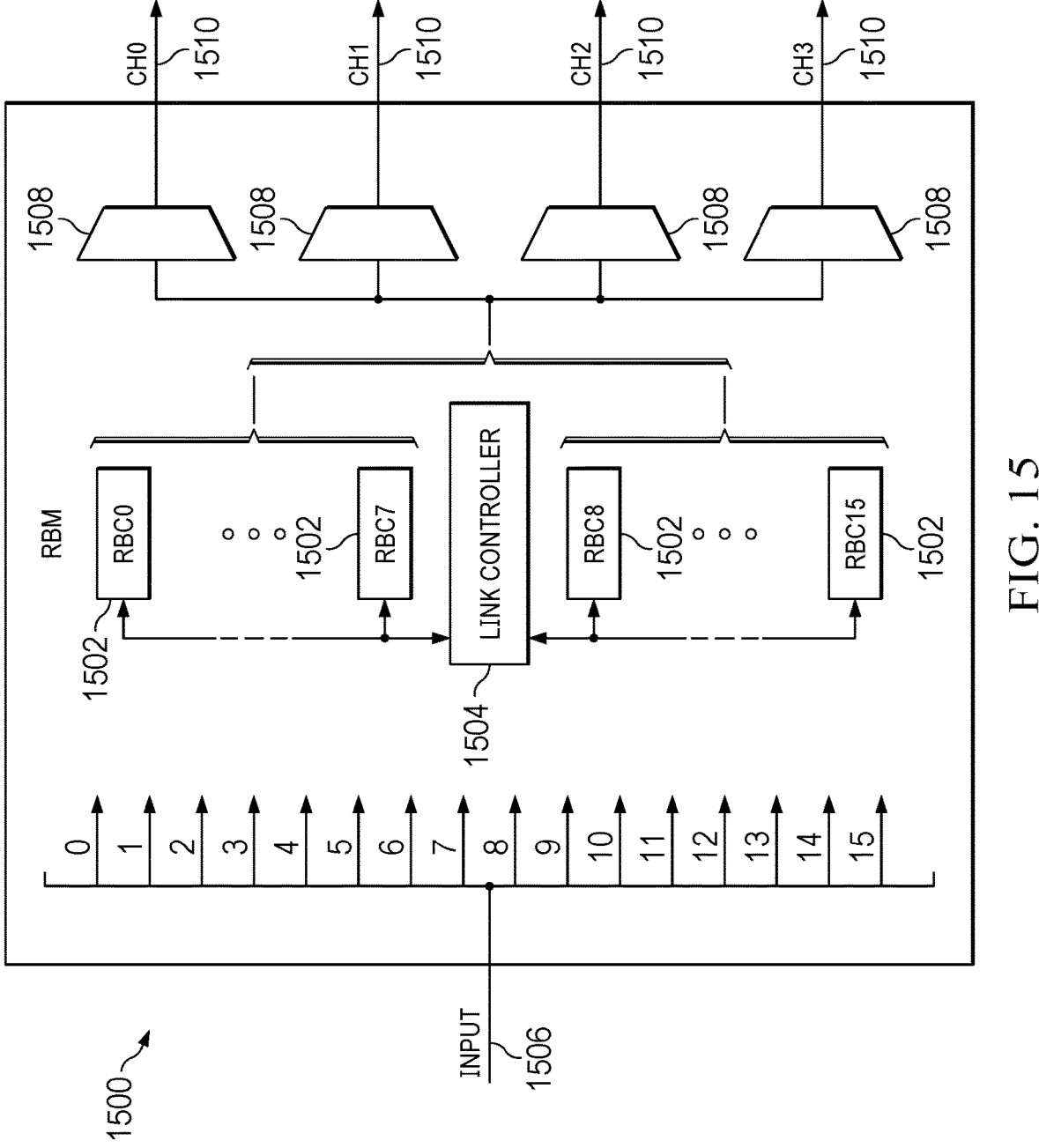
FIG. 15 is a diagram of a rolling buffer apparatus including a number of rolling buffer controllers, in accordance with various examples.

FIG. 15 is a diagram of a rolling buffer apparatus 1500 including a number of rolling buffer controllers 1502, in accordance with various examples. For example, the rolling buffer apparatus 1500 can be part of the memory controller 181 of the apparatus 175 in the display system 100. The rolling buffer controllers 1502 are also coupled to the memory 180. Each rolling buffer controller 1502 within the memory controller 181 is configured to receive write requests from a function of the memory controller 181 to write frame slices of a frame in a sequence of frames representing image data, and provide the memory controller 181 with memory addresses for writing the frames slices into respective buffer slices of a frame buffer in the memory 180. The rolling buffer controller 1502 can also receive buffer update requests from the memory controller 181, and update, in response to the buffer update requests, buffer parameters of the frame buffer for tracking and reading the frame slices in the respective buffer slices. The rolling buffer controller 1502 is also configured to receive read requests from the memory controller 181 to read the frame slices from the respective buffer slices, and provides the memory controller 181 with the memory addresses of the respective buffer slices storing the written frame slices.

The rolling buffer controllers 1502 can also be coupled in the rolling buffer apparatus 1500 to a link controller 1504. The link controller 1504 is configured to link each rolling buffer controller 1502 to obtain one or more local buffer parameters of the same rolling buffer controller 1502 or of other rolling buffer controllers 1502. The link controller 1504 links the rolling buffer controllers 1502 by coordinating, between the rolling buffer controllers 1502, writing and reading operations to memory addresses of the memory 180. The writing or reading operations can be coordinated by sharing buffer parameters, respectively, between the rolling buffer controllers 1502.

The rolling buffer apparatus 1500 is configured to receive frames, such as from the processor 176. The frames include frame data, such as in the form of a number of subframes, that are assigned to respective rolling buffer controllers 1502. The subframes of a frame can be assigned to the rolling buffer controllers 1502 by respective subframe numbers provided by the memory controller 181. Each subframe can include the image data of a respective portion of an image frame. Each subframe can also be split into a number of frame slices of a frame. The subframes can also be grouped into channels for reading the frame data. The subframes can be split into a same number of frame slices, different numbers of frame slices, or different sizes of frame slices (e.g., different number of observation blocks per frame slice). For example, the number of frame slices or the size of frame slices can be based on the displayed image portion size represented by the subframe. Accordingly, each group of rolling buffer controllers 1502 can be associated with a respective channel. For example, as shown in FIG. 15, the rolling buffer apparatus 1500 receives 16 subframes of each frame, labeled from 0 to 15, at an input 1506 from the memory controller 181. The 16 subframes are assigned to 16 respective rolling buffer controllers 1502, labeled as RBC0-RBC15. The subframes are also grouped into a number of channels (e.g., labeled CH0-CH3 in FIG. 15) by respective multiplexers 1508 to provide respective outputs 1510. A group of rolling buffer controllers 1502 can be selected for each channel to display a portion of an image.

In examples, the inputs to a multiplexers 1508 can include read/write data and control outputs from any one of the rolling buffer controllers 1502. A rolling buffer controllers 1502 can route one of the channels to a multiplexers 1508 according to a channel mapping control configuration. For the example, in FIG. 15, there are four channels labeled CH0-CH3. According to a certain mapping control configuration, a first group of four rolling buffer controllers 1502 (e.g., labeled RBC0-RBC3) are mapped to a first channel CH0, a second group of four rolling buffer controllers 1502 (e.g., labeled RBC4-RBC7) are mapped to a second channel CH1, a third group of four rolling buffer controllers 1502

(e.g., labeled RBC8-RBC11) are mapped to a third channel CH2, and a fourth group of four rolling buffer controllers 1502 (e.g., labeled RBC12-RBC15) are mapped to a fourth channel CH3. Accordingly, the channel mapping control configuration can be set for RBC0-RBC3 to 0 indicating the first channel, for RBC4-RBC7 to 1 indicating the second channel, etc. The channel mapping control configuration is applied to both write and read operations to the rolling buffer controllers 1502. For example, for a write operation, a channel select input is sent with the input 1506 to the rolling buffer controllers 1502 to indicate which channel or channels to write data to. Each rolling buffer controller 1502 determines based on the received channel select input if the data to be written is requested from this rolling buffer controller 1502. If the receiving rolling buffer controller 1502 is indicated in the channel select input, the rolling buffer controller 1502 processes the write operation by providing the proper memory address for the data. If the receiving rolling buffer controller 1502 is not mapped to the channel being written according to the channel select input, rolling buffer controller 1502 remains inactive/idle. The same channel mapping and selection method can be applied for read operations.

The rolling buffer controllers 1502 can also be configured according a subframe control configuration. For example, the subframe control configuration is useful in expanded picture resolution (XPR) technology applications to map certain XPR subframes to individual rolling buffer controller 1502. The channel mapping control configuration and the subframe mapping control configuration can be both applied to map the rolling buffer controller 1502. For example, the rolling buffer apparatus 1500 in FIG. 15 can support up to four channels and four XPR subframes with a number of 16 rolling buffer controllers 1502 (RBC0-RBC15). The first group of rolling buffer controllers 1502 (RBC0-RBC3) can be configured to manage data for all four XPR subframes for the first channel CH0. Accordingly, the channel mapping control configuration is set to 0 for RBC0-RBC3. Also, the subframe mapping control configuration is set to 0 for RBC0, set to 1 for RBC1, set to 2 for RBC2, and set to 3 for RBC3. This combined channel and subframe mapping control configurations cause each rolling buffer controller 1502 mapped to CH0 to manage an individual XPR subframe of data. For example, a single rolling buffer controller (e.g., RBC2) can be configured to process a certain write or read operation for a second XPR (XPR subframe 2) of the four XPR subframes on CH0, while the other rolling buffer controller 1502 remain idle.

The memory controller 181 can select by respective signals the rolling buffer controllers 1502 to read the respective subframes of each channel. The memory controller 181 obtains the memory addresses for reading data portions of subframes on a certain channel by sending a respective channel select signal to the rolling buffer controllers 1502 associated with this channel. The memory controller 181 also sends subframe select signals to indicate the subframes of the channel for each rolling buffer controller 1502. Each rolling buffer controller 1502 can also be configured to determine the timing, with respect to other rolling buffer controllers 1502, to update respective buffer parameters in response to buffer update requests from the memory controller 181.

Figure 16:
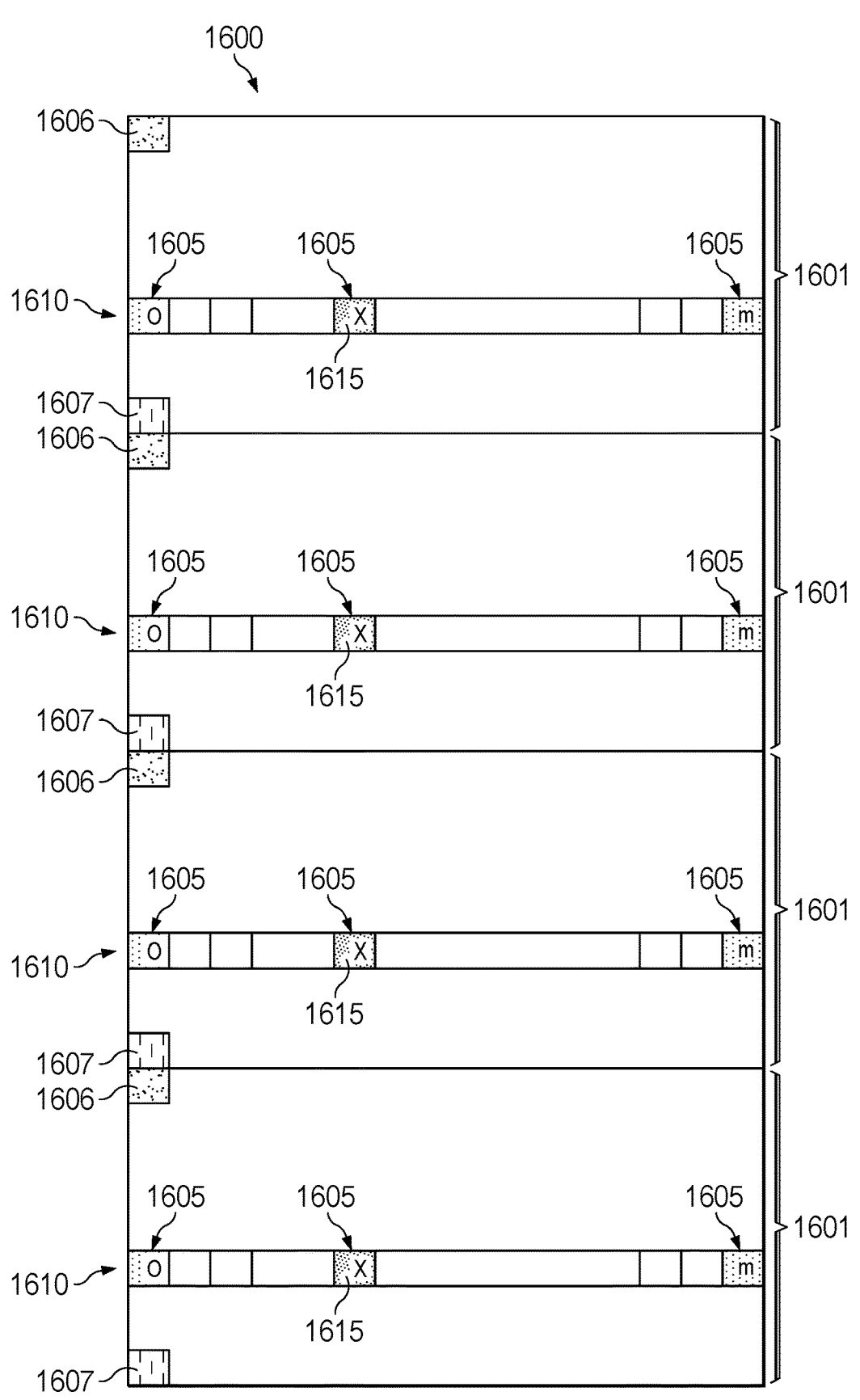
FIG. 16 is a diagram of a virtual memory allocated including virtual memory partitions allocated for a rolling buffer operation, in accordance with various examples.

FIG. 16 is a diagram of a virtual memory 1600 including virtual memory partitions 1601 allocated for a rolling buffer operation, in accordance with various examples. Each virtual memory partition 1601 can be allocated to a rolling buffer controller to manage/track a respective portion of image data, such as a subframe. The virtual memory partition 1601 can represent a number of buffer slices associated with the rolling buffer controller. For each virtual memory partition 1601, the number of buffer slices versus the frame slice count can be based on the buffer operation mode (e.g., rolling buffer mode, single buffer mode, double buffer mode). For example, in a rolling buffer operation mode, the number of buffer slices of a virtual memory partition 1601 is greater than the frame slice count of a subframe. The virtual memory 1600 is a logical representation of address values which can be translated into memory addresses of the memory 180. The address values of the virtual memory 1600 and the memory addresses of the memory 180 are also referred to herein as virtual addresses and physical addresses, respectively. The memory controller 181 can write and read portions of frames (e.g., subframes) in a frame buffer according to respective virtual addresses 1605 of respective virtual memory partitions 1601. The virtual addresses 1605 of the virtual memory partitions 1601 are provided by one or more rolling buffer controllers, such as the rolling buffer controllers 1502. Each virtual memory partition 1601 is assigned a respective sequence of virtual addresses 1605 in the virtual memory 1600, which is indicated by a start address 1606. Each rolling buffer controller 1502 can be assigned a virtual memory partition 1601 by associating the start addresses 1606 with the rolling buffer controller 1502. The virtual memory partition 1601 can also be indicated by end addresses 1607.

Each virtual memory partition 1601 can be divided into buffer slices 1610 which are formed of observation blocks 1615. The sequence of virtual addresses 1605 of each virtual memory partition 1601 provides the locations of the buffer slices 1610 and the observation blocks 1615 in the virtual memory 1600. Each virtual address 1605 of a buffer slice 1610 and an observation block 1615 can be calculated by an index of the buffer slice and an index of the observation block 1615, respectively. The virtual addresses 1605 of the buffer slices 1610 and the observation blocks 1615 in each virtual memory partition 1601 can be translated by a certain mapping function into respective physical addresses in the memory 180 to write and read respective frame portions (e.g., subframes). Accordingly, the frame slices of each frame portion or subframe are stored in respective buffer slices of the frame buffer in the memory 180 according to the respective virtual addresses 1605 in the virtual memory 1600.

For example, if the slice size of each frame slice in a frame is equal to five observation blocks 1615, each buffer slice 1610 can be formed of five observation blocks that are assigned the index values 0-4. If the frame buffer is divided into ten buffer slices, each virtual memory partition 1601 can also be divided into ten buffer slices 1610 that are assigned the respective index values 0-9. The virtual addresses 1605 are provided based on the index values of the observation blocks 1615 and the index values of the buffer slices 1610, and are in turn translated into physical addresses of the memory 180 for writing and reading frame data.

In examples, virtual memory 1600 is configured for the rolling buffer controllers 1502, such as according to a subframe mapping control configuration, to manage data of XPR subframes. The data of individual XPR subframes is distributed and stored in respective virtual memory partitions 1601 of the virtual memory 1600. For example, as shown in FIG. 16, data of four XPR subframes, which are assigned to four respective rolling buffer controllers 1502, can be stored in four respective virtual memory partitions 1601. By setting the start address 1606 for each rolling buffer controllers 1502, each rolling buffer controllers 1502 can be designated one of the four virtual memory partitions 1601 to handle the associated data. Each rolling buffer controller 1502 is designated a respective start address 1606 that indicates the respective virtual memory partition 1601 to store the data of the associated XPR subframe.

Figure 17A:
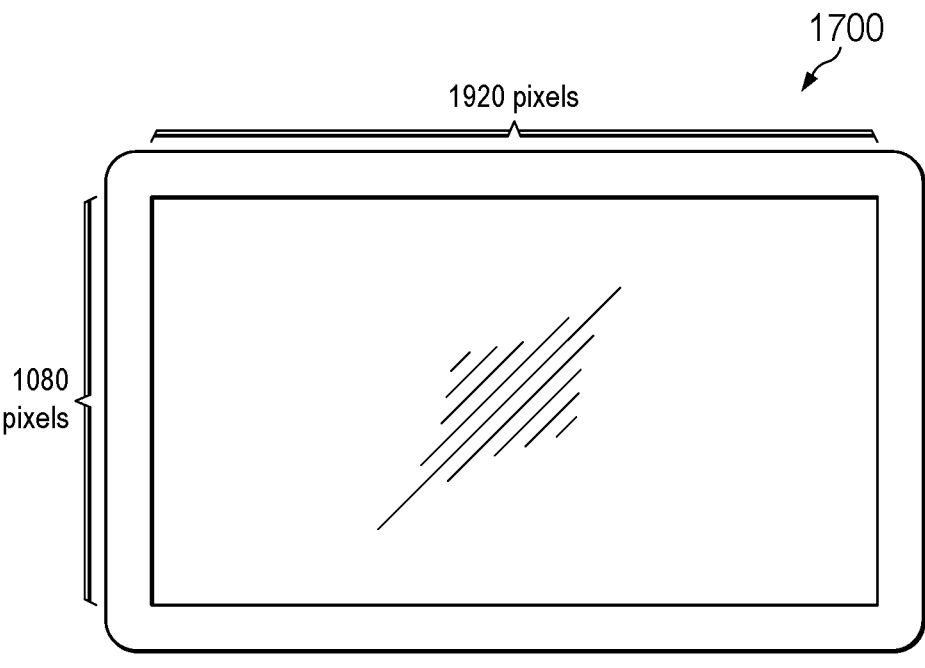
FIGS. 17A-17D are diagrams of display layouts according to channel selections for rolling buffer controllers, in accordance with various examples.

FIGS. 17A-17D are diagrams of display layouts according to channel selections for rolling buffer controllers, in accordance with various examples. For example, the display layouts can be projected by the light modulator 140 according to the respective channel selections. In FIG. 17A, a total number of rolling buffer controllers, such as the rolling buffer controllers 1502 in the rolling buffer apparatus 1500, is selected for a single channel to read the total number of subframes that form each frame. Each subframe of the total number of subframes can be assigned to a respective rolling buffer controller 1502 of the total number of rolling buffer controllers 1502 in the same single channel. Accordingly, the entire surface area 1700 of the light modulator 140 is loaded through the same channel with data from the frame or a total number of subframes that form the frame. For example, if each observation block is an 8×8 block of pixels and the surface area 1700 of the light modulator 140 is equal to 1080×1920 blocks of pixels, the number of frame slices loaded on the surface area 1700 is equal to 135, and the slice size of each frame slice is equal to 240 observation blocks.

Figure 17B:
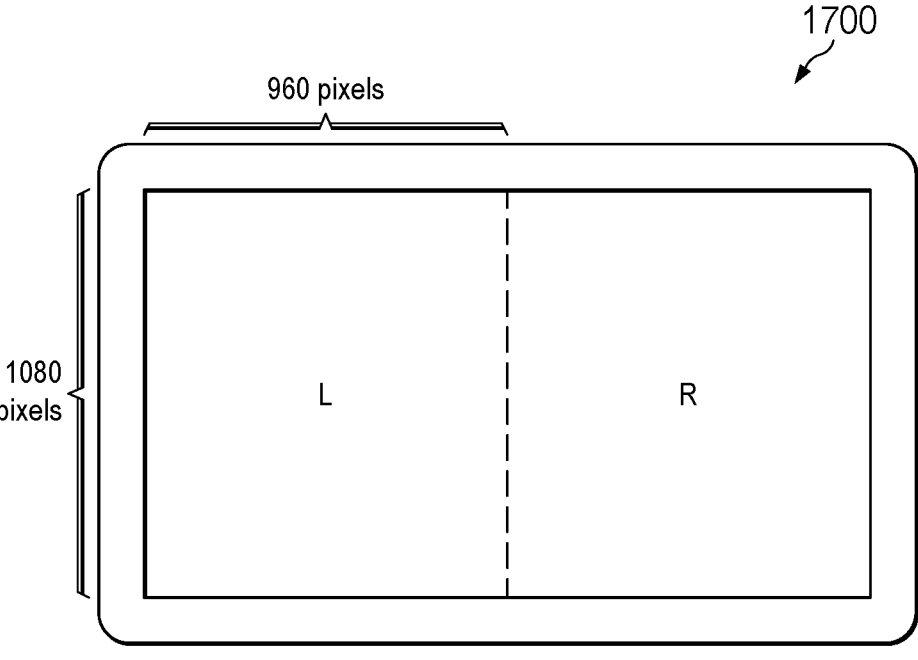

In FIG. 17B, the rolling buffer controllers 1502 are grouped into two groups which are selected for two respective channels to read two respective frames or groups of subframes that form the frame. Accordingly, the surface area 1700 of the light modulator 140 is split into a left-side area and a right-side area, labeled L and R in FIG. 17B, respectively. Each area is loaded with data of a respective group of subframes through a respective channel. For example, if each observation block is an 8×8 block of pixels and each area is equal to 1080×960 blocks of pixels, the number of frame slices loaded on each area is equal to 135, and the slice size of each frame slice in each area is equal to 120 observation blocks.

Figure 17C:
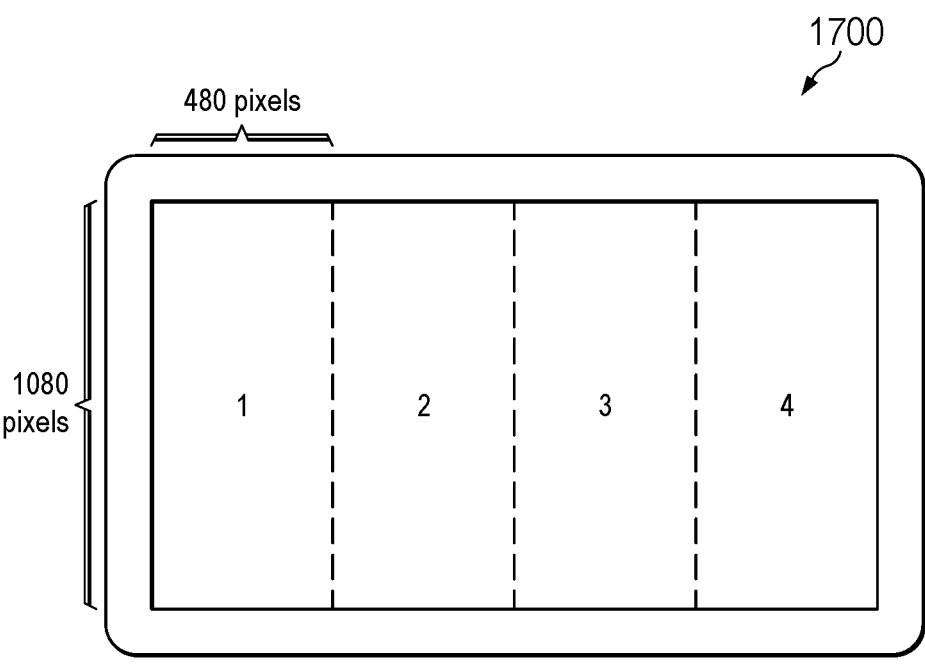

In FIG. 17C, the rolling buffer controllers 1502 are grouped into four groups selected for four respective channels to read four respective subframes or groups of subframes that form the frame. Accordingly, the surface area 1700 of the light modulator 140 can be split into four vertical slices, labeled 1-4 in FIG. 17C. In other examples, the surface area 1700 can be split into four horizontal slices or other sub-areas of equal or different sizes. Each area is loaded with frame data through a respective channel. For example, if each observation block is an 8×8 block of pixels and each sub-area is equal to 1080×480 blocks of pixels, the number of frame slices loaded on each sub-area is equal to 135, and the slice size of each frame slice in each sub-area is equal to 60 observation blocks.

Figure 17D:
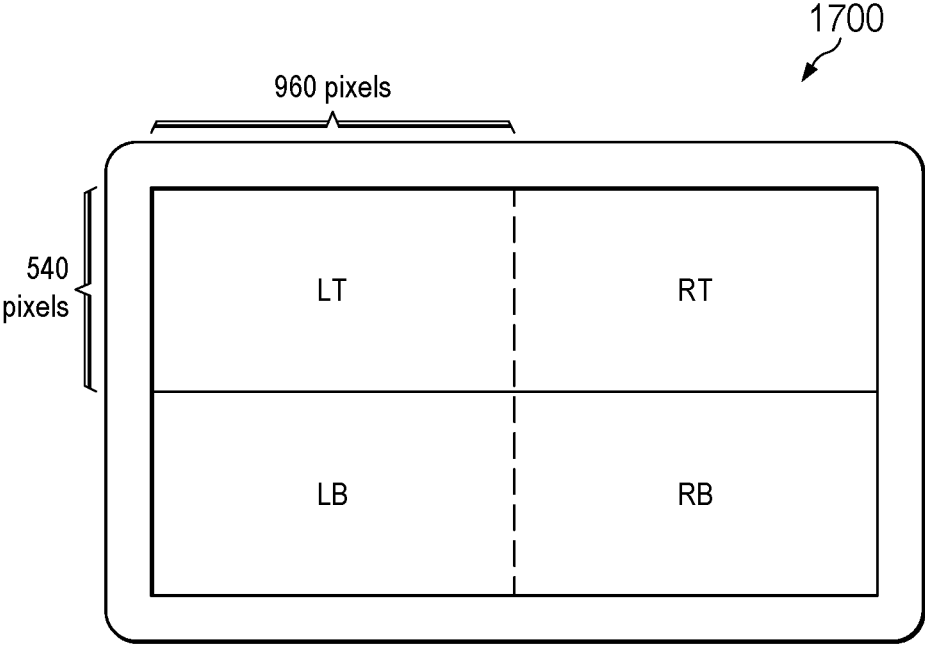

In FIG. 17D, the rolling buffer controllers 1502 are also grouped into four groups selected for four respective channels to write and read the respective subframes. In this example, the surface area 1700 of the light modulator 140 is split into four equal size quadrants LT, RT, LB and RB in FIG. 17D. For example, if each observation block is an 8×8 block of pixels and each quadrant is equal to 540×960 blocks of pixels, the number of frame slices loaded on each quadrant is equal to 68, and the slice size of each frame slice in each quadrant is equal to 120 observation blocks.

Figure 18:
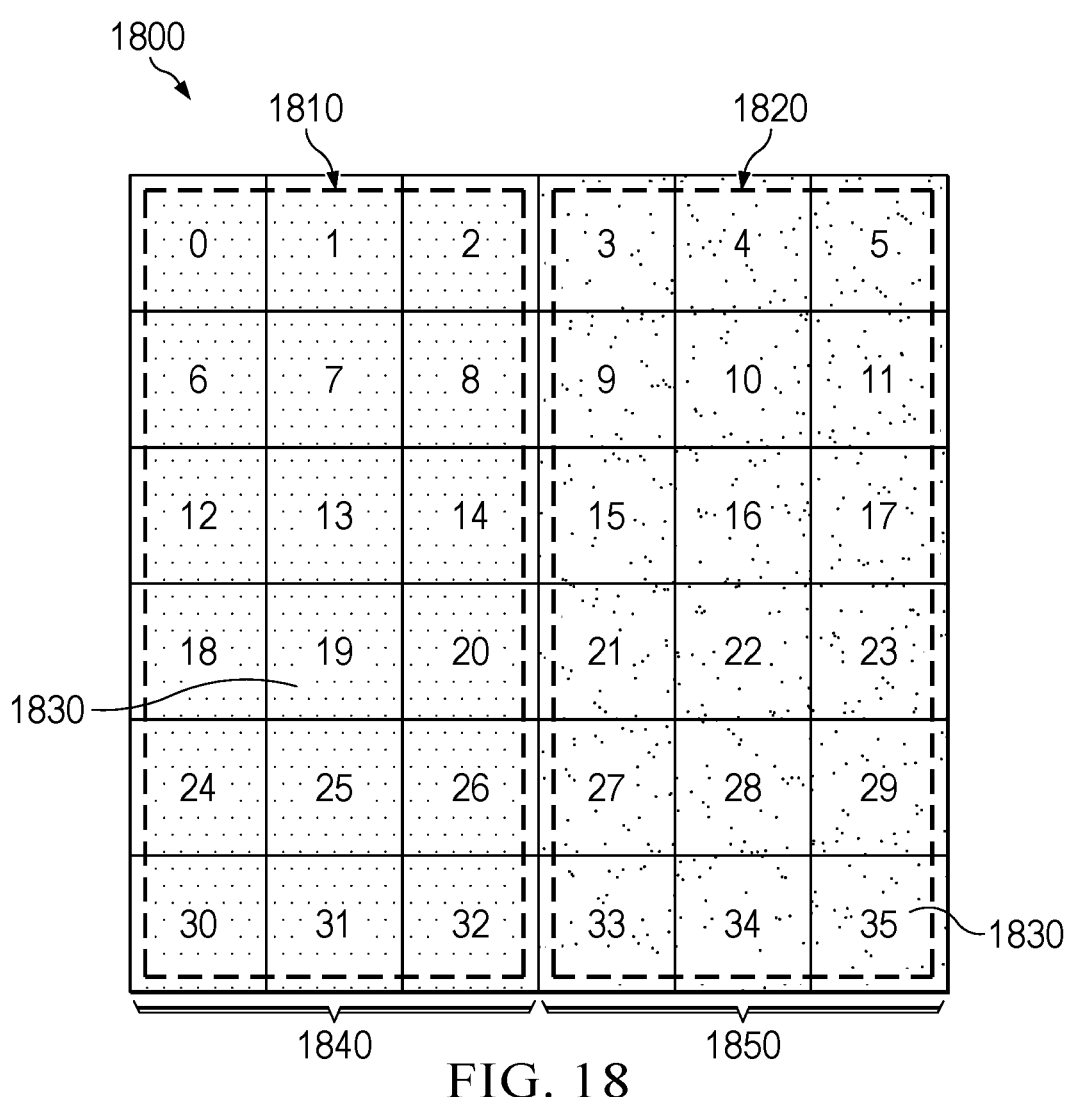
FIG. 18 is a diagram of a display layout for two channels of rolling buffer controllers, in accordance with various examples.

FIG. 18 is a diagram of a display layout 1800 for two channels of rolling buffer controllers, in accordance with various examples. The rolling buffer controllers are grouped into two groups of equal numbers of controllers, which are selected for two respective channels for managing frame data. Accordingly, the display layout 1800 is split into two areas, each loaded with frame data through a respective channel. For example, the display layout 1800 represents the surface area 1700 of the light modulator 140 and includes a left-side area 1810 and a right-side area 1820. The left-side area 1810 and right-side area 1820 are loaded with a total number of 36 observation blocks 1830, labeled 0-35. The observation blocks 1830 are grouped into two groups 1840 and 1850 of observations blocks 1830. The two groups 1840 and 1850 can be displayed though the two channels by two respective rolling buffer controllers 1502. In other examples, the display layout 1800 can be split into a top area and a bottom area or into other two partitions for the two respective channels.

Linking the two rolling buffer controllers of the two groups 1840 and 1850 is useful to coordinate the reading and loading of respective frame data through the two channels on the left-side area 1810 and a right-side area 1820, respectively. For example, coordinating the reading of respective frame data of the two channels is useful to synchronize updating the displayed image portions between the left-side area 1810 and the right-side area 1820. The reading operations of the two channels can be coordinated by providing each rolling buffer controller 1502 access to one or more buffer parameters of the other rolling buffer controller 1502. For example, the rolling buffer controllers are linked to obtain a written frame slices count from the buffer parameters of one of the rolling buffer controllers. The link controller 1504 of the rolling buffer apparatus 1500 can be configured to maintain the written frame slices count from the buffer parameters of each rolling buffer controller 1502 to a respective address in a register array, which can be accessed by one or more other rolling buffer controllers 1502. If a rolling buffer controller 1502 receives a buffer update request from the memory controller 181, the rolling buffer controller 1502 can obtain from the register array a written frame slices count of another linked rolling buffer controller 1502 to generate a read-side snapshot of buffer parameters accordingly. Linking the rolling buffer controllers 1502 also depends on the order of writing the frame data between the rolling buffer controllers 1502.

Figure 19A:
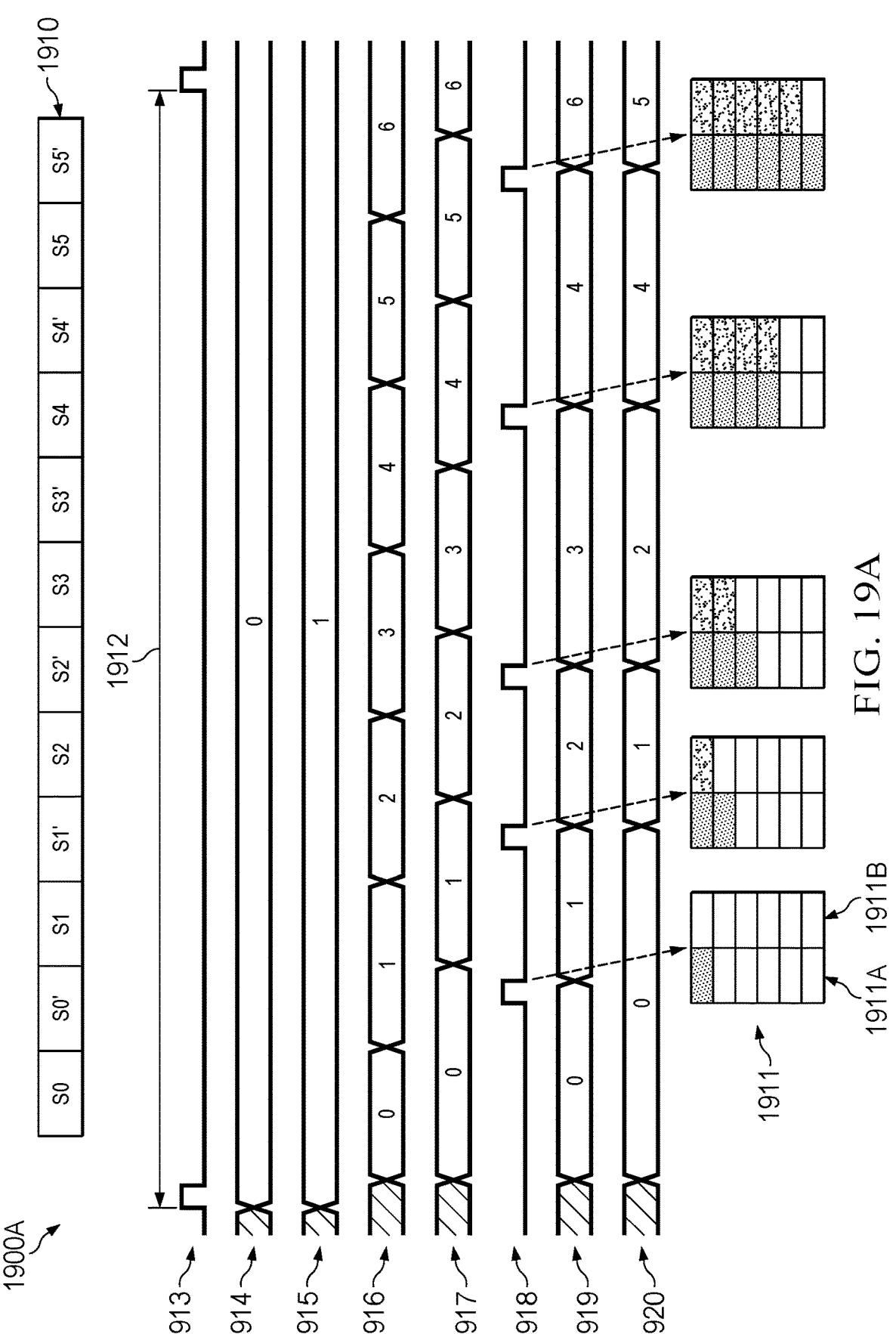
FIG. 19A is a diagram of a rolling buffer operation with two unlinked rolling buffer controllers selected for two respective channels, in accordance with various examples.

FIG. 19A is a diagram of a rolling buffer operation 1900A with two unlinked rolling buffer controllers selected for two respective channels, in accordance with various examples. For example, the rolling buffer operation 1900A is performed by the rolling buffer apparatus 1500 with two rolling buffer controllers 1502. Frame data can be read from the rolling buffer apparatus 1500 through each of the two respective channels and loaded on two respective areas of the surface area of the light modulator 140. In the rolling buffer operation 1900A, the memory controller 181 receives each frame 1910 in a sequence of frames in regular respective time intervals 1912. The start of each time interval 1912 is signaled by a respective synchronization signal 1913. Each frame 1910 is split into two sequences of frame slices of equal slice count for writing and reading on the two respective channels. The two sequences of frame slices in the frame 1910 can include alternating frame slices, where each frame slice in the first sequence is followed by a frame slice in the second sequence. In each of the two sequences, the frame slices are written, read, loaded by a respective rolling buffer controller 1502 for the respective channel onto a respective area 1911 of the light modulator 140 and accordingly displayed in a respective area of the image projected by the light modulator 140. As shown in FIG. 19A, a surface of the light modulator 140 is split into a left respective area 1911A for a first channel, and a right respective area 1911B for the second channel. For example, if the number of frame slices in the frame 1910 is equal to 12, each sequence includes six frame slices, as shown in FIG. 19A. The frame slices of the first sequence are labeled S0-S5, and the frame slices of the second sequence are labeled S0'-S5'.

The linking configuration between the two rolling buffer controllers 1502 of the two respective channels can be programmed, for each time interval 1912, with a first link status 1914 and a second link status 1915, respectively, maintained in the rolling buffer apparatus 1500. The first link status 1914 is set to indicate a link of the first rolling buffer controller 1502, and the second link status 1915 is set to indicate a link of the second rolling buffer controller 1502. As shown in FIG. 19A, the first link status 1914 of the first rolling buffer controller 1502 is set to 0 to indicate a self-link to the first rolling buffer controller 1502. The second link status 1915 is set to 1 to indicate a self-link to the second rolling buffer controller 1502. Because each of the two rolling buffer controllers 1502 is configured with a self-link, the two rolling buffer controllers 1502 are unlinked.

The two rolling buffer controllers 1502 track the frame slices of the two sequences of the frame 1910 in the frame buffer, respectively, according to respective buffer parameters and read-side snapshots. The memory controller 181 can write each frame slice in the first sequence of frame slices S0-S5. The frame slice is indicated by a first written frame slices count 1916 in the buffer parameters of a first rolling buffer controller 1502 of a first channel. The frame slice is written and read according to the memory address provided by the first rolling buffer controller 1502. The memory controller 181 also writes each frame slice in the second sequence of frame slices S0'-S5'. The frame slice is indicated by a second written frame slices count 1917 in the buffer parameters of a second rolling buffer controller 1502 of a second channel. The frame slice is written and read according to the memory address provided by the second rolling buffer controller 1502.

In response to each buffer update request 1918 from the memory controller 181, the first rolling buffer controller 1502 generates a read-side snapshot of the buffer parameters and enables the memory controller 181 to read the frame slices S0-S5 according to a first written frame slices count 1919 in the read-side snapshot. In response to the same buffer update requests 1918, the second rolling buffer controller 1502 also generates a respective read-side snapshot of the buffer parameters and enables the memory controller 181 to read frame slices of frame slices S0'-S5' according to a second written frame slices count 1920 in the generated read-side snapshot.

If the two rolling buffer controllers 1502 are unlinked, the first written frame slices count 1919 in the read-side snapshot can be different than the second written frame slices count 1920 in the read-side snapshot. Accordingly, a different number of frame slices can be loaded on the two respective areas of the light modulator 140 at a same buffer update interval of buffer update requests 1918 causing a visual artifact in the displayed image as projected by the light modulator 140. The number of loaded frame slices on the two respective areas can be matched by linking the two rolling buffer controllers 1502 to mitigate this visual artifact.

Figure 19B:
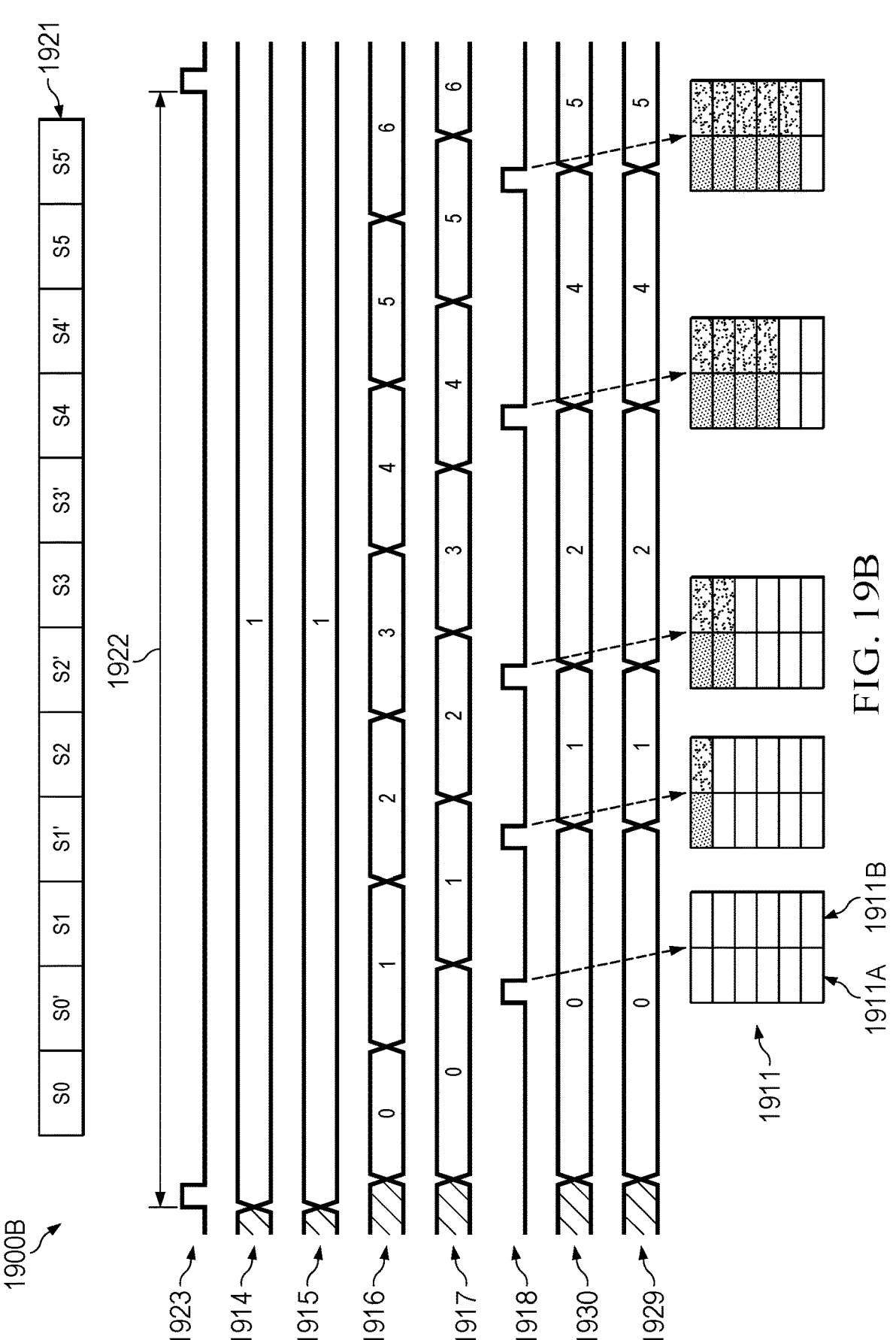
FIG. 19B is a diagram of a rolling buffer operation with two linked rolling buffer controllers, in accordance with various examples.

FIG. 19B is a diagram of a rolling buffer operation 1900B with two linked rolling buffer controllers 1502, in accordance with various examples. For example, in the rolling buffer apparatus 1500, two rolling buffer controllers 1502 of two respective channels receive a next frame 1921 in a second time interval 1922 that is signaled by a respective synchronization signal 1923. The frame 1921 is split into two sequences of frame slices, such as alternating frame slices, of equal slice count. Each sequence of frame slices is assigned to one of the two channels and stored in a respective group of buffer slices in the frame buffer. For example, if the number of frame slices in the frame 1921 is equal to 12, each sequence includes six frame slices, labeled S0-S5 and S0'-S5', respectively, as shown in FIG. 19B.

The two rolling buffer controllers 1502 of the two respective channels can be linked according to the timing of writing the respective frame data. For example, as shown in FIG. 19B, a second rolling buffer controller 1502 of a second channel is timed to write the last frame slice in each row (e.g., buffer slice) in the frame buffer, after a first rolling buffer controller 1502 of a first channel. The second rolling buffer controller 1502 also updates the buffer parameters after the first rolling buffer controller 1502. Accordingly, the first rolling buffer controller 1502 is linked to the second rolling buffer controller 1502 to obtain the buffer parameters reflecting the last written frame slice in each row. The two rolling buffer controllers 1502 can be linked by programming a first link status 1914 of the first rolling buffer controller 1502 to indicate a link to the second rolling buffer controller 1502. The first link status 1914 of the first rolling buffer controller 1502 can be set to 1 to link the first rolling buffer controller 1502 to the second rolling buffer controller 1502. A second link status 1915 is also set to 1 to indicate a self-link to the second rolling buffer controller 1502. Accordingly, the two rolling buffer controllers 1502 are configured with a link to the second rolling buffer controller 1502.

The two rolling buffer controllers 1502 track the frame slices of the two sequences of the frame 1921 in the frame buffer, respectively, according to respective buffer parameters and read-side snapshots. The memory controller 181 can write each frame slice in the first sequence of frame slices S0-S5 indicated by a first written frame slices count 1916 in the buffer parameters of the first rolling buffer controller 1502. The memory controller 181 also writes each frame slice in the second sequence of frame slices S0'-S5' indicated by a second written frame slices count 1917 in the buffer parameters of the second rolling buffer controller 1502.

In response to each buffer update request 1918 from the memory controller 181, the second rolling buffer controller 1502 generates a read-side snapshot of the buffer parameters including a written frame slices count 1929. By linking the first rolling buffer controller 1502 to the second rolling buffer controller 1502, the first rolling buffer controller 1502 is configured to copy, in response to the same buffer update request 1918, the second written frame slices count 1917 of the buffer parameters of the second rolling buffer controller 1502 to generate a read-side snapshot including a written frame slices count 1930 that matches the written frame slices count 1929. Accordingly, the same number of frame slices at each buffer update interval is loaded on the two respective areas 1911 (119A and 119B) of the light modulator 140 and in the image projected by the light modulator 140. The first rolling buffer controller 1502 can copy only the second written frame slices count 1917 without a current frame start buffer slice and a previous frame start buffer slice from the buffer parameters of the second rolling buffer controller 1502.

The rolling buffer apparatus 1500 can also be operated for projecting images by respective light modulators 140. For example, the rolling buffer apparatus 1500 can be part of a wearable AR/VR device including two light modulators 140 of two eyepieces for projecting frames onto two respective image projection surfaces 130 (e.g., combiners). The frames are loaded through two channels of two respective rolling buffer controllers 1502 on the two light modulators 140, respectively, to display respective images.

Figure 20A:
Figure 20B:
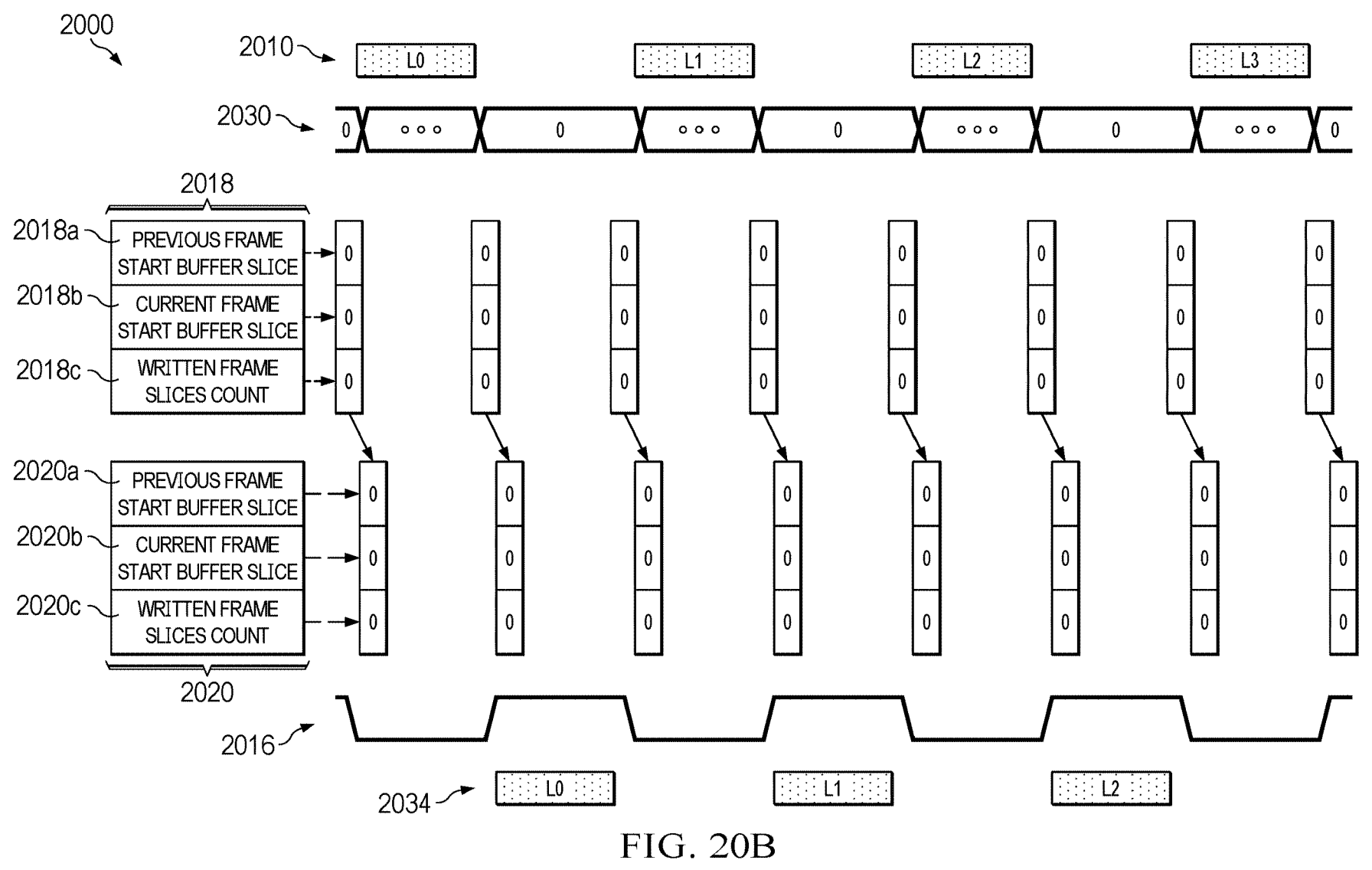
Figure 20C:
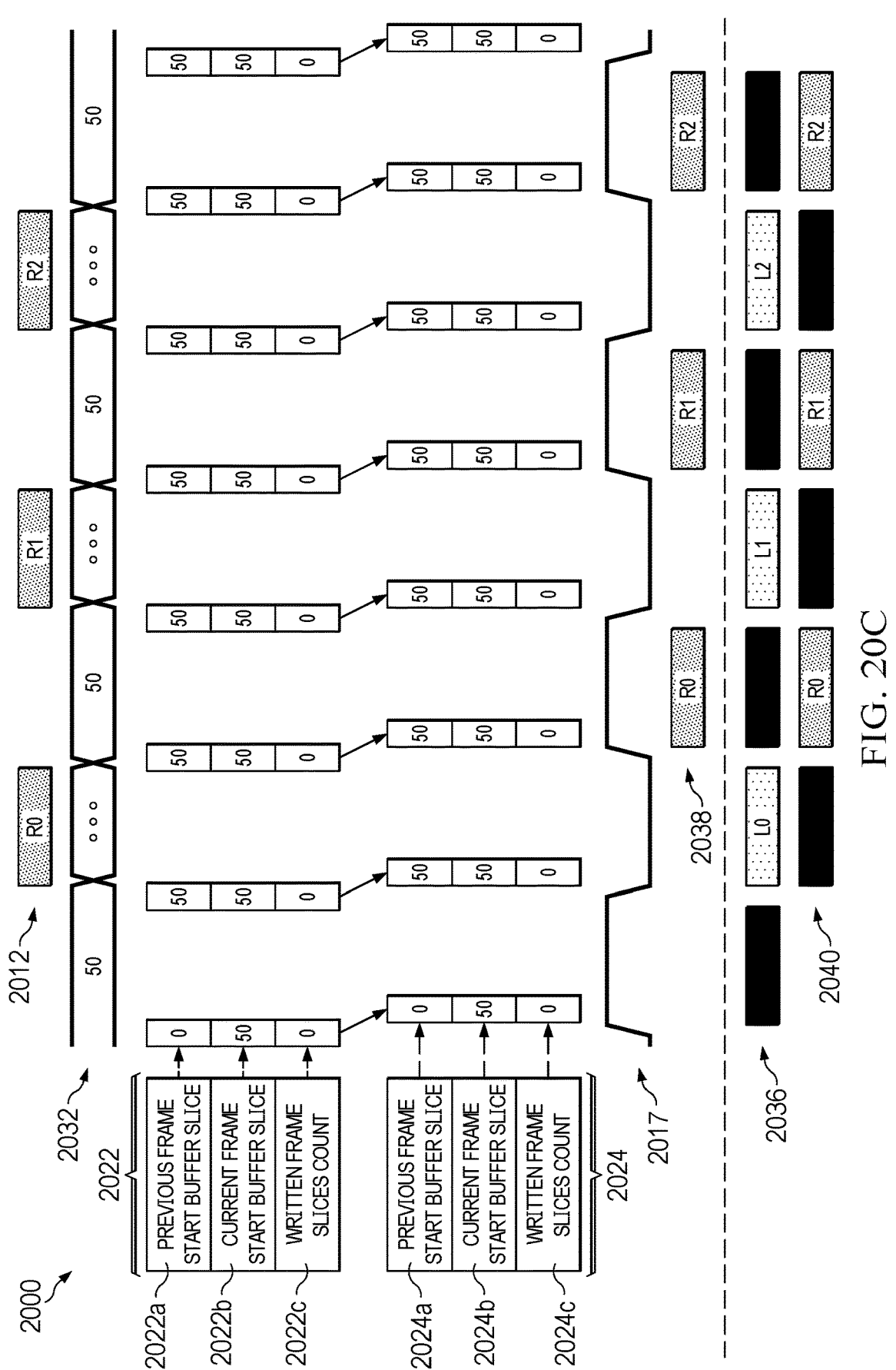

FIGS. 20A-20C show a diagram of a rolling buffer operation 2000 in a single buffer mode for displaying frames on two displays, in accordance with various examples. For example, the rolling buffer operation 2000 is performed with two rolling buffer controllers 1502 that are coupled to a first light modulator 140 and a second light modulator 140 in the display device 110 or the display system 100. In the rolling buffer operation 2000, each two successive frames 2002 in a sequence of received frames 2002 are written and read in the two respective groups of buffer slices of a frame buffer. The frames 2002 are received in respective time intervals 2004 that are signaled by respective synchronization signals 2006. The sequence of frames 2002 includes a first sequence of frames 2002 for the first light modulator 140 and a second sequence of frames 2002 for the second light modulator 140. For example, the sequence of frames 2002 is divided into two sequences of alternating left-side frames 2002a and right-side frames 2002b that can be projected on two respective image projection surfaces 130 (e.g., combiners) and combined by the HVS as 3D images. In FIG. 20, the left-side frames 2002a are labeled as L0-L3, etc., and the right-side frames 2002b are labeled R0-R2, etc. The frame buffer includes a first group of buffer slices for storing frame slices of the first sequence of frames 2002 for the first light modulator 140, and a second group of buffer slices for storing frame slices of the second sequence of frames 2002 for the second light modulator 140.

According to the single buffer mode, each of the two groups of buffer slices of the frame buffer includes a number of buffer slices equal to the slice count of frame slices in the frames 2002. The frame slices of two successive frames 2002 are written on two respective channels in two successive time intervals 2004 in response to two successive write 3D reference signals 2008. For example, the left-side written frames 2010 of each left-side frame 2002a are written at a time interval 2004 to the first group of buffer slices in the frame buffer. The right-side written frames 2012 of each right-side frame 2002b are written at the next time interval 2004 to the second group of buffer slices in the frame buffer. The values of the write 3D reference signals 2008 are configured to swap writing operations between the left-side frame 2002a and the right-side frame 2002b at each next time interval 2004.

Reading the frame slices of each left-side frame 2002a and next right-side frame 2002b is also triggered in two successive time intervals 2004 in response to two successive read 3D reference signals 2014, respectively. The values of the read 3D reference signals 2014 are configured to swap reading operations between the left-side frame 2002a and the right-side frame 2002b at each next time interval 2004. The left-side written frames 2010 in the first group of buffer slices and the right-side written frames 2012 in the second group of buffer slices are also read on the two respective channels according to left-side read requests 2016 and right-side read requests 2017, respectively. A first rolling buffer controller 1502 selected for a first channel is configured to provide the memory controller 181 with the memory addresses of the left-side written frames 2010 in response to each left-side read request 2016. A second rolling buffer controller 1502 selected for a second channel also provides the memory controller 181 with the memory addresses of the right-side written frames 2012 in response to each right-side read request 2017.

Each group of buffer slices is tracked, by a respective rolling buffer controller 1502, according to respective buffer parameters and respective read-side snapshots of the buffer parameters writing and reading operations, respectively. The read-side snapshots are generated in response to buffer update requests 2019. In response to the buffer update requests 2019, a first rolling buffer controller 1502 can maintain first buffer parameters for the first group of buffer slices at fixed first values, and a second rolling buffer controller 1502 maintains second buffer parameters for the second group of buffer slices at fixed second values.

For example, the first group of buffer slices storing left-side written frames 2010 is tracked according to the buffer parameters 2018, which include a previous frame start buffer slice 2018a, a current frame start buffer slice 2018b, and a written frame slices count 2018c. The buffer parameters 2018 are copied, respectively, to a previous frame start buffer slice 2020a, a current frame start buffer slice 2020b, and a written frame slices count 2020c in the read-side snapshot 2020. The second group of buffer slices storing right-side written frames 2012 is tracked by respective buffer parameters 2022 including a previous frame start buffer slice 2022a, a current frame start buffer slice 2022b, and a written frame slices count 2022c. The buffer parameters 2022 are copied, respectively, to a previous frame start buffer slice 2024a, a current frame start buffer slice 2024b, and a written frame slices count 2024c in a read-side snapshot 2024.

To write and read the left-side written frames 2010 on the first channel, the previous frame start buffer slice 2018a and the current frame start buffer slice 2018b of the buffer parameters 2018 are fixed at the same values without change after the buffer update requests 2019. The same values of the buffer parameters 2018 are also copied to the previous frame start buffer slice 2020a and the current frame start buffer slice 2020b of the read-side snapshot 2020 in response to each buffer update request 2019. Accordingly, the left-side written frames 2010 are written and read from the same first group of buffer slices for all respective time intervals 2004.

On the second channel, the previous frame start buffer slice 2022a and the current frame start buffer slice 2022b of the buffer parameters 2022 are also fixed at the same values without change after the buffer update requests 2019. The same values of the buffer parameters 2022 are copied to the previous frame start buffer slice 2024a and the current frame start buffer slice 2024b of the read-side snapshot 2024 in response to each buffer update request 2019. Accordingly, the right-side written frames 2012 are written and read from the same second group of buffer slices for all respective time intervals 2004. The first and second rolling buffer controllers 1502 can indicate to the memory controller 181 the memory addresses of each next buffer slice in the first and second groups of buffer slices by a first buffer slice number 2030 and a second buffer slice number 2032, respectively.

In an example as shown in FIGS. 20A-20C, the slice count of frames 2002 and similarly the number of buffer slices is equal to 50, and each of the two groups of buffer slices includes 50 buffer slices. In FIG. 20B, the rolling buffer controller 1502 enables the memory controller 181 to write the frame slices of the left-side frames 2002a in buffer slices indicated by respective buffer slice numbers 0-49, and then rolls back the frame buffer to the buffer slice number 0. Accordingly, the previous frame start buffer slice 2018a and the current frame start buffer slice 2018b of the buffer parameters 2018 remain set to 0 for each frame 2002. The same values are also copied to the read-side snapshot 2020 in response to each buffer update request 2019. Similarly, in FIG. 20C, the rolling buffer controller 1502 enables the memory controller 181 to write the frame slices of the right-side frames 2002*b* in buffer slices indicated by respective buffer slice numbers 50-99 and then rolls back to frame buffer to the buffer slice number 50. Accordingly, the previous frame start buffer slice 2022*a* and the current frame start buffer slice 2022*b* of the buffer parameters 2022 remain set to 50 for each frame 2002. The same values are also copied to the read-side snapshot 2024 in response to each buffer update request 2019.

After each left-side read request 2016, a left-side read frame 2034 is transmitted through the first channel to a first light modulator 140, which projects a respective left-side loaded frame 2036 onto the image projection surface 130. After each right-side read request 2017, a right-side read frame 2038 is transmitted through the second channel to a second light modulator 140, which projects a respective right-side loaded frame 2040 onto the image projection surface 130. The left-side loaded frames 2036 and right-side loaded frames 2040 can be projected at a certain rate to allow the HVS to perceive 3D images.

In the rolling buffer operation 2000, the rolling buffer apparatus 1500 displays the left-side loaded frames 2036 and right-side loaded frames 2040 in alternating time intervals with a latency equivalent to a full frame size for storing and displaying the frames 2002. The latency for storing and displaying the frames 2002 can be reduced by operating the rolling buffer apparatus 1500 in a rolling buffer mode with more buffer slices and a higher rate of buffer update requests 2019 in comparison to the rolling buffer operation 2000.

Figure 21A:
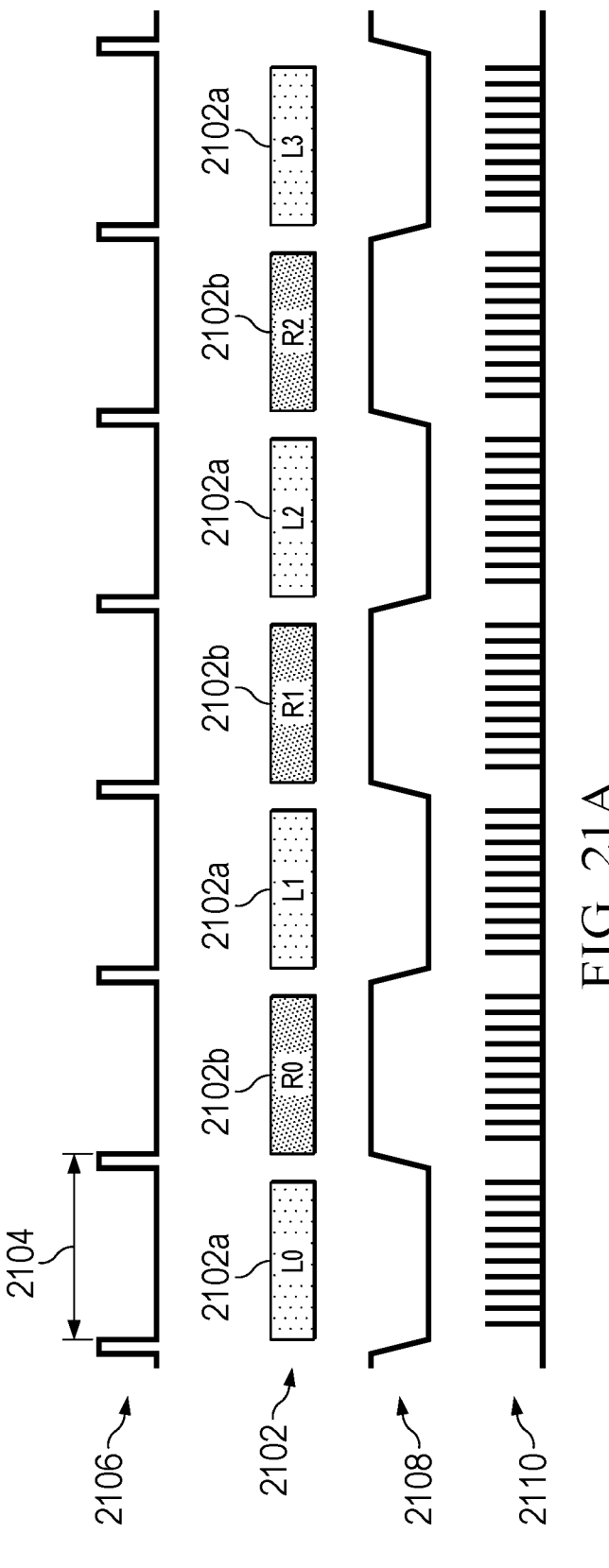
FIGS. 21A-21B show diagrams of a rolling buffer operation for displaying frames on two displays, in accordance with various examples.
Figure 21B:
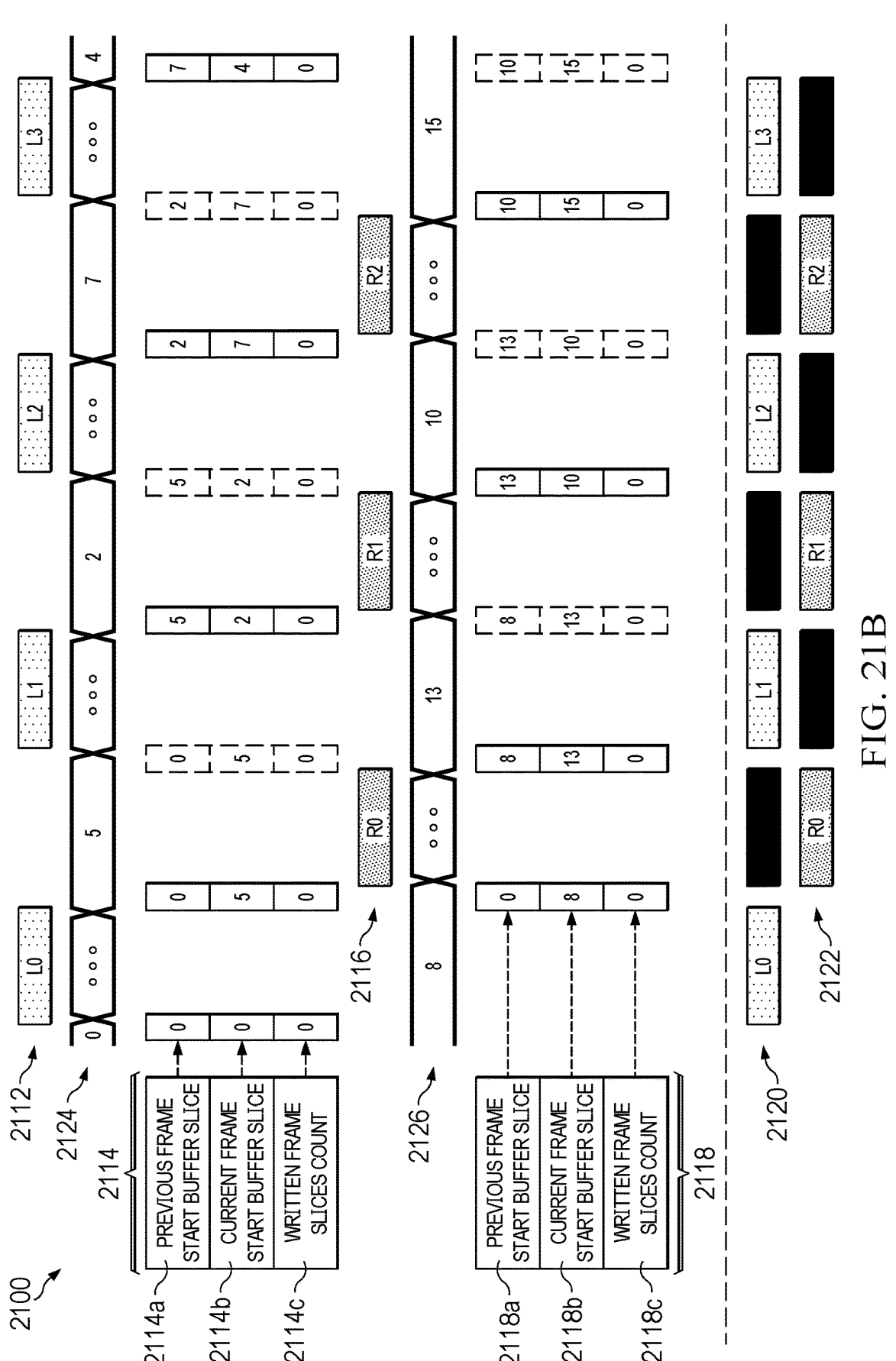

FIGS. 21A-21B show a diagram of a rolling buffer operation 2100 for displaying frames on two displays, in accordance with various examples. For example, the rolling buffer operation 2100 is performed with two rolling buffer controllers 1502 that are coupled to a first light modulator 140 and a second light modulator 140 in the display device 110 or the display system 100. In the rolling buffer operation 2100, each two successive frames 2102*a* in a sequence of received frames 2102*b* are written and read in the two respective groups of buffer slices of a frame buffer. The frames 2102 are received in respective time intervals 2104 that are signaled by respective synchronization signal 2106. The sequence of frames 2102 includes a first sequence of frames 2102*a* for the first light modulator 140 and a second sequence of frames 2102*b* for the second light modulator 140. For example, the sequence of frames 2102 is divided into two sequences of alternating left-side frames 2102*a* and right-side frames 2102*b* that can be combined by the HVS as 3D images when displayed. In FIG. 21A, the left-side frames 2102*a* are labeled as L0-L3, etc., and the right-side frames 2102*b* are labeled R0-R2, etc. The frame buffer includes a first group of buffer slices for storing first frame slices of the first sequence of frames 2102 for the first light modulator 140, and a second group of buffer slices for storing second frame slices of the second sequence of frames 2102 for the second light modulator 140.

To reduce the latency of the rolling buffer operation 2100 in comparison to the rolling buffer operation 2000, the number of buffer slices in each of the first group of buffer slices and the second group of buffer slices is greater than the slice count of the frame slices in the frames 2102. The two groups of buffer slices of the frame buffer can also include a same number of buffer slices. The frame slices of two successive frames 2102 are written and read in two successive time intervals 2104 in response to two successive write channel select signals 2108. For example, the frame slices of each left-side frame 2102*a* are written and read at a time interval 2104 in the first group of buffer slices in the frame buffer, and the frame slices of each right-side frame 2102*b* are written and read at the next time interval 2104 in the second group of buffer slices in the frame buffer. The values of the channel select signals 2108 are configured to swap writing and reading operations between the left-side frame 2102*a* and the right-side frame 2102*b* at each next time interval 2104.

Each group of buffer slices is tracked by a respective rolling buffer controller 1502 for writing and reading operations according to respective buffer parameters and respective read-side snapshots of the buffer parameters, which are generated in response to buffer update requests 2110. The first group of buffer slices store left-side written frames 2112 according to the buffer parameters 2114 including a previous frame start buffer slice 2114*a*, a current frame start buffer slice 2114*b*, and a written frame slices count 2114*c*. The left-side written frames 2112 are read from the first group of buffer slices after respective read requests to load the left-side read frames 2120 on a first light modulator 140. The second group of buffer slices store right-side written frames 2116 according to the buffer parameters 2118 including a previous frame start buffer slice 2118*a*, a current frame start buffer slice 2118*b*, and a written frame slices count 2118*c*. The right-side written frames 2116 are read from the second group of buffer slices according to respective read requests to load the right-side read frames 2122 on a second light modulator 140. The rolling buffer controllers 1502 can indicate to the memory controller 181 the memory addresses of each next buffer slice in the first and second groups of buffer slices by a first buffer slice number 2124 and a second buffer slice number 2126, respectively.

The rate of the buffer update requests 2110 in the rolling buffer operation 2100 is set to be faster than the rate of the buffer update requests 2019 in the rolling buffer operation 2000. The higher rate of buffer update requests in the rolling buffer operation 2100 reduces the latency of storing and displaying the frames 2102 in comparison to the frames 2002. According to the number of buffer update requests 2110 per time interval 2104, newly written frame slices are read based on respective read-side snapshots and sent to the display device 110 in the same time interval 2104 as other frame slices are received and written to the frame buffer. In an example as shown in FIGS. 21A-21B, the total number of buffer slices in the frame buffer is equal to 16, and each of the two groups of buffer slices includes 8 buffer slices. At the time intervals 2104 for writing and reading the right-side frames 2102*b* in the second group of buffer slices, the buffer parameters 2114 for tracking the left-side frames 2102*a* in the first group of buffer slices is not updated. Similarly, the buffer parameters 2118 for tracking the right-side frames 2102*b* in the second group of buffer slices is not updated at the time intervals 2104 for writing and reading the left-side frames 2102*a* in the first group of buffer slices.

Figure 22:
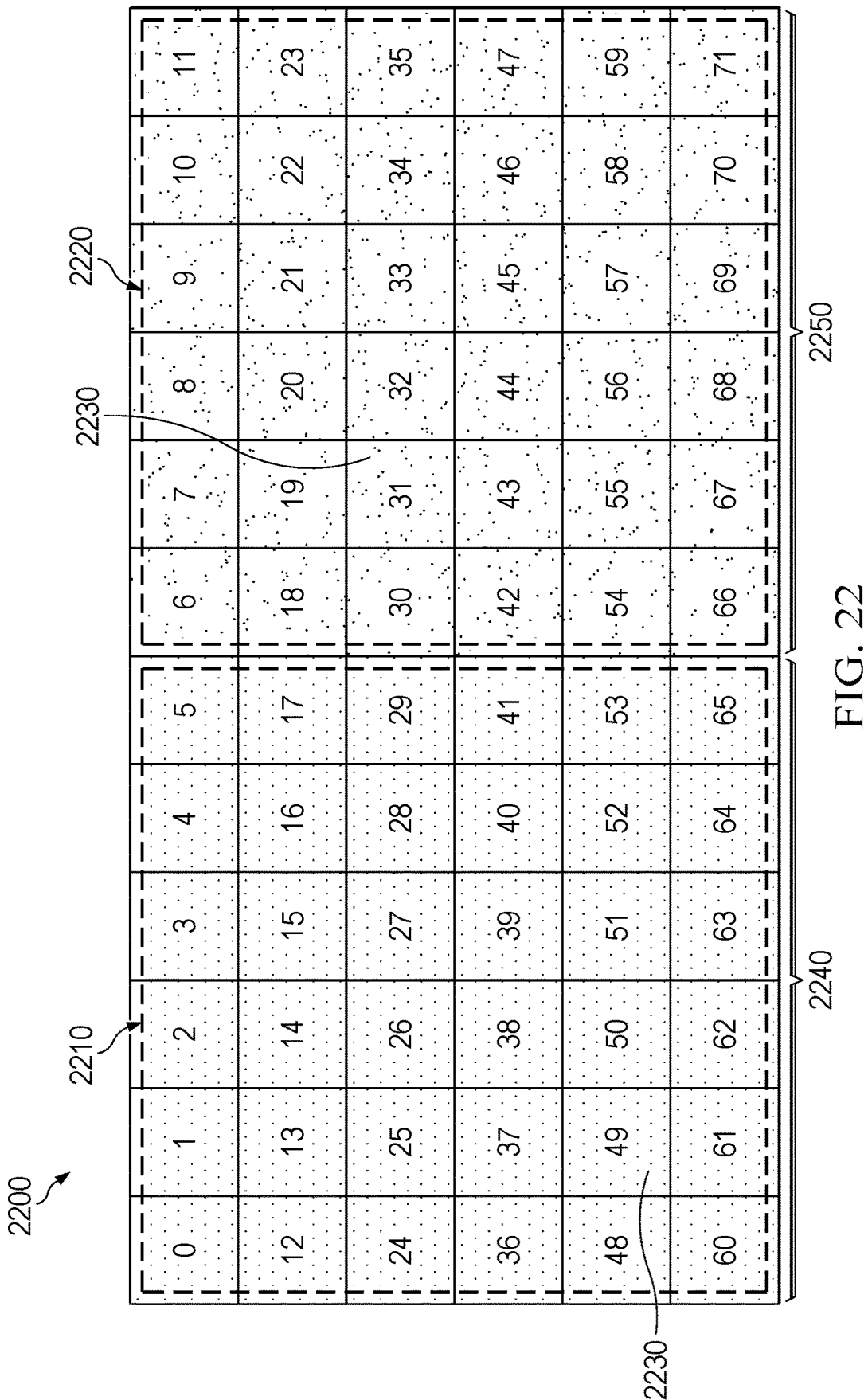
FIG. 22 is a diagram of a display layout configured with two channels for displaying frames, in accordance with various examples.

FIG. 22 is a diagram of a display layout 2200 configured with two channels for displaying frames, in accordance with various examples. Two rolling buffer controllers are selected to perform write and read operations for the two respective channels. For example, two rolling buffer controllers 1502 in the rolling buffer apparatus 1500 are selected for the two respective channels to display frame data on a surface area of the light modulator 140. The surface area of the light modulator 140 includes a left-side area 2210 and a right-side area 2220. The left-side area 2210 and right-side area 2220 are loaded with a total number of 72 observation blocks 2230, labeled 0-71. The observation blocks 2230 are grouped into two groups 2240 and 2250 of observations blocks 2230. The two groups 2240 and 2250 are displayed though the two channels on the left-side area 2210 and the right-side area 2220 by the two rolling buffer controllers 1502, respectively.

A first rolling buffer controller 1502 is configured to track first frame slices formed of the observation blocks 2230 of the first group 2240 according to respective first buffer parameters and read-side snapshots for writing and reading the frame slices into a frame buffer. A second rolling buffer controller 1502 is also configured to track second frame slices formed of the observation blocks 2230 of the second group 2250 according to respective second buffer parameters and read-side snapshots for writing and reading the frame slices into the frame buffer. For example, if each observation block 2230 is an 8×8 block of pixels, and each of the left-side area 2210 and right-side area 2220 includes 48×48 blocks of pixels, the slice count of frame slices loaded on each area is equal to 6 frame slices, and the slice size of each frame slice is equal to 6 observation blocks 2230. If the first rolling buffer controller 1502 receives the frame slices of the first group 2240 before the second rolling buffer controller 1502 receives the frame slices of the second group 2250, the first rolling buffer controller 1502 can be linked to the second rolling buffer controller 1502 to load, at each buffer update, the same number of frame slices on the left-side area 2210 and right-side area 2220 in the image projected by the light modulator 140.

In examples, the observation blocks 2230 can be displayed with a rolling buffer operation in a single buffer mode, such as the rolling buffer operation 2000. Accordingly, the ordered sequence of buffer slices in the frame buffer is divided into two groups of buffer slices for writing and reading frame slices of the first group 2240 and second group 2250, respectively. The number of buffer slices in each group is equal to the slice count of 6 frame slices. To allocate adjacent virtual addresses for the first group 2240 and second group 2250 in a virtual memory, the start memory address of the first group of buffer slices can be indicated by a virtual address of 0, and the start memory address of the second group of buffer slices can be indicated by a virtual address of 6×6=36. In other examples, the observation blocks 2230 can be displayed with a rolling buffer operation in a double buffer mode, such as the rolling buffer operation 1200. Accordingly, the slice count of frame slices loaded on each area is equal to 6 frame slices. Each of the two groups of buffer slices also includes a number of buffer slices equal to two times the slice count which is 12. The start memory address of the first group of buffer slices can be indicated by a virtual address of 0, and the start memory address of the second group of buffer slices can be indicated by a virtual address of 6×12=72. In other examples, the observation blocks 2230 can be displayed with a rolling buffer operation in a rolling buffer mode including fewer buffer slices than the double buffer mode, such as the rolling buffer operation 2100. For example, if the slice count of frame slices loaded on each area is equal to 6 frame slices, the number of buffer slices in each respective group of buffer slices can be equal to 9 with added storage space margin of three buffer slices. Accordingly, the start memory address of the first group of buffer slices can be indicated by a virtual address of 0, and the start memory address of the second group of buffer slices can be indicated by a virtual address of 6×9=54.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. A system, comprising:

a display device configurable to display frames of images;

a memory coupled to the display device and configurable to store image data representing a sequence of the frames; and a memory controller coupled to the memory and configurable to:

split each frame in the sequence of frames into a slice count of frame slices according to an order of respective frame slice numbers, each frame of the sequence of frames having the slice count of frame slices;

partition the memory into a number of buffer slices in an ordered sequence, wherein the number of buffer slices is greater than or equal to the slice count;

write each frame slice of each frame in the sequence of frames in the order of the frame slice numbers to a next free buffer slice in the ordered sequence of buffer slices, returning to a first buffer slice in the ordered sequence after writing a frame slice in a last buffer slice in the ordered sequence, wherein the memory is configurable to store frame slices of different frames of the sequence of frames at the same time, in which each frame slice stored in the memory at a given time has a different frame slice number than each of the other frame slices stored in the memory at the given time; and provide each written frame slice to the display device to display the written frame slice according to the order of the respective frame slice numbers;

wherein, for each of the second and subsequent frames in the sequence of frames, each frame slice is provided to the display device, as that frame slice becomes available, to replace a previously displayed frame slice of a previous frame in the sequence of frames that has a same slice number.

2. The system of claim 1, wherein the display device is configurable to display frame slices of different frames of the sequence of frames at the same time.

3. The system of claim 2, wherein the memory controller is further configurable to free a buffer slice that is storing the previously displayed frame slice of the previous frame.

4. The system of claim 2, wherein frame slices of the frame and the previous frame that have different frame slice numbers are displayed by the display device at a same time.

5. The system of claim 1, wherein the frame slices have a same slice size, and wherein the display device is further configurable to display a slice count of frame slices at a same time.

6. The system of claim 1, wherein the frame slices are displayed by scrolling an image displayed by the display device according to the order of the respective frame slice numbers, and wherein the scrolling of the displayed image is restarted at each first frame slice of a next frame.

7. The system of claim 1, wherein the memory controller is further configurable to:

receive, at a rolling buffer controller of the memory controller, buffer update requests at respective time intervals;

generate, by the rolling buffer controller, a read-side snapshot of buffer parameters in response to each buffer update request;

provide, by the rolling buffer controller, memory addresses for the written frame slice according to the read-side snapshot; and read image data of the written frame slice according to the memory addresses.

8. The system of claim 7, wherein the buffer update requests include a buffer update request for each frame, each color cycle, each bit frame, or each bit slice.

9. A method comprising:

splitting, by a rolling buffer controller, each frame, in a sequence of frames comprising image data, into a slice count of frame slices;

initializing buffer parameters indicating a current frame start buffer slice, a previous frame start buffer slice, and a written frame slices count;

writing, according to the buffer parameters, a frame slice of the frame slices of the frame to a buffer slice of a frame buffer in a memory that is configurable to store frame slices of different frames of the sequence of frames at the same time, in which each frame slice stored in the memory at a given time has a different frame slice number than each of the other frame slices stored in the memory at the given time;

incrementing the written frame slices count after writing the frame slice;

reading the written frame slice to a display device;

determining, after receiving a buffer update request, whether image data is being read to the display device; and generating a snapshot of the buffer parameters based on the buffer update request.

10. The method of claim 9, wherein updating the buffer parameters incudes setting the previous frame start buffer slice to the current frame start buffer slice and the current frame start buffer slice to a current buffer slice number, and initializing the written frame slices count.

11. The method of claim 9, further comprising:

updating the buffer parameters if a synchronization signal is received that indicates a start of each frame is received at a respective time interval; and incrementing the written frame slices count if writing a frame slice to the buffer slice is completed each time before receiving a synchronization signal for a next frame.

12. The method of claim 9, wherein:

the generating of the snapshot of the buffer parameters is performed after the image data is read when it is determined that the image data is being read.

13. The method of claim 12, further comprising:

determining if a programmable update segment size is set to a value greater than zero;

copying the written frame slices count from the buffer parameters to the snapshot if the programmable update segment size is not greater than zero; and if the programmable update segment size is greater than zero:

setting the written frame slices count to a number of new written frame slices rounded down to a closest multiple of the programmable update segment size if a number of new written frame slices is greater than or equal to the programmable update segment size; and copying the current frame start buffer slice and the previous frame start buffer slice from the buffer parameters to the snapshot.

14. The method of claim 9, further comprising:

enabling or disabling a rotation setting for a displayed image;

setting a first direction-flip setting for the displayed image to a first direction or a second direction, wherein the first direction is a left-to-right direction across the displayed image and the second direction is a right-to-left direction across the displayed image;

setting a second direction-flip setting for the displayed image to a third direction or a fourth direction, wherein the third direction is a top-to-bottom direction across the displayed image and the fourth direction is a bottom-to-top direction across the displayed image;

reading rows of observation blocks for the displayed image if the rotation setting is disabled or columns of the observation blocks if the rotation setting is enabled; and further reading the observation blocks according to a combination of the first direction-flip setting and the second direction-flip setting.

15. The method of claim 9, the method further comprising:

partitioning the memory into a number of buffer slices equal to two times the slice count;

splitting the buffer slices into a first group of buffer slices and a second group of buffer slices, each buffer slice including a number of buffer slices equal to the slice count;

writing, at two successive time intervals, the frame slices of a frame and a next frame in the sequence of frames to the first group of buffer slices and the second group of buffer slices, respectively; and reading, at the two successive time intervals, the written frame slices of the frame and the next frame from the first group of buffer slices and the second group of buffer slices, respectively.

16. The method of claim 15, wherein the frame and the next frame are a left-side frame and a right-side frame, respectively, that are projected at a certain rate to display a three-dimensional image.

17. An apparatus, comprising:

rolling buffer controllers coupled to a memory controller and a memory, wherein each rolling buffer controller is individually configurable with a respective set of parameters, in which each set of parameters specifies a slice size, a frame slice count, and a buffer slice count, wherein each rolling buffer controller of the rolling buffer controllers is configurable, based on the corresponding set of parameters, to:

receive write requests from the memory controller to write frame slices of a frame in a corresponding sequence of frames representing image data;

provide the memory controller with memory addresses for writing the frames slices into respective buffer slices of a frame buffer in the memory, wherein the frame buffer includes a respective group of buffer slices for each rolling buffer controller of the rolling buffer controllers;

receive buffer update requests;

generate, in response to each buffer update request, a read-side snapshot of buffer parameters of the frame buffer for tracking the frame slices in the respective buffer slices of the corresponding group of buffer slices;

receive read requests from the memory controller to read the frame slices from the respective buffer slices of the corresponding group of buffer slices; and provide, according to the read-side snapshot, the memory controller with the memory addresses of the respective buffer slices of the corresponding group of buffer slices storing the frame slices; and a link controller coupled to the rolling buffer controllers and configurable to specify which of the rolling buffer controllers are linked, wherein each of the linked rolling buffer controllers is configurable to obtain the set of parameters from each of the other linked rolling buffer controllers.

18. The apparatus of claim 17, wherein the frame includes subframes that are split into a same number of frame slices, different numbers of frame slices, or different sizes of frame slices and that are stored into respective groups of buffer slices in the frame buffer, wherein sequences of the frame slices and the groups of buffer slices are tracked by respective rolling buffer controllers according to respective buffer parameters, and wherein the rolling buffer controllers are linked to obtain a written frame slices count from the buffer parameters of one of the rolling buffer controllers.

19. The apparatus of claim 17, wherein the rolling buffer controllers are coupled to a first light modulator and a second light modulator, wherein, of the sequences of frames, a first sequence of frames is for the first light modulator and a second sequence of frames is for the second light modulator, wherein, of the groups of buffer slices, a first group of buffer slices is for storing frame slices of the first sequence of frames and a second group of buffer slices is for storing frame slices of the second sequence of frames, and wherein, in response to the buffer update requests, a first rolling buffer controller, of the rolling buffer controller, maintains first buffer parameters for the first group of buffer slices at fixed first values, and a second rolling buffer controller, of the rolling buffer controllers, maintains second buffer parameters for the second group of buffer slices at fixed second values.

20. The apparatus of claim 17, wherein the rolling buffer controllers are coupled to a first light modulator and a second light modulator, wherein, of the sequence of frames, a first sequence of frames is for the first light modulator and a second sequence of frames is for the second light modulator, wherein, of the groups of buffer slices, a first group of buffer slices is for storing frame slices of the first sequence of frames and a second group of buffer slices for storing frame slices of the second sequence of frames, and wherein a number of buffer slices in the first group of buffer slices and the second group of buffer slices is greater than a slice count of the frame slices in the frames.

* * * * *